(12) United States Patent  
Yang

(10) Patent No.: US 12,346,553 B2
(45) Date of Patent: Jul. 1, 2025

(54) WIDGET PROCESSING METHOD AND RELATED APPARATUS

(71) Applicant: HUAWEI TECHNOLOGIES CO., LTD., Guangdong (CN)

(72) Inventor: Shishu Yang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/793,326

(22) PCT Filed: Jan. 15, 2021

(86) PCT No.: PCT/CN2021/072026
§ 371 (c)(1),
(2) Date: Jul. 15, 2022

(87) PCT Pub. No.: WO2021/143805
PCT Pub. Date: Jul. 22, 2021

(65) Prior Publication Data
US 2023/0068100 A1    Mar. 2, 2023

(30) Foreign Application Priority Data
Jan. 17, 2020   (CN) .......................... 202010058434.2

(51) Int. Cl.
*G06F 3/04845*   (2022.01)
*G06F 3/04883*   (2022.01)

(52) U.S. Cl.
CPC ...... *G06F 3/04883* (2013.01); *G06F 3/04845* (2013.01)

(58) Field of Classification Search
CPC .................... G06F 3/04883; G06F 3/04845
See application file for complete search history.

(56) References Cited

U.S. PATENT DOCUMENTS

| 8,732,617 | B1 | 5/2014 | Armstrong et al. |
| 9,588,645 | B2 | 3/2017 | Heo |
| 10,304,163 | B2 | 5/2019 | Karunamuni et al. |

(Continued)

FOREIGN PATENT DOCUMENTS

| CN | 102591704 A | 7/2012 |
| CN | 102693120 A | 9/2012 |

(Continued)

OTHER PUBLICATIONS

Friedman Lex:"How to create and organizeiOS folders ; Macworld" MacWorld,Jun. 20, 2011 (Jun. 20, 2011) XP055690443,total:5pages.

(Continued)

*Primary Examiner* — Andrea C Leggett

(57) ABSTRACT

Embodiments of this application disclose a widget processing method and a related apparatus, to switch a target icon to a widget set including a plurality of widgets, so that a widget is quickly added on an electronic device. The method in embodiments of this application includes: An electronic device displays a target icon. The electronic device receives a first operation performed on the target icon. The electronic device switches the target icon to a widget set in response to the first operation. The widget set includes a plurality of widgets of a plurality of applications. The electronic device displays the widget set.

20 Claims, 73 Drawing Sheets

(56) References Cited

U.S. PATENT DOCUMENTS

| | | | |
|---|---|---|---|
| 10,386,995 B2 | 8/2019 | Sepulveda et al. | |
| 2009/0249231 A1 | 10/2009 | Mohr | |
| 2011/0055741 A1 | 3/2011 | Jeon et al. | |
| 2013/0139109 A1 | 5/2013 | Kim et al. | |
| 2013/0268875 A1* | 10/2013 | Han | G06F 3/04847 715/764 |
| 2013/0268877 A1* | 10/2013 | Han | G06F 3/04845 715/764 |
| 2015/0020036 A1 | 1/2015 | Kim et al. | |
| 2015/0346957 A1 | 12/2015 | Louch | |
| 2017/0147189 A1* | 5/2017 | Ryu | G06F 3/04886 |
| 2017/0228131 A1* | 8/2017 | Pandiaraj | G06F 3/0488 |
| 2018/0032229 A1 | 2/2018 | Louch et al. | |
| 2018/0165105 A1 | 6/2018 | Lu et al. | |

FOREIGN PATENT DOCUMENTS

| | | | |
|---|---|---|---|
| CN | 103139371 A | 6/2013 | |
| CN | 103279261 A | 9/2013 | |
| CN | 103605457 A | 2/2014 | |
| CN | 103793129 A | 5/2014 | |
| CN | 104142798 A | 11/2014 | |
| CN | 104714723 A | 6/2015 | |
| CN | 105283356 A | 1/2016 | |
| CN | 105426082 A | 3/2016 | |
| CN | 106020796 A | 10/2016 | |
| CN | 106325836 A | 1/2017 | |
| CN | 106527936 A | 3/2017 | |
| CN | 107092421 A | 8/2017 | |
| CN | 107526493 A | 12/2017 | |
| CN | 107992244 A | 5/2018 | |
| CN | 109426407 A | 3/2019 | |
| CN | 110096330 A | 8/2019 | |
| CN | 111240789 A | 6/2020 | |
| JP | 2015092410 A | 5/2015 | |
| KR | 20130100493 A | 9/2013 | |

OTHER PUBLICATIONS

Satoshi Iwao Latest version of super convenient techniques that can be used with Android standard functions (Mediax MOOK) Very convenient technology that can be used by the Android standard function; The latest edition: Convenient technique; pp. 30 to 31; Jan. 28, 2018, Mediax Inc., Japan.

Anonymous: "Software widget—Wikipedia", Nov. 26, 2019(Nov. 26, 2019), pp. 1-6, XP093232322.

Antcheva I et al: "Guidelines for Developing a Good GUI", Sep. 30, 2004 (Sep. 30, 2004), pp. 1-4, XP093232332.

Anonymous: "Contribution ID: 169 Type: oral presentation Guidelines for Developing a Good GUI",Sep. 30, 2004 (Sep. 30, 2004), pp. 1-1, XP093232335.

\* cited by examiner

US 12,346,553 B2

WIDGET PROCESSING METHOD AND RELATED APPARATUS

CROSS-REFERENCE TO RELATED APPLICATIONS

This application is a national stage of International Application No. PCT/CN2021/072026, filed on 15 Jan. 2021, which claims priority to Chinese Patent Application No. 202010058434.2, filed on Jan. 17, 2020. Both of the aforementioned applications are hereby incorporated by reference in their entireties.

TECHNICAL FIELD

This application relates to the field of terminal technologies, and in particular, to a widget processing method and a related apparatus.

BACKGROUND

A widget (Widget) is a micro application view that can be embedded into a home screen of an electronic device, and can support a user in previewing information or performing a shortcut operation on the view. Various widgets such as "clock", "weather", and "music player" may be usually displayed on the home screen of the electronic device.

Currently, when a widget is to be added on the home screen of the electronic device, a home screen editing interface of the electronic device usually needs to be entered, and then a control of the widget is tapped in a specific area of the home screen editing interface, to add the widget on the home screen. Consequently, operations are relatively cumbersome.

SUMMARY

Embodiments of this application provide a widget processing method and a related apparatus, to switch a target icon to a widget set including a plurality of widgets, so that a widget is quickly added on a home screen of an electronic device.

A first aspect of embodiments of this application provides a widget processing method. The method includes: An electronic device displays a target icon. A user may perform a first operation on the target icon. The electronic device receives the first operation performed on the target icon. The electronic device switches the target icon to a widget set in response to the first operation. The widget set includes a plurality of widgets of a plurality of applications. The electronic device displays the widget set. The target icon corresponds to the plurality of applications, and each of the plurality of applications corresponds to a widget. Therefore, the plurality of widgets of the plurality of applications corresponding to the target icon may be determined based on the target icon. In other words, when the target icon corresponds to the plurality of widgets, the electronic device may switch the target icon to the widget set including the plurality of widgets. By operating the target icon, the target icon is switched to the widget set including a plurality of widgets. Therefore, a plurality of different widgets can be displayed on the electronic device, and an operation is simple and quick.

In a possible manner of switching the target icon to the widget set, the electronic device receives a touch and hold operation performed on the target icon. The electronic device displays a frame at an edge of the target icon in response to the touch and hold operation, for example, displays, at the edge of the target icon, a frame that matches a size and a shape of the target icon. The electronic device receives a stretch operation performed on the frame. The electronic device switches the target icon to the widget set in response to the stretch operation.

The target icon may be an icon of an application or an icon of a folder.

When the target icon is an icon of a first application, the user may perform the first operation on the icon of the first application displayed on the electronic device, to switch the icon of the first application to the widget set. In this case, the plurality of applications include one or more applications associated with the first application. For example, the first application may be a wallet application, the wallet application may be associated with a plurality of payment-type applications, the electronic device may switch an icon of the wallet application to a widget set, and a plurality of widgets included in the widget set are widgets of the plurality of payment-type applications associated with the wallet application. In addition, the plurality of applications may further include the first application. For example, the plurality of applications may be the first application and another application of a same type as the first application. In other words, the plurality of widgets included in the widget set further include a widget of the first application. Categories of the first application include but are not limited to a payment category, an entertainment category, an education category, a reading category, and a health category. When the icon of the first application is switched to the widget set, the widget set includes widgets of the plurality of applications associated with the first application, so that the plurality of widgets related to the first application can be quickly added on the electronic device. This avoids a cumbersome process in which the user determines the plurality of applications associated with the first application and then adds the widgets corresponding to the plurality of applications one by one on the electronic device, and reduces user operations.

When the target icon is an icon of any folder, the user may perform the first operation on the icon of the folder displayed on the electronic device, to switch the icon of the folder to a widget set. In this case, the plurality of applications are a plurality of applications included in the folder, and the plurality of widgets included in the widget set are widgets of the applications in the folder. For example, the folder may include an application A and an application B. In this case, when the icon of the folder is switched to the widget set, the plurality of widgets included in the widget set are a widget of the application A and a widget of the application B. When the icon of the folder is switched to the widget set, the widget set includes the widgets of the plurality of applications in the folder, so that the widgets of the applications in the folder can be quickly added on the electronic device. This helps the user conveniently view or operate the widgets of the applications in the folder, avoids a cumbersome process in which the user adds the widgets of the applications in the folder one by one on the electronic device, and reduces user operations.

It may be understood that, when the widget set includes a relatively large quantity of widgets, it is possible that the widget set cannot display all the widgets in the widget set. In this case, the electronic device may determine, in the following several manners, widgets displayed in the widget set. For example, the electronic device may determine, in a sequence of using the widgets in the widget set, the widgets displayed in the widget set. To be specific, a display sequence of the last widget used by the user in the widget set is first, a display sequence of the last but one widget used by the user in the widget set is second, and so on. For another example, the electronic device may determine, based on a widget use frequency, the widgets displayed in the widget set. To be specific, within a specific time range (for example, one day or one week), a display sequence of a widget used by the user with the highest use frequency in the widget set is first, a display sequence of a widget used by the user with the second highest use frequency in the widget set is second, and so on. For another example, the electronic device may alternatively determine, through user-defined settings, the widgets displayed in the widget set.

In addition, the electronic device may change a widget displayed in the widget set. In a possible design, after the electronic device switches the target icon to the widget set, the method further includes: The electronic device receives a second operation performed on the widget set. In response to the second operation, the electronic device changes a widget displayed in the widget set. The second operation may specifically include a slide operation.

In a possible manner, the electronic device may sequentially change the widgets displayed in the widget set, and the electronic device may determine, based on use time, use frequencies, or application types, a sequence of the plurality of widgets included in the widget set.

In another possible manner, the electronic device may determine, based on a direction of the slide operation, a manner of changing a widget displayed in the widget set. Specifically, if the second operation is a slide operation in a first direction, the electronic device changes a first widget displayed in the widget set to a second widget of a same type as the first widget. It should be noted that, that a widget A and a widget B are of a same type means that an application A corresponding to the widget A and an application B corresponding to the widget B are of a same type. Specifically, if the second operation is a slide operation in a second direction, the electronic device changes a first widget displayed in the widget set to a third widget of a different type from the first widget. When a plurality of applications are of different types, the user may quickly change a to-be-displayed widget.

The foregoing two manners of changing a widget displayed in the widget set may be combined.

In a possible design, after the electronic device switches the target icon to the widget set, the method may further include: The electronic device receives a third operation performed on a target widget. The target widget is a widget displayed in the widget set. In response to the third operation, the electronic device displays an application interface corresponding to the target widget. The third operation may be specifically a tap operation. In other words, in response to the tap operation performed on the target widget displayed in the widget set, the electronic device may display the application interface corresponding to the target widget.

In a possible design, after the electronic device switches the target icon to the widget set, the method may further include: The electronic device receives a fourth operation performed on the widget set, and the electronic device switches the widget set to the target icon in response to the fourth operation. Specifically, the electronic device receives a touch and hold gesture operation performed on the widget set, the electronic device displays a frame at an edge of the widget set in response to the touch and hold gesture operation, the electronic device receives a scale down gesture operation performed on the frame, and the electronic device switches the widget set to the target icon in response to the scale down gesture operation. The widget set can be switched to the target icon by performing the fourth operation. Therefore, when the user does not need to use a widget, a widget set that occupies larger space can be switched to a target icon that occupies relatively small space. This saves space in a display region of the electronic device.

In a possible design, after the electronic device switches the target icon to the widget set, the method may further include: The electronic device receives a fifth operation performed on the widget set, and the electronic device changes a size of a display region of the widget set in response to the fifth operation, for example, changes a widget set with a relatively small display region to a widget set with a relatively large display region, or changes a widget set with a relatively large display region to a widget set with a relatively small display region.

A second aspect of embodiments of this application provides an electronic device, including a display, a processor, and a memory. The memory is configured to store a computer program, the computer program includes instructions, and when the instructions are executed by the processor, the electronic device is enabled to perform the following steps: The electronic device displays a target icon. A user may perform a first operation on the target icon. The electronic device receives the first operation performed on the target icon. The electronic device switches the target icon to a widget set in response to the first operation. The widget set includes a plurality of widgets of a plurality of applications. The electronic device displays the widget set. The target icon corresponds to the plurality of applications, and each of the plurality of applications corresponds to a widget. Therefore, the plurality of widgets of the plurality of applications corresponding to the target icon may be determined based on the target icon. In other words, when the target icon corresponds to the plurality of widgets, the electronic device may switch the target icon to the widget set including the plurality of widgets.

In a possible manner of switching the target icon to the widget set, the electronic device receives a touch and hold operation performed on the target icon. The electronic device displays a frame at an edge of the target icon in response to the touch and hold operation, for example, displays, at the edge of the target icon, a frame that matches a size and a shape of the target icon. The electronic device receives a stretch operation performed on the frame. The electronic device switches the target icon to the widget set in response to the stretch operation.

The target icon may be an icon of an application or an icon of a folder.

When the target icon is an icon of a first application, after the user performs the first operation on the icon of the first application displayed on the electronic device, the electronic device switches the icon of the first application to the widget set. In this case, the plurality of applications include one or more applications associated with the first application. For example, the first application may be a wallet application, the wallet application may be associated with a plurality of payment-type applications, the electronic device may switch an icon of the wallet application to a widget set, and a plurality of widgets included in the widget set are widgets of the plurality of payment-type applications associated with the wallet application. In addition, the plurality of applications may further include the first application. For example, the plurality of applications may be the first application and another application of a same type as the first application. In other words, the plurality of widgets included in the widget set further include a widget of the first application. Categories of the first application include but are not limited to a payment category, an entertainment category, an education category, a reading category, and a health category.

When the target icon is an icon of any folder, after the user performs the first operation on the icon of the folder displayed on the electronic device, the electronic device switches the icon of the folder to a widget set. In this case, the plurality of applications are a plurality of applications included in the folder, and the plurality of widgets included in the widget set are widgets of the applications in the folder. For example, the folder may include an application A and an application B. In this case, when the icon of the folder is switched to the widget set, the plurality of widgets included in the widget set are a widget of the application A and a widget of the application B.

It may be understood that, when the widget set includes a relatively large quantity of widgets, it is possible that the widget set cannot display all the widgets in the widget set. In this case, the electronic device may determine, in the following several manners, widgets displayed in the widget set. For example, the electronic device may determine, in a sequence of using the widgets in the widget set, the widgets displayed in the widget set. To be specific, a display sequence of the last widget used by the user in the widget set is first, a display sequence of the last but one widget used by the user in the widget set is second, and so on. For another example, the electronic device may determine, based on a widget use frequency, the widgets displayed in the widget set. To be specific, within a specific time range (for example, one day or one week), a display sequence of a widget used by the user with the highest use frequency in the widget set is first, a display sequence of a widget used by the user with the second highest use frequency in the widget set is second, and so on. For another example, the electronic device may alternatively determine, through user-defined settings, the widgets displayed in the widget set.

In addition, when the instructions are executed by the processor, the electronic device may be further enabled to perform the following step: The electronic device may change a widget displayed in the widget set. In a possible design, after the electronic device switches the target icon to the widget set, the method further includes: The electronic device receives a second operation performed on the widget set. In response to the second operation, the electronic device changes a widget displayed in the widget set. The second operation may specifically include a slide operation.

In a possible manner, the electronic device may sequentially change the widgets displayed in the widget set, and the electronic device may determine, based on use frequencies, types, or the like, a sequence of the plurality of widgets included in the widget set.

In another possible manner, when the instructions are executed by the processor, the electronic device may be further enabled to perform the following step: The electronic device may determine, based on a direction of the slide operation, a manner of changing a widget displayed in the widget set. Specifically, if the second operation is a slide operation in a first direction, the electronic device changes a first widget displayed in the widget set to a second widget of a same type as the first widget. It should be noted that, that a widget A and a widget B are of a same type means that an application A corresponding to the widget A and an application B corresponding to the widget B are of a same type. Specifically, if the second operation is a slide operation in a second direction, the electronic device changes a first widget displayed in the widget set to a third widget of a different type from the first widget. When a plurality of applications are of different types, the user may quickly change a to-be-displayed widget.

The foregoing two manners of changing a widget displayed in the widget set may be combined.

In a possible design, when the instructions are executed by the processor, the electronic device may be further enabled to perform the following steps: After the electronic device switches the target icon to the widget set, the electronic device receives a third operation performed on a target widget. The target widget is a widget displayed in the widget set. In response to the third operation, the electronic device displays an application interface corresponding to the target widget. The third operation may be specifically a tap operation. In other words, in response to the tap operation performed on the target widget displayed in the widget set, the electronic device may display the application interface corresponding to the target widget.

In a possible design, when the instructions are executed by the processor, the electronic device may be further enabled to perform the following steps: After the electronic device switches the target icon to the widget set, the electronic device receives a fourth operation performed on the widget set, and the electronic device switches the widget set to the target icon in response to the fourth operation. Specifically, the electronic device receives a touch and hold gesture operation performed on the widget set, the electronic device displays a frame at an edge of the widget set in response to the touch and hold gesture operation, the electronic device receives a scale down gesture operation performed on the frame, and the electronic device switches the widget set to the target icon in response to the scale down gesture operation.

In a possible design, when the instructions are executed by the processor, the electronic device may be further enabled to perform the following steps: After the electronic device switches the target icon to the widget set, the electronic device receives a fifth operation performed on the widget set, and the electronic device changes a size of a display region of the widget set in response to the fifth operation, for example, changes a widget set with a relatively small display region to a widget set with a relatively large display region, or changes a widget set with a relatively large display region to a widget set with a relatively small display region.

A third aspect of embodiments of this application provides a computer program product including instructions. When the instructions are run on a computer, the computer is enabled to perform the method according to any one of the implementations of the first aspect.

A fourth aspect of embodiments of this application provides a computer-readable storage medium, including computer program instructions. When the computer program instructions are run on a computer, the computer is enabled to perform the method according to any one of the implementations of the first aspect.

It may be understood that the electronic device according to the second aspect, the computer program product according to the third aspect, and the computer-readable storage medium according to the fourth aspect are all configured to perform the corresponding method provided above. Therefore, for beneficial effects that can be achieved by the electronic device, the computer program product, and the computer-readable storage medium, refer to the beneficial effects in the corresponding method provided above. Details are not described again herein.

DESCRIPTION OF EMBODIMENTS

The following describes technical solutions in embodiments of this application with reference to the accompanying drawings in embodiments of this application. In the descriptions of embodiments of this application, "/" means "or" unless otherwise specified. For example, A/B may represent A or B. In this specification, "and/or" describes only an association relationship between associated objects and represents that three relationships may exist. For example, A and/or B may represent the following three cases: Only A exists, both A and B exist, and only B exists. In addition, in the descriptions of embodiments of this application, "a plurality of" means two or more than two.

The following terms "first" and "second" are merely intended for a purpose of description, and shall not be understood as an indication or implication of relative importance or implicit indication of a quantity of indicated technical features. Therefore, a feature limited by "first" or "second" may explicitly or implicitly include one or more features. In the descriptions of embodiments, unless otherwise specified, "a plurality of" means two or more than two.

A method provided in embodiments of this application may be applied to an electronic device. The electronic device may include a device such as a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). A specific type of the electronic device is not limited in embodiments of this application.

Figure 1:
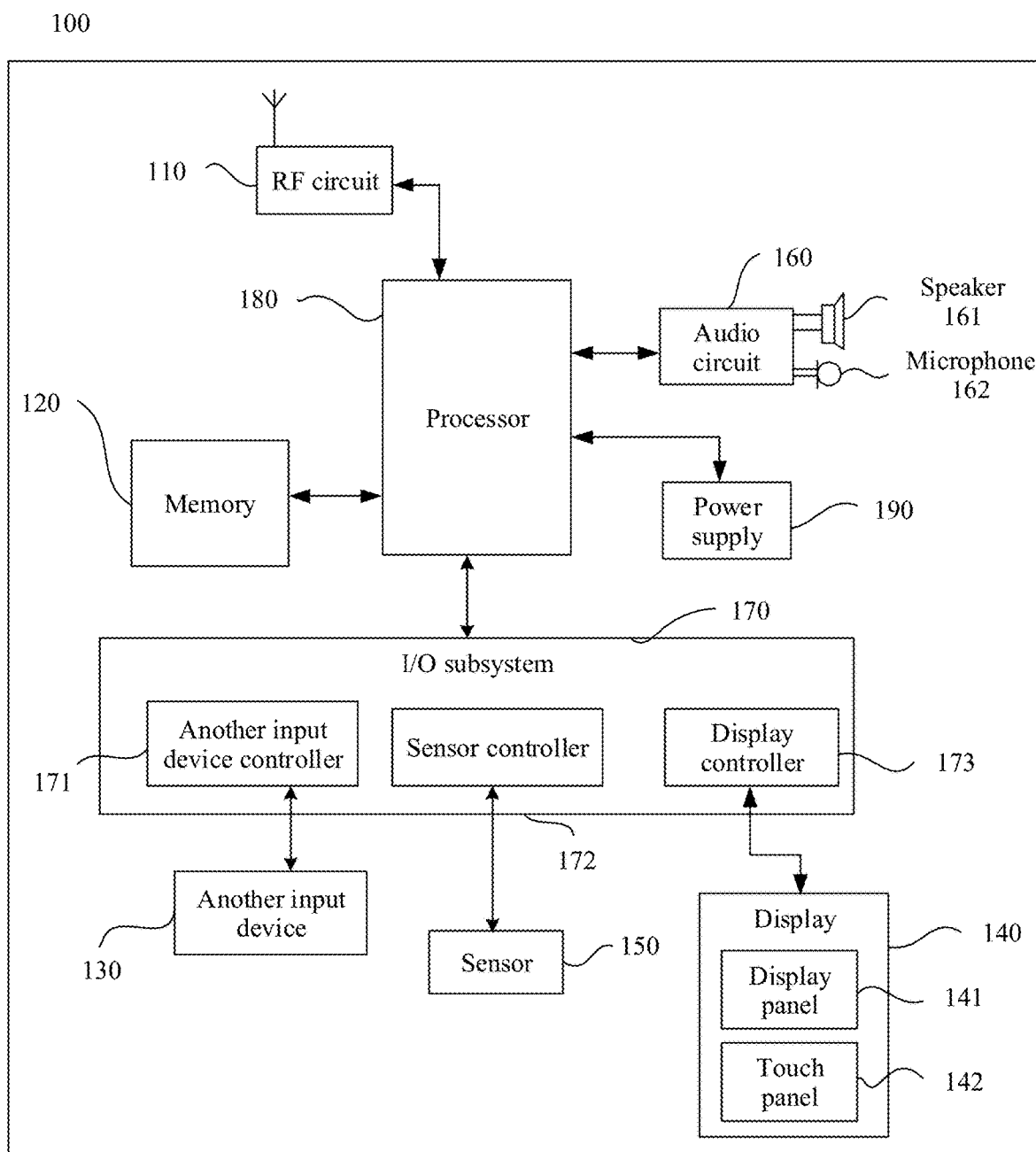
FIG. 1 is a schematic diagram of a structure of an electronic device according to an embodiment of this application.

For example, the electronic device is a mobile phone. FIG. 1 is a block diagram of a partial structure of a mobile phone 100 related to an embodiment of this application. As shown in FIG. 1, the mobile phone 100 includes components such as a radio frequency (radio frequency, RF) circuit 110, a memory 120, another input device 130, a display 140, a sensor 150, an audio circuit 160, an I/O subsystem 170, a processor 180, and a power supply 190. A person skilled in the art may understand that the structure of the mobile phone shown in FIG. 1 does not constitute a limitation on the mobile phone. The mobile phone may include more or fewer components than those shown in the figure, or combine some components, or split some components, or have different component arrangements. A person skilled in the art may understand that the display 140 belongs to a user interface (User Interface, UI), and the mobile phone 100 may include more or fewer user interfaces than those shown in the figure.

The following describes in detail each component of the mobile phone 100 with reference to FIG. 1.

The RF circuit 110 may be configured to receive and send a signal in an information receiving or sending process or a call process. Particularly, after receiving downlink information from a base station, the RF circuit sends the downlink information to the processor 180 for processing. In addition, the RF circuit sends designed uplink data to the base station. Generally, the RF circuit includes but is not limited to an antenna, at least one amplifier, a transceiver, a coupler, a low noise amplifier (low noise amplifier, LNA), a duplexer, and the like. In addition, the RF circuit 110 may further communicate with a network and another device through wireless communication. The wireless communication may use any communications standard or protocol, including but not limited to global system for mobile communications (global system for mobile communications, GSM), a general packet radio service (general packet radio service, GPRS), code division multiple access (code division multiple access, CDMA), wideband code division multiple access (wideband code division multiple access, WCDMA), long term evolution (long term evolution, LTE), an email, a short message service (short message service, SMS), and the like.

The memory 120 may be configured to store a software program and a module. The processor 180 runs the software program and the module that are stored in the memory 120, to perform various function applications of the mobile phone 100 and process data. The memory 120 may mainly include a program storage area and a data storage area. The program storage area may store an operating system, an application required by at least one function (such as a sound play function and an image play function), and the like. The data storage area may store data (such as audio data and a phone book) created when the mobile phone 100 is used, and the like. In addition, the memory 120 may include a high-speed random access memory, or may include a nonvolatile memory, such as at least one magnetic disk storage device, a flash memory, or another volatile solid-state storage device.

The another input device 130 may be configured to: receive input digital or character information, and generate a key signal input that is related to user settings and function control of the mobile phone 100. Specifically, the another input device 130 may include but is not limited to one or more of a physical keyboard, a function button (for example, a volume control button or an on/off button), a trackball, a mouse, a joystick, an optical mouse (the optical mouse is a touch-sensitive surface that does not display a visual output, or is an extension of a touch-sensitive surface that includes a touchscreen), and the like. The another input device 130 is connected to another input device controller 171 of the I/O subsystem 170, and performs signal interaction with the processor 180 under control of the another input device controller 171.

The display 140 may be configured to display information entered by a user or information provided for a user, and various menus of the mobile phone 100, and may further receive a user input. Specifically, the display 140 may include a display panel 141 and a touch panel 142. The display panel 141 may be configured in a form of a liquid crystal display (liquid crystal display, LCD), an organic light-emitting diode (organic light-emitting diode, OLED), or the like. The touch panel 142, also referred to as a touchscreen, a touch-sensitive screen, or the like, may collect a contact or non-contact operation of the user on or near the touch panel 142 (such as an operation of the user on or near the touch panel 142 by using any suitable object or accessory such as a finger or a stylus, or a motion sensing operation. The operation includes a single-point control operation, a multi-point control operation, or another type of operation), and drive a corresponding connection apparatus based on a preset program. Optionally, the touch panel 142 may include two parts: a touch detection apparatus and a touch controller. The touch detection apparatus detects a touch orientation and posture of the user, detects a signal brought by a touch operation, and transfers the signal to the touch controller. The touch controller receives touch information from the touch detection apparatus, converts the touch information into information that can be processed by the processor, and then sends the information to the processor 180. The touch controller can also receive and execute a command sent by the processor 180. In addition, the touch panel 142 may be implemented by using a plurality of types such as a resistive type, a capacitive type, an infrared type, and a surface acoustic wave type, or the touch panel 142 may be implemented by using any technology developed in the future. Further, the touch panel 142 may cover the display panel 141. The user may perform, based on content displayed on the display panel 141 (the displayed content includes but is not limited to a soft keyboard, a virtual mouse, a virtual button, an icon, and the like), an operation on or near the touch panel 142 covered by the display panel 141. After detecting a touch operation performed on or near the touch panel 142, the touch panel 142 transfers the touch operation to the processor 180 by using the I/O subsystem 170, so as to determine a touch event type to determine a user input. Then, the processor 180 provides a corresponding visual output on the display panel 141 based on the touch event type and the user input by using the I/O subsystem 170. In FIG. 1, the touch panel 142 and the display panel 141 are used as two independent components to implement input and input functions of the mobile phone 100. However, in some embodiments, the touch panel 142 and the display panel 141 may be integrated to implement the input and output functions of the mobile phone 100.

The mobile phone 100 may further include at least one type of sensor 150, for example, a light sensor, a motion sensor, and another sensor. Specifically, the light sensor may include an ambient light sensor and a proximity sensor. The ambient light sensor may adjust luminance of the display panel 141 based on brightness of ambient light. The proximity sensor may turn off the display panel 141 and/or backlight when the mobile phone 100 moves to the ear. As a motion sensor, an accelerometer sensor may detect a value of an acceleration in various directions (usually on three axes), may detect a value and a direction of gravity when the mobile phone is still, and may be applied to an application for recognizing a posture of the mobile phone (for example, switching between a landscape mode and a portrait mode, a related game, or magnetometer posture calibration), a function related to vibration recognition (for example, a pedometer or a keystroke), and the like. For another sensor that may be further configured on the mobile phone 100, for example, a gyroscope, a barometer, a hygrometer, a thermometer, or an infrared sensor, details are not described herein.

The audio circuit 160, a speaker 161, and a microphone 162 may provide an audio interface between the user and the mobile phone 100. The audio circuit 160 may transmit, to the speaker 161, a signal that is converted from received audio data. The speaker 161 converts the signal into a sound signal for output. In addition, the microphone 162 converts a collected sound signal into a signal. The audio circuit 160 receives the signal, converts the signal into audio data, and then outputs the audio data to the RF circuit 108, so as to send the audio data to, for example, another mobile phone, or outputs the audio data to the memory 120 for further processing.

The I/O subsystem 170 is configured to control an external device for input and output, and may include the another input device controller 171, a sensor controller 172, and a display controller 173. Optionally, one or more another input control device controllers 171 receive a signal from the another input device 130 and/or send a signal to the another input device 130. The another input device 130 may include a physical button (a press button, a rocker button, or the like), a dial, a slider switch, a joystick, a click scroll wheel, and an optical mouse (the optical mouse is a touch-sensitive surface that does not display a visual output, or is an extension of a touch-sensitive surface that includes a touchscreen). It should be noted that the another input control device controller 171 may be connected to any one or more of the foregoing devices. The display controller 173 in the I/O subsystem 170 receives a signal from the display 140 or sends a signal to the display 140. After the display 140 detects the user input, the display controller 173 converts the detected user input into interaction with a user interface object displayed on the display 140, to implement human-machine interaction. The sensor controller 172 may receive a signal from one or more sensors 150 and/or send a signal to one or more sensors 150.

The processor 180 is a control center of the mobile phone 100, and is connected to each part of the mobile phone through various interfaces and lines. The processor performs various functions of the mobile phone 100 and processes data by running or executing the software program and/or module stored in the memory 120 and invoking data stored in the memory 120, so as to perform overall monitoring on the mobile phone. Optionally, the processor 180 may include one or more processing units. Preferably, the processor 180 may integrate an application processor and a modem processor. The application processor mainly processes an operating system, a user interface, an application, and the like. The modem processor mainly processes wireless communication. It may be understood that the foregoing modem processor may be not integrated into the processor 180.

The mobile phone 100 further includes the power supply 190 that supplies power to each component (for example, a battery). Optionally, the power supply may be logically connected to the processor 180 through a power management system, so as to implement functions such as charging management, discharging management, and power consumption management through the power management system.

The mobile phone 100 may further include a camera, a Bluetooth module, and the like although they are not shown in the figure. Details are not described herein.

Currently, when the user needs to add a widget to a home screen of the electronic device, the user usually needs to pinch and stretch or touch and hold the home screen of the electronic device to enter a home screen editing interface of the electronic device, and then taps a control of the widget on a toolbar at the bottom of the home screen editing interface to add the widget to the home screen. When the user needs to add a plurality of different widgets, the user usually further needs to perform slide selection on the toolbar, to select, from a plurality of widgets on the toolbar, the widgets that need to be added. An operation manner is cumbersome, and it is inconvenient for the user to add a widget.

In view of this, embodiments of this application provide a widget processing method. By operating a target icon on a home screen of an electronic device, the target icon may be switched to a widget, so that a widget can be quickly added on the home screen of the electronic device, and an operation is simple and quick. In addition, when the target icon corresponds to a plurality of widgets, by operating the target icon, the target icon may be switched to a widget set including the plurality of widgets. Therefore, a plurality of different widgets are added on the home screen of the electronic device.

The following describes in detail the widget processing method provided in embodiments of this application with reference to the accompanying drawings. For ease of description, the following uses an example in which the electronic device is a mobile phone for description.

Figure 2:
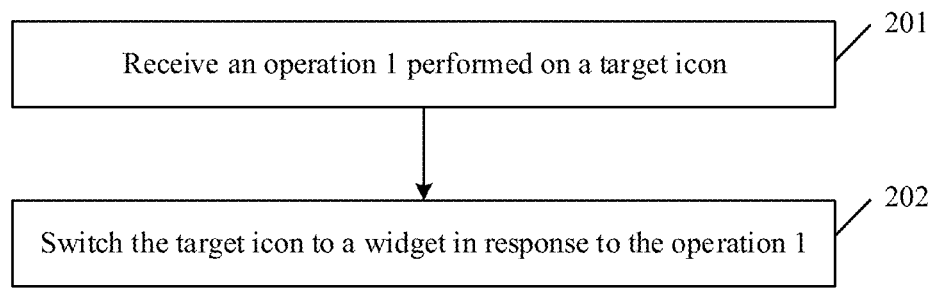
FIG. 2 is a schematic flowchart of a widget processing method according to an embodiment of this application.

FIG. 2 is a schematic flowchart of a widget processing method according to an embodiment of this application. As shown in FIG. 2, the widget processing method may include the following steps.

201: A mobile phone receives an operation 1 on a target icon.

When a user needs to add a widget on a home screen of the mobile phone, the user may perform the operation 1 on the target icon on the home screen of the mobile phone, so as to trigger the mobile phone to switch the target icon to a widget. In other words, the operation 1 is used to switch the target icon to a widget. The operation 1 may be a preset gesture operation or a voice instruction entered by the user. The operation 1 is not limited in this embodiment of this application.

The target icon includes an icon that may be set on the home screen of the mobile phone, such as an icon of an application or an icon of a folder, and is used as a shortcut for entering the application or the folder. Alternatively, the target icon may be an icon on another interface. For example, the target icon may further include a button icon on a control center interface, and is used as a shortcut for enabling a function. The target icon is not limited in this embodiment of this application.

In a possible implementation, the target icon may be an icon of an application on the home screen of the mobile phone, and the preset gesture entered by the user may be a touch and hold gesture operation and a stretch gesture operation. For example, as shown in FIG. 3(*a*), an icon of "Wallet" (referred to as a wallet icon below) is displayed on the home screen of the mobile phone. The user may touch and hold the wallet icon, and the mobile phone receives the touch and hold gesture operation performed by the user on the wallet icon. As shown in FIG. 3(*b*), the mobile phone displays a frame around the wallet icon in response to the touch and hold gesture operation performed by the user on the wallet icon. The frame is used to indicate the user to stretch the frame. The user may tap the frame around the wallet icon, and stretch the frame. The mobile phone receives the stretch gesture operation performed by the user on the frame around the wallet icon. In other words, the mobile phone receives the operation 1 performed on the wallet icon.

In a possible implementation, the voice instruction entered by the user may be a segment of voice for the target icon. For example, the user may enter voice "switch the wallet icon to a widget set". When the mobile phone receives, by using a microphone, the voice entered by the user, the mobile phone receives the operation 1 performed on the wallet icon.

202: The mobile phone switches the target icon to a widget in response to the operation 1.

When the target icon corresponds to one widget, the target icon is switched to the one widget.

When the target icon corresponds to a plurality of widgets, the target icon is switched to a widget set. The widget set includes a plurality of widgets, and the plurality of widgets respectively correspond to a plurality of applications.

The widget may be a micro application view embedded on the home screen of the mobile phone, or the widget may be another micro window that is embedded on a display interface of the mobile phone and that includes application information, for example, a card. In other words, the widget is a display mode used to display the application information on the display interface of the mobile phone, or the widget may be another display mode. A specific display mode of the widget is not limited in this embodiment of this application.

Specifically, after the mobile phone receives the operation 1 performed by the user on the target icon on the home screen, the mobile phone switches the target icon on the home screen to a widget set in response to the operation 1. The widget set includes a plurality of different widgets. The mobile phone may display one or more widgets in the widget set in a display region occupied by the widget set.

Figure 3A:
FIG. 3(a) to FIG. 3(f) are a schematic diagram of a group of display interfaces according to an embodiment of this application.
Figure 3B:
Figure 3C:
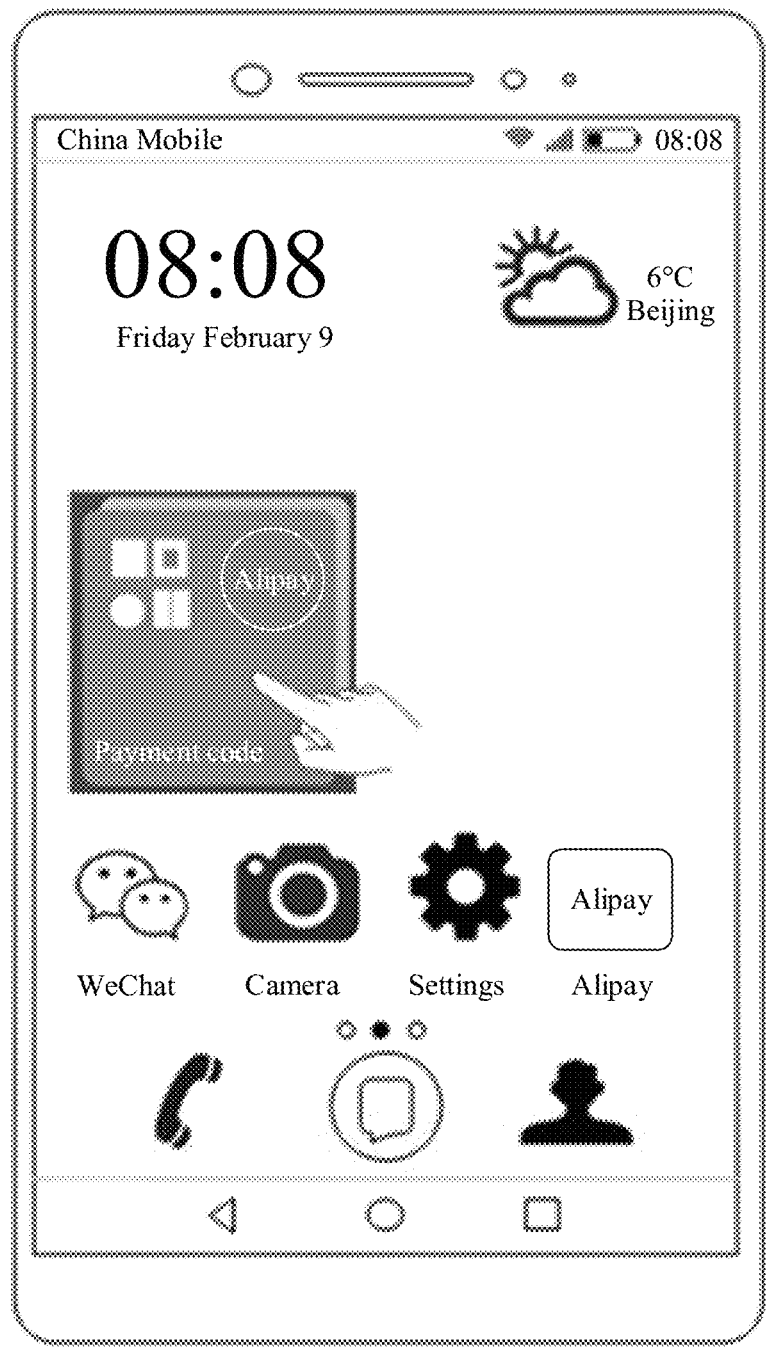

For example, as shown in FIG. 3(c), the wallet icon is associated with an "Alipay payment code" widget and a "WeChat payment code" widget. In this case, in response to the operation 1 performed by the user on the wallet icon, the mobile phone switches the wallet icon to a widget set including the "Alipay payment code" widget and the "WeChat payment code" widget.

It should be noted that an implementation in which the mobile phone switches the target icon to the widget set includes but is not limited to the following: After the mobile phone receives the operation 1, a home screen process on the mobile phone determines a plurality of widgets associated with applications corresponding to the target icon, and binds the plurality of widgets to an AppWidgetHost container, so as to display the widget set on the home screen. The AppWidgetHost container is configured to accommodate a widget and display a widget in the container on the home screen. In the AppWidgetHost container, the plurality of widgets in the widget set may be stacked from the top to the bottom.

Figure 3D:
Figure 3E:
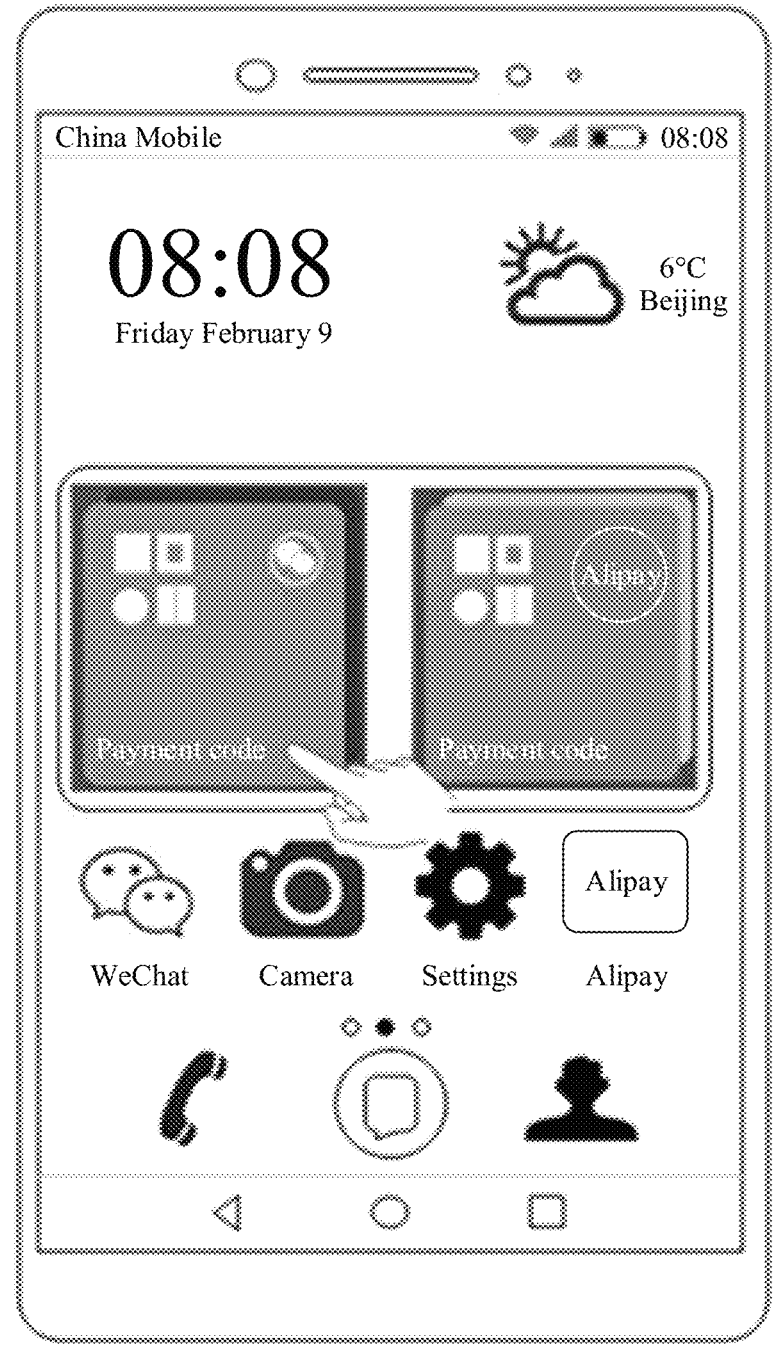

It may be understood that the mobile phone may display one widget in the widget set in the display region occupied by the widget set. For example, as shown in FIG. 3(c), the mobile phone displays the "Alipay payment code" widget in the widget set in the display region of the widget set. Alternatively, the mobile phone may display a plurality of widgets in the widget set in the display region occupied by the widget set. For example, as shown in FIG. 3(e), the mobile phone displays the "Alipay payment code" widget and the "WeChat payment code" widget in the widget set in the display region of the widget set.

In some embodiments, after the mobile phone switches the target icon to the widget set, the mobile phone may receive an operation 2 performed on a target widget. The target widget may be a widget in the widget set. In response to the operation 2, the mobile phone enters an application interface corresponding to the target widget. In other words, the operation 2 is used to display the application interface corresponding to the target widget. The operation 2 may be a preset gesture operation or a voice instruction entered by the user. For example, the preset gesture entered by the user may be any one of a tap gesture, a pressure recognition gesture, a touch and hold gesture, an area change gesture, a double-press gesture, and a double-tap gesture.

Figure 3F:
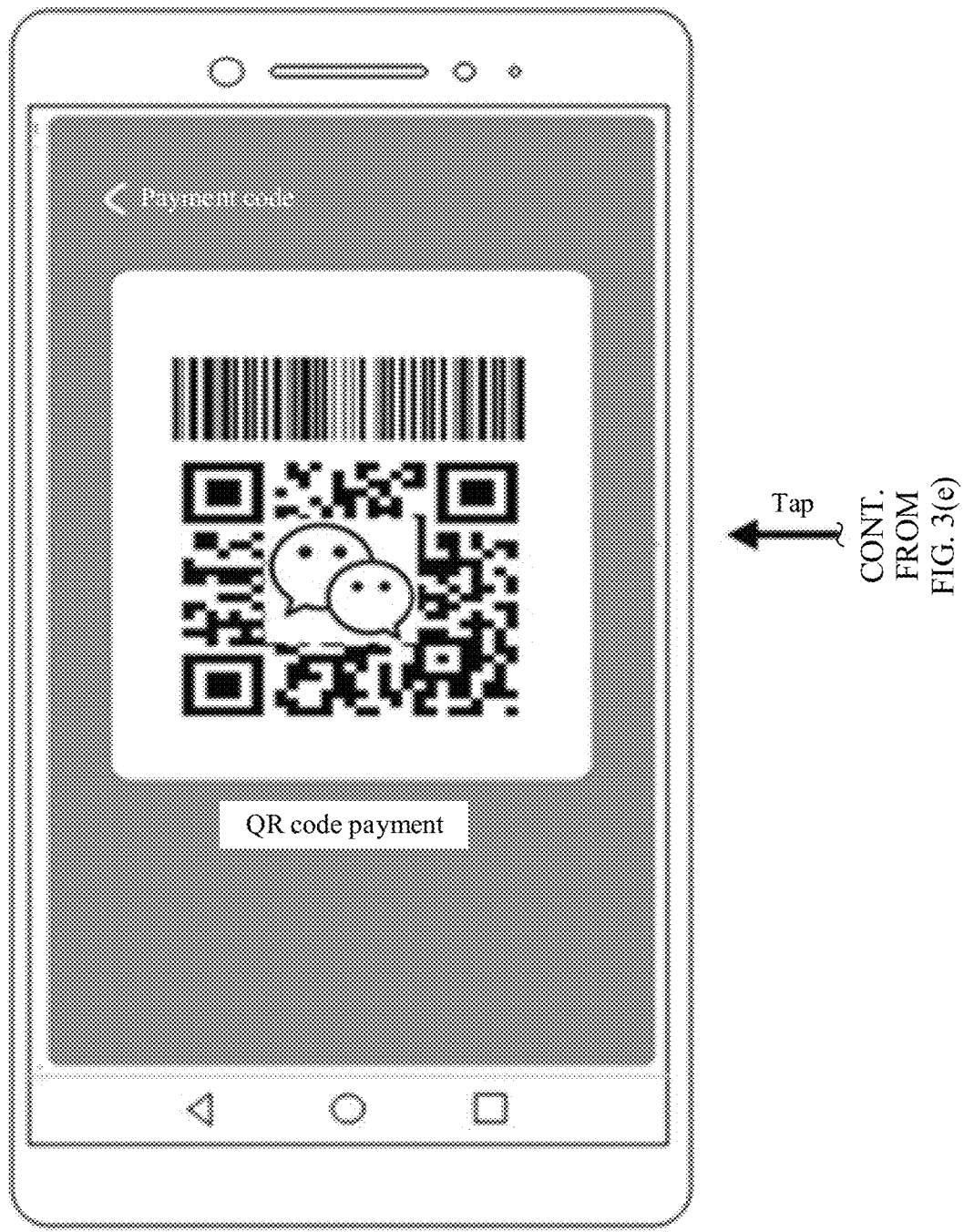

In a possible implementation, the preset gesture entered by the user may be a tap gesture. For example, in response to the operation 2 that the user taps the "Alipay payment code" widget displayed in the widget set in FIG. 3(c), as shown in FIG. 3(d), the mobile phone enters a payment interface corresponding to the "Alipay payment code" widget, in other words, displays a corresponding payment code in "Alipay" in a two-dimensional code form. For another example, in response to the operation 2 that the user taps the "WeChat payment code" widget displayed in the widget set in FIG. 3(e), as shown in FIG. 3(f), the mobile phone enters a payment collection interface corresponding to the "WeChat payment code" widget, in other words, displays a corresponding payment code in "WeChat" in a two-dimensional code form.

It may be understood that the user usually frequently uses functions of some applications in the mobile phone in daily life. For example, for payment functions of different payment applications in the mobile phone, when purchasing a commodity or consuming in a restaurant, the user may need to use a payment function of "Alipay" in the mobile phone, to be specific, need to present a payment interface of "Alipay" to a merchant. When performing a transaction with another user, the user may alternatively need to use a payment collection or payment function of "WeChat" in the mobile phone, to be specific, need to display a payment collection or payment interface of "WeChat" to the another user. In this embodiment, by receiving the operation 1, the mobile phone switches the wallet icon to the widget set including a plurality of widgets. Therefore, a plurality of widgets can be quickly and simply added on the home screen of the mobile phone. This can help the user operate a widget on the home screen and quickly enter a corresponding application interface.

When space used to display the widget set is relatively small, in other words, when an area of the display region occupied by the widget set is relatively small, the widget set may not be able to simultaneously display all widgets in the widget set on the home screen of the mobile phone. To help the user preview or operate another widget that is not displayed in the widget set, in response to an operation 3 performed by the user on the widget set, the mobile phone may change a widget displayed in the widget set. In other words, the operation 3 is used to change a widget displayed in the widget set.

Figure 4A:
FIG. 4(a) to FIG. 4(f) are a schematic diagram of another group of display interfaces according to an embodiment of this application.
Figure 4B:
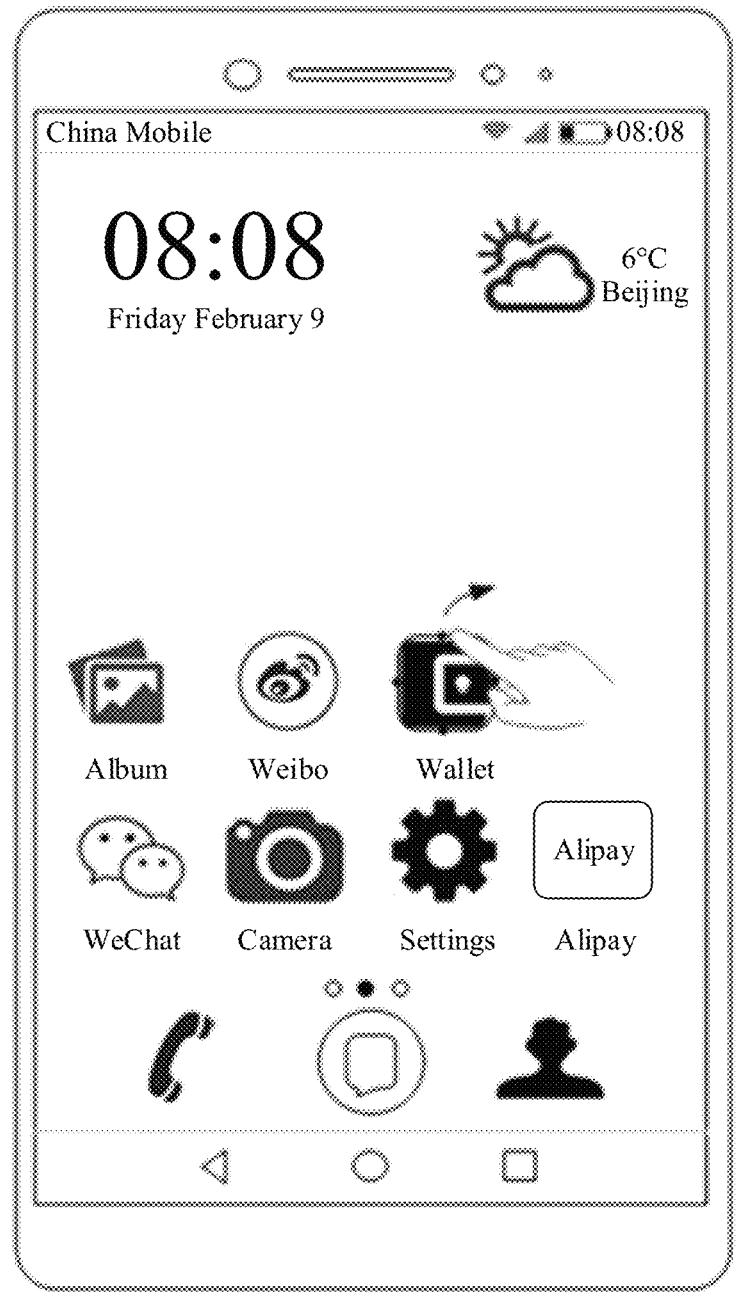
Figure 4C:
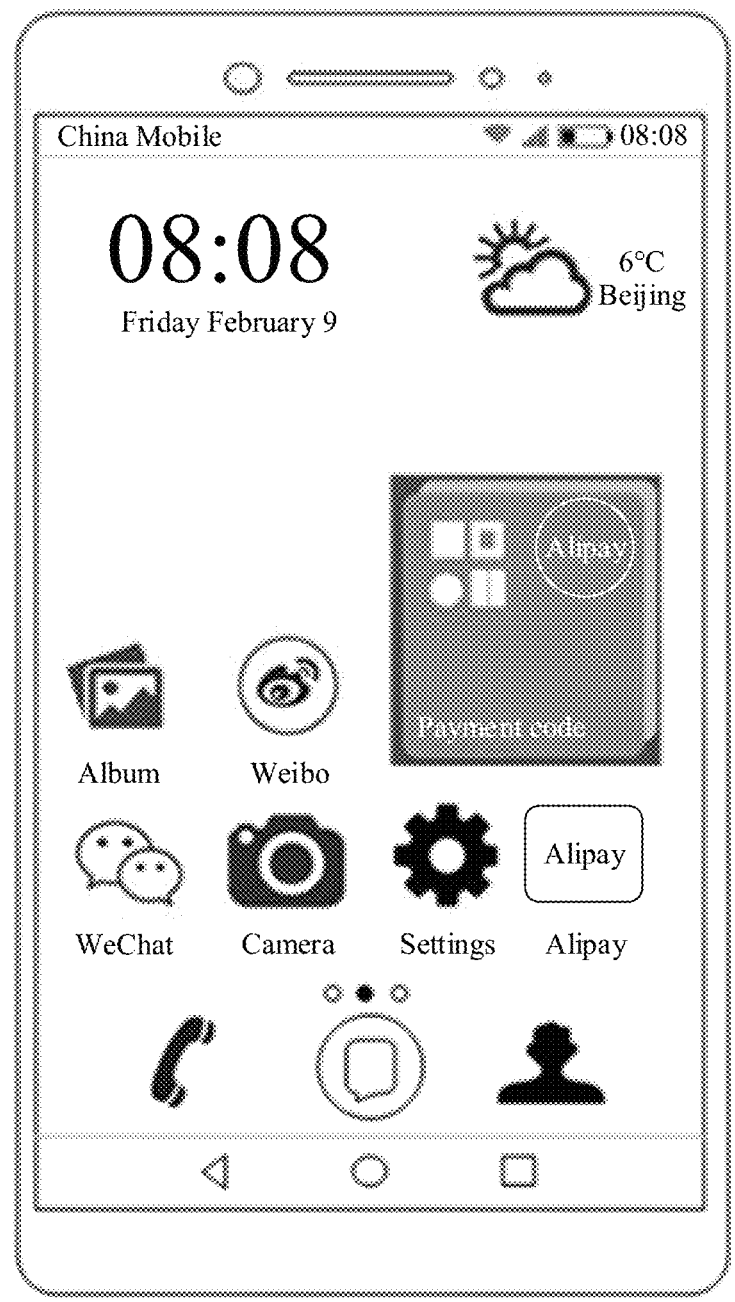
Figure 4D:
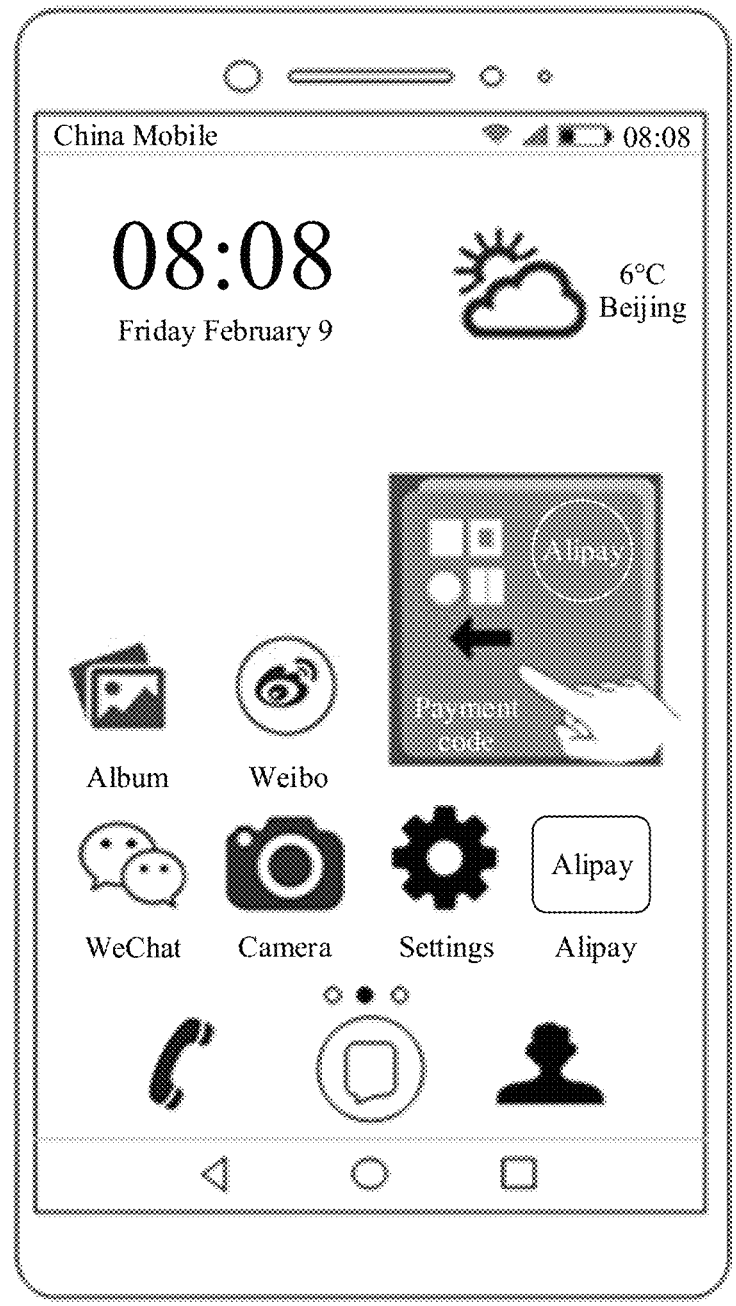
Figure 4E:
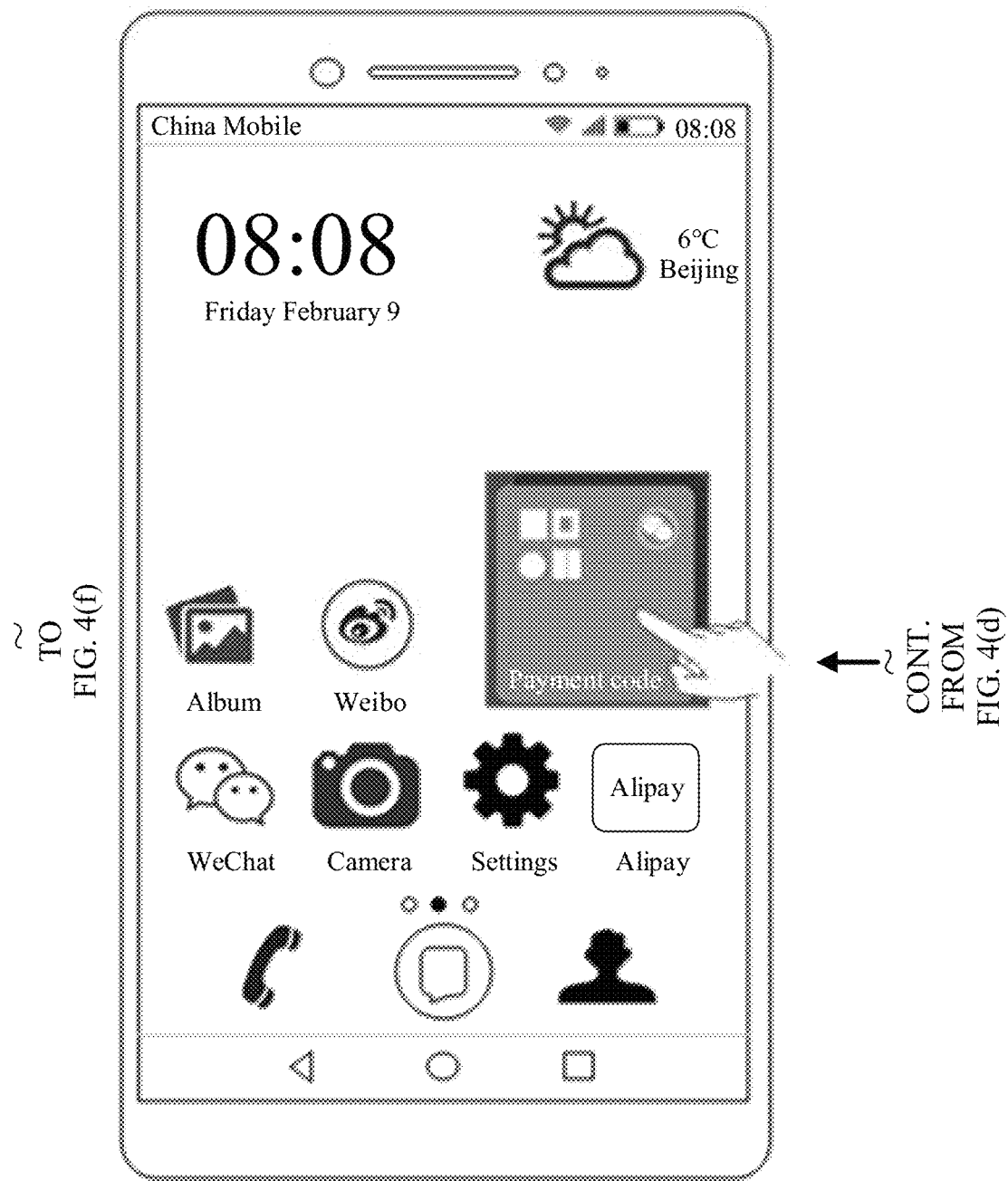
Figure 4F:
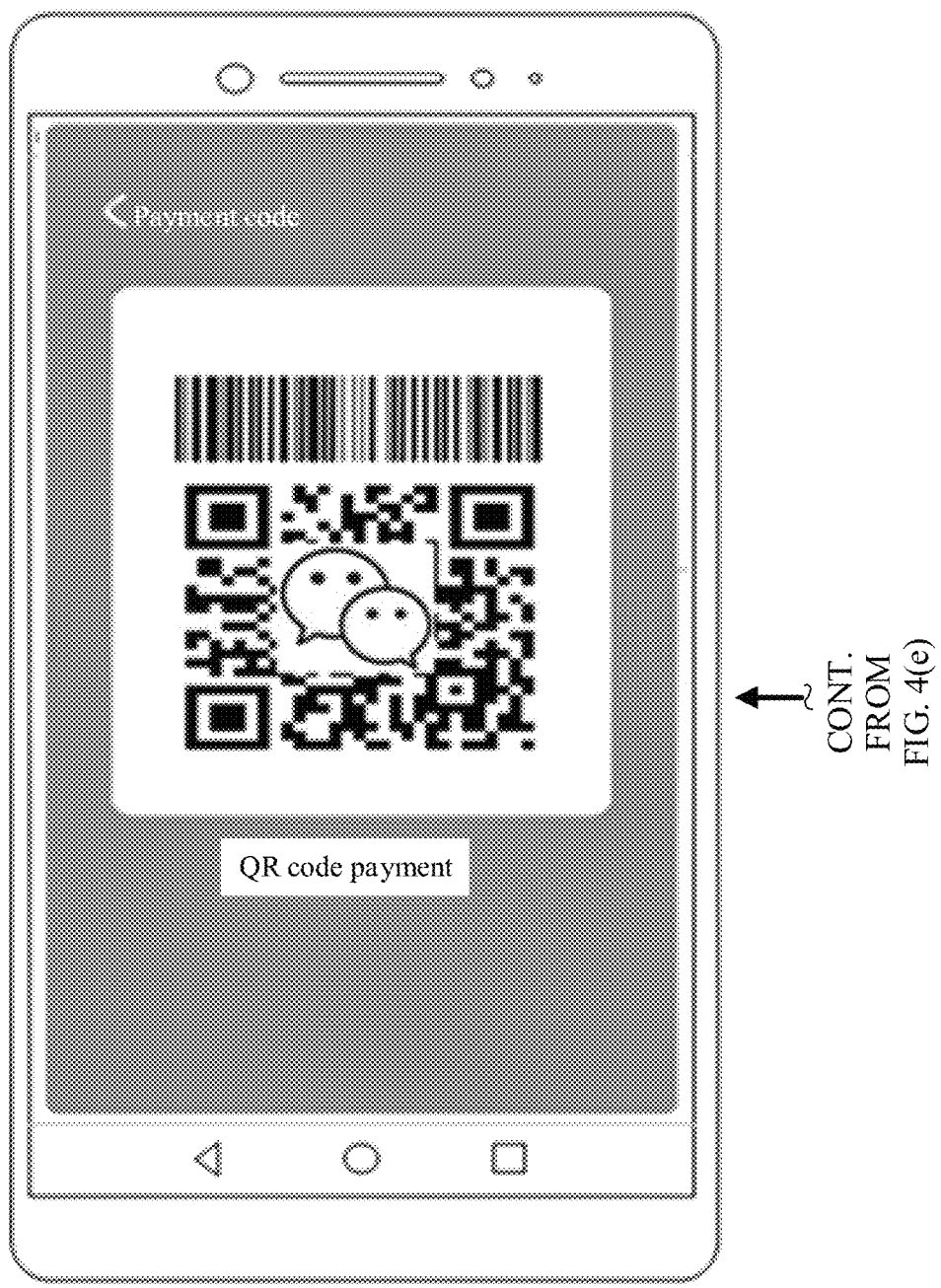

For example, as shown in FIG. 4(a) to FIG. 4(c), the wallet icon is switched to a widget set shown in FIG. 4(c) in response to the operation 1. For a specific switching process, refer to the descriptions corresponding to FIG. 3(a) to FIG. 3(c). Details are not described herein again. As shown in FIG. 4(d), the user performs a slide operation on the widget set, to be specific, the user presses and holds the "Alipay payment code" widget displayed in the widget set and slides right. As shown in FIG. 4(e), in response to the slide operation performed by the user on the widget set, the mobile phone changes the widget displayed in the widget set to the "WeChat payment code" widget. The user may perform a tap operation on the "WeChat payment code" widget in the widget set after the switching, to enter a corresponding payment collection interface. As shown in FIG. 4(f), in response to the tap operation performed by the user on the "WeChat payment code" widget in the widget set, the mobile phone enters the payment collection interface corresponding to the "WeChat payment code" widget.

It should be noted that, when the widget set is displayed by using the AppWidgetHost container, a manner in which the mobile phone changes a widget displayed in the widget set includes but is not limited to: in response to a slide right operation performed by the user on a top-layer widget, displaying a slide-out animation effect of the top-layer widget, and displaying a widget of a next application at a top layer.

Figure 5A:
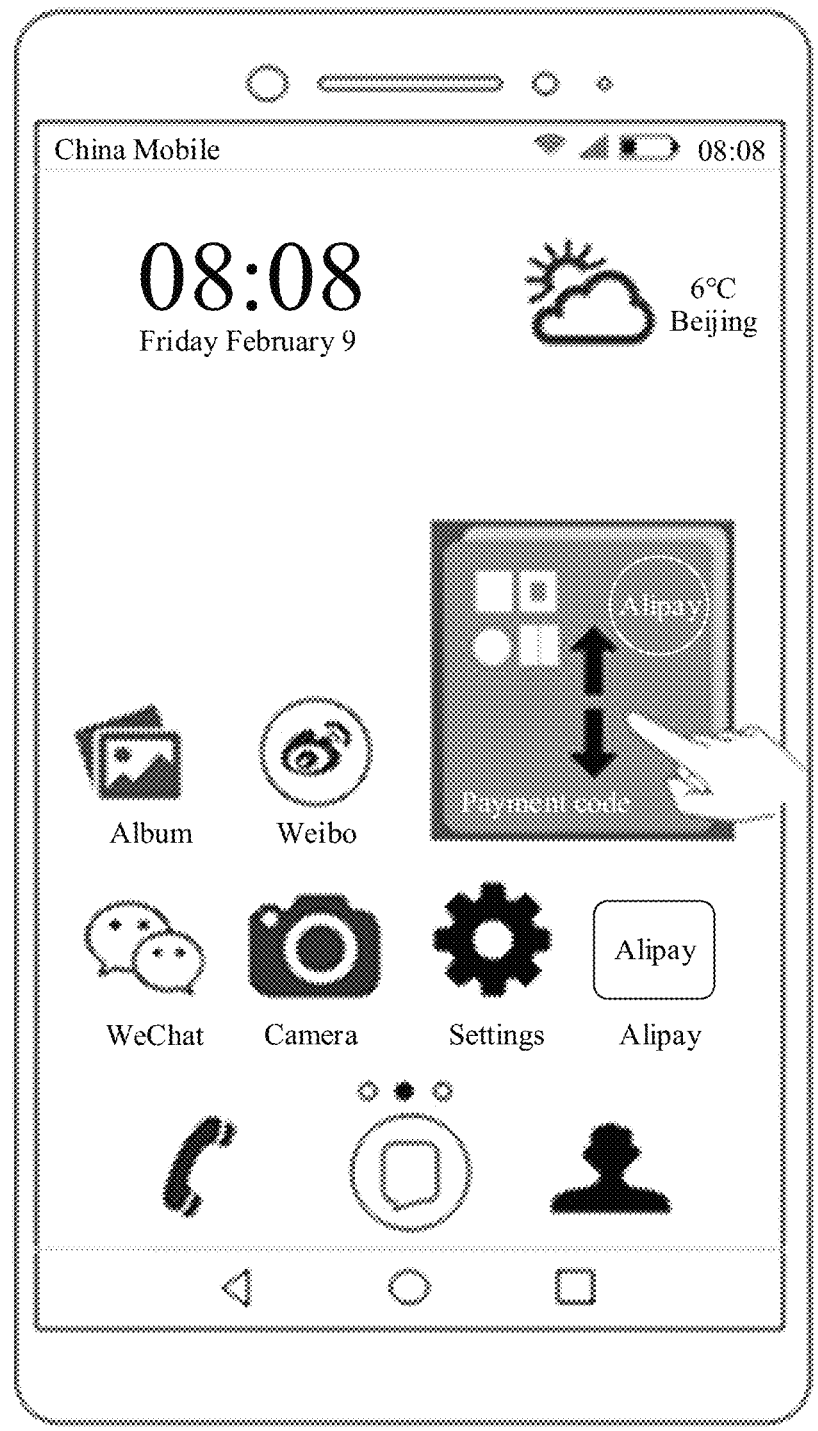
FIG. 5(a) to FIG. 5(f) are a schematic diagram of another group of display interfaces according to an embodiment of this application.
Figure 5B:
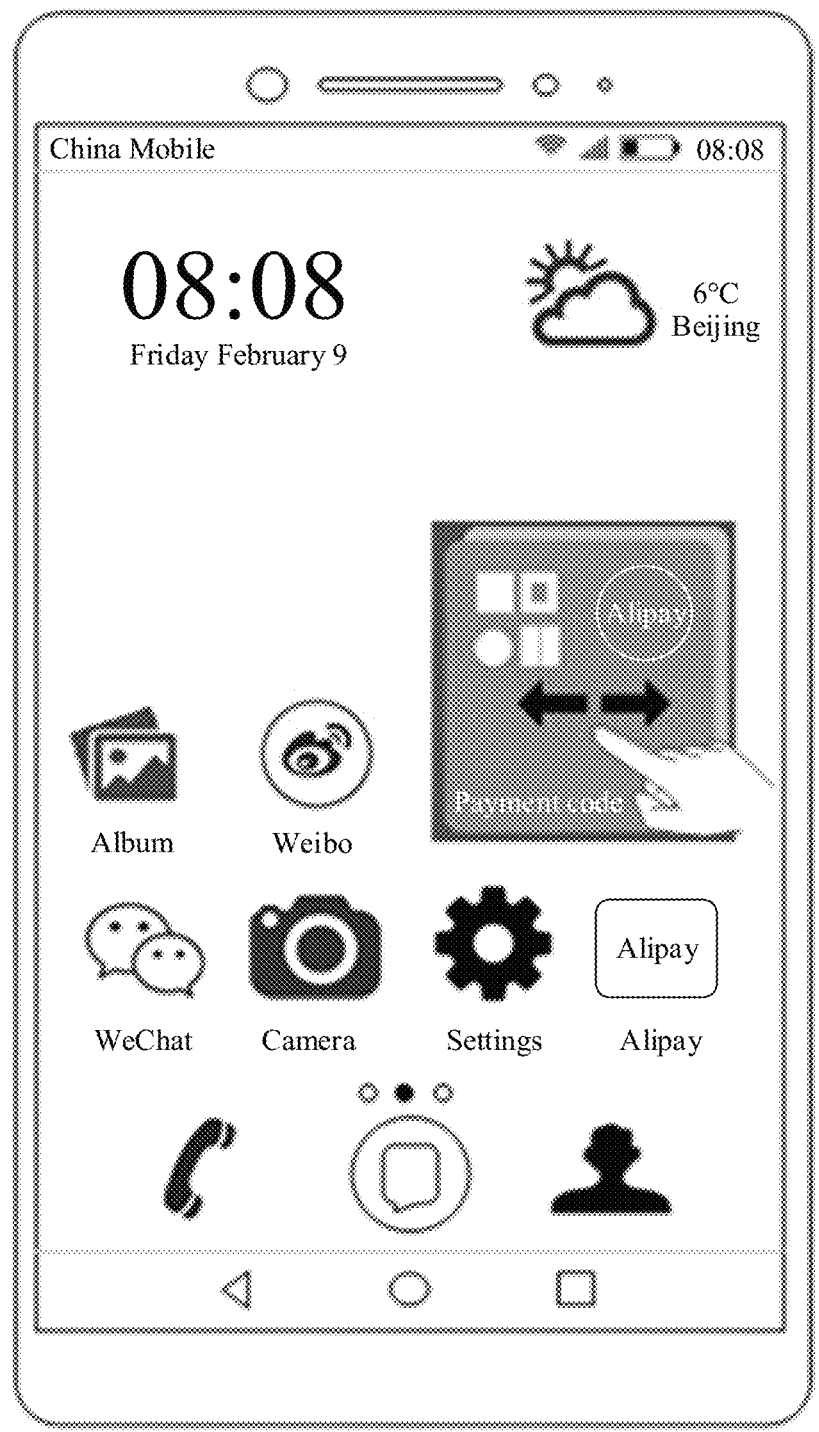
Figure 5C:
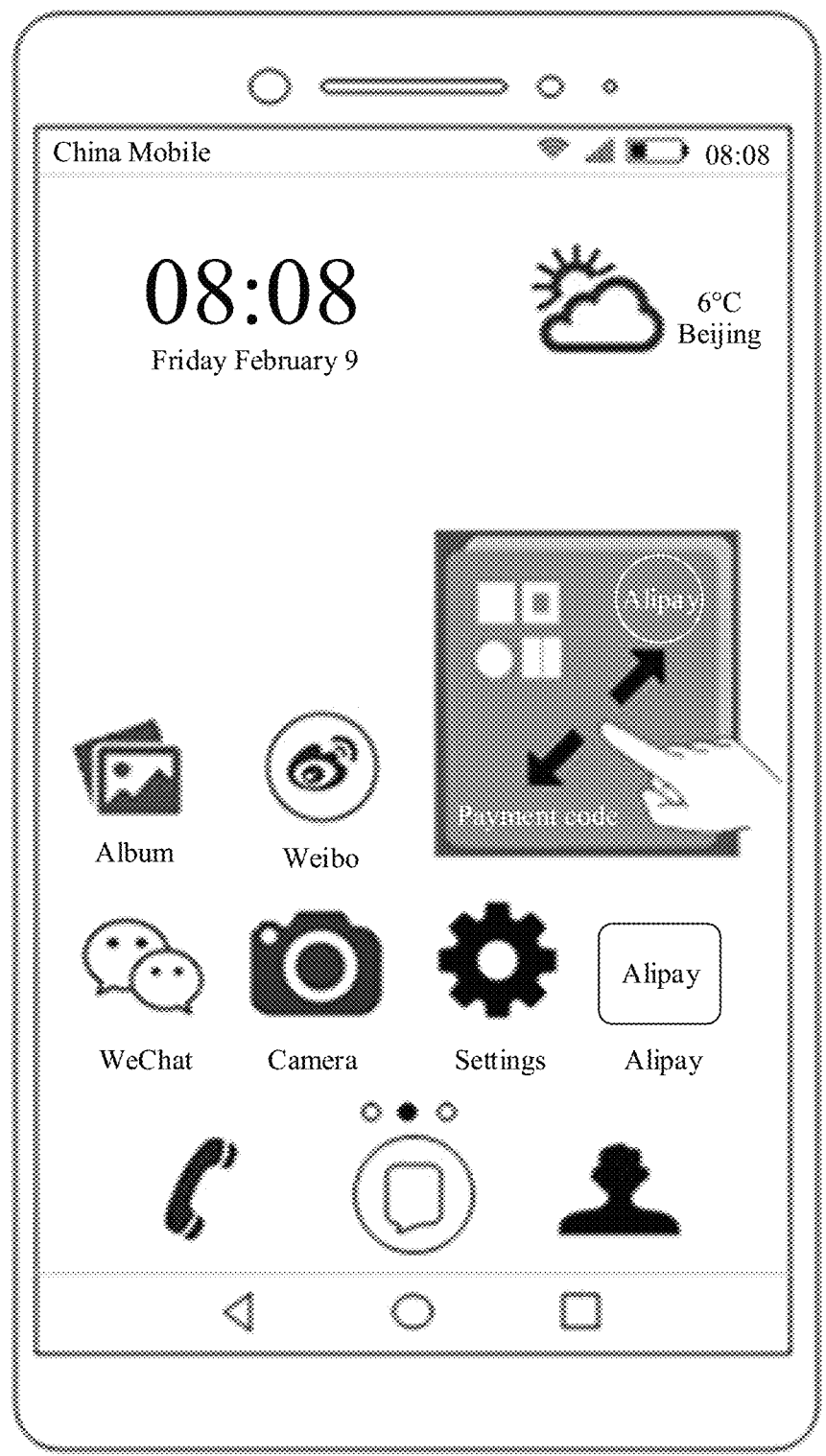
Figure 5D:
Figure 5E:
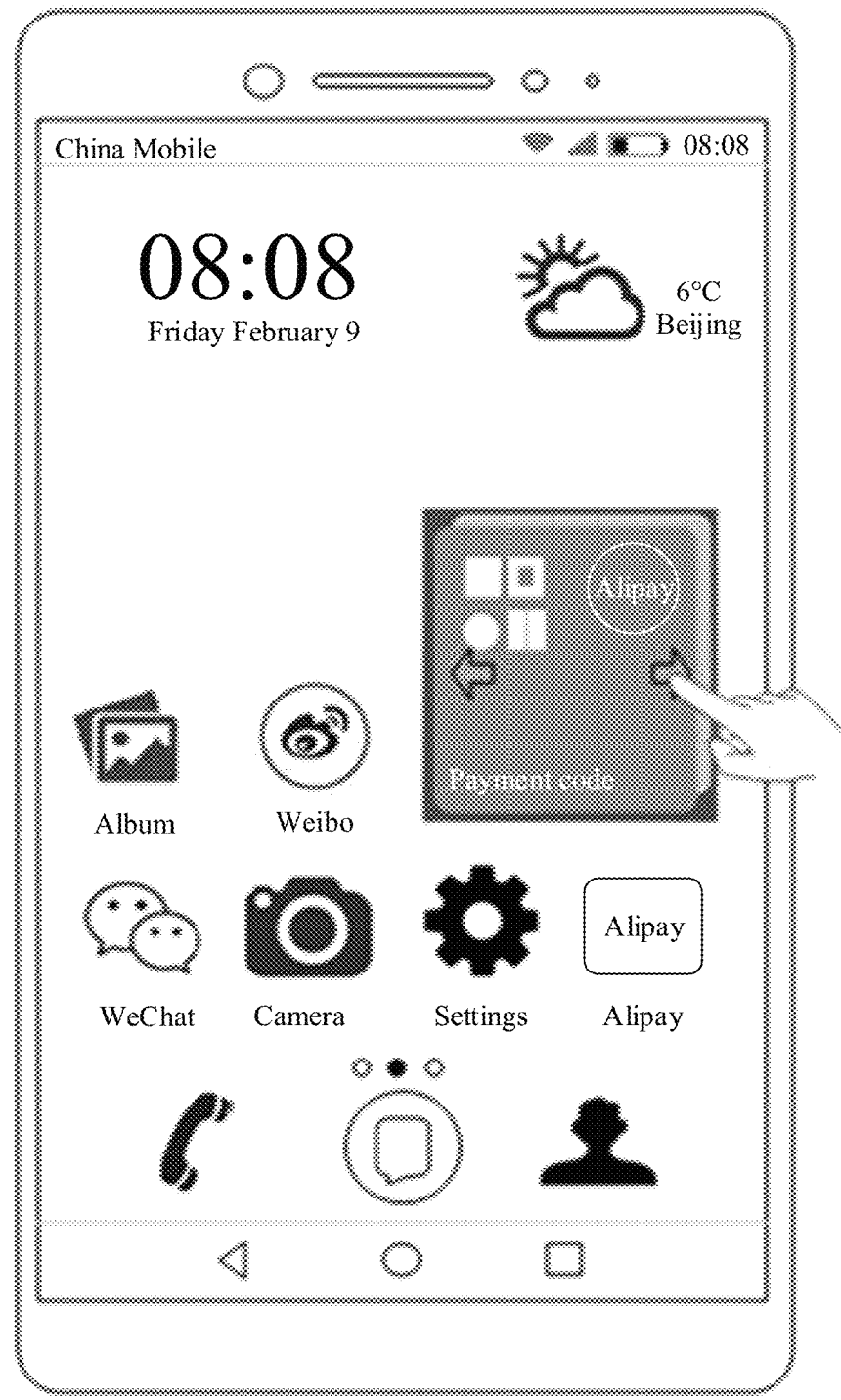
Figure 5F:
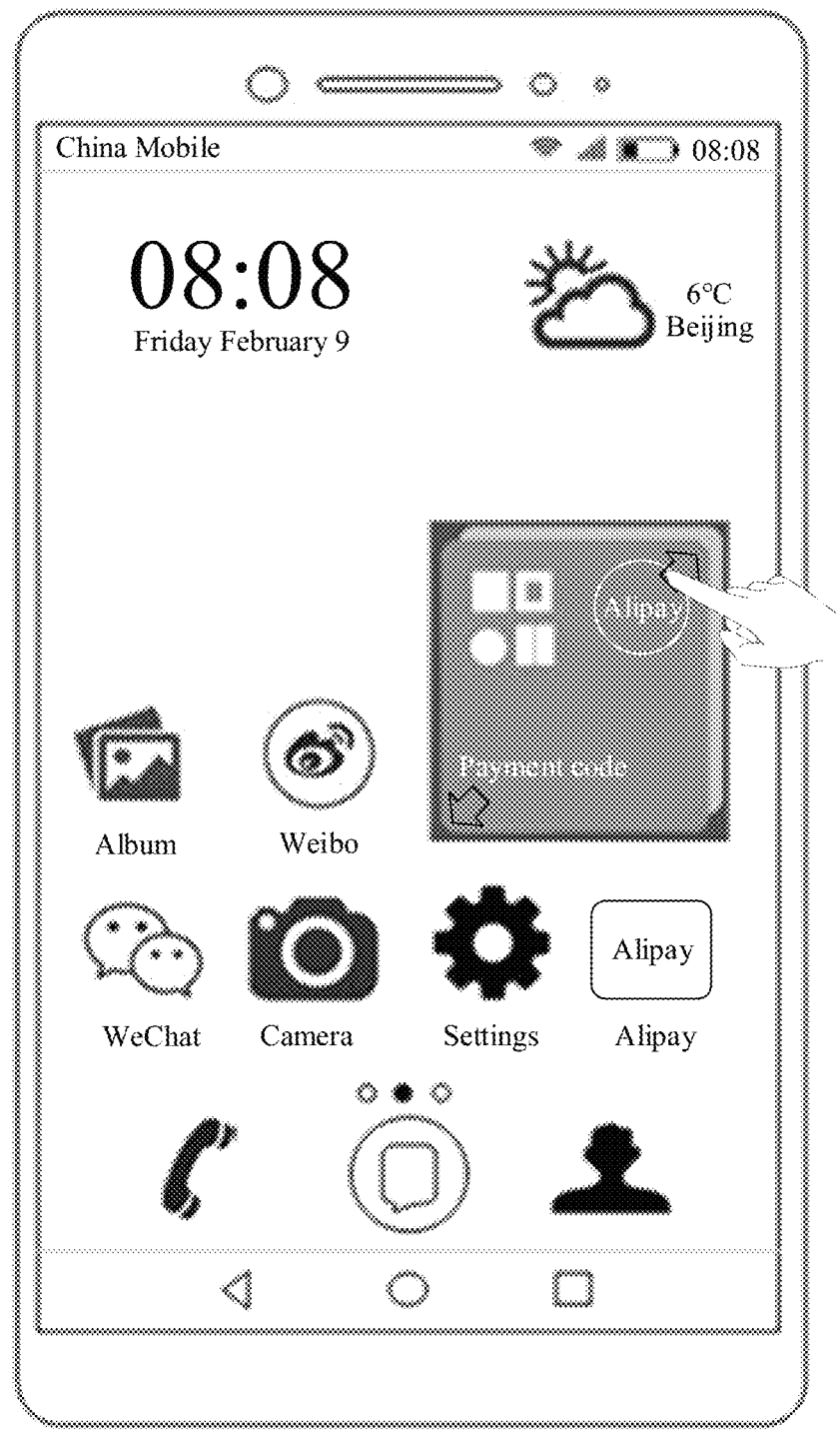

In the foregoing embodiment, an example in which the operation 3 is a slide right operation is used for description. It may be understood that the operation 3 is not limited in this embodiment of this application. For example, as shown in FIG. 5(a) to FIG. 5(c), the operation 3 may be a slide up operation or a slide down operation shown in FIG. 5(a), or a slide left operation or a slide right operation shown in FIG. 5(b), or an oblique slide operation shown in FIG. 5(c). For another example, the mobile phone may display a virtual button for changing a widget displayed in the widget set. In this case, the operation 3 may be tapping the virtual button. The virtual button may be displayed at different locations. For example, the virtual button may be displayed on upper and lower sides of the widget set shown in FIG. 5(d), or on left and right sides of the widget set shown in FIG. 5(e), or at two oblique corners of the widget set shown in FIG. 5(f).

It may be understood that, for a size of the widget set displayed on the home screen of the mobile phone, different users may have different requirements. Some users may hope that the widget set displayed on the home screen of the mobile phone can be as large as possible, so that the widget set can simultaneously display a plurality of widgets frequently used by the users. Some users may hope that the widget set displayed on the home screen of the mobile phone can be as small as possible, so as to prevent normal distribution of other application icons from being affected because the widget set occupies excessively large space on the home screen of the mobile phone. Therefore, in this embodiment, the mobile phone may switch the target icon to widget sets of different sizes based on different operations performed by the user on the target icon.

In some embodiments, after the mobile phone receives the operation 1 performed on the target icon, the mobile phone may determine the area of the widget set based on the operation 1, in other words, determine the area size of the display region of the widget set. When the mobile phone switches the target icon to the widget set, the mobile phone may switch the target icon to a widget set of a preset size based on the determined area of the widget set.

Figure 6A:
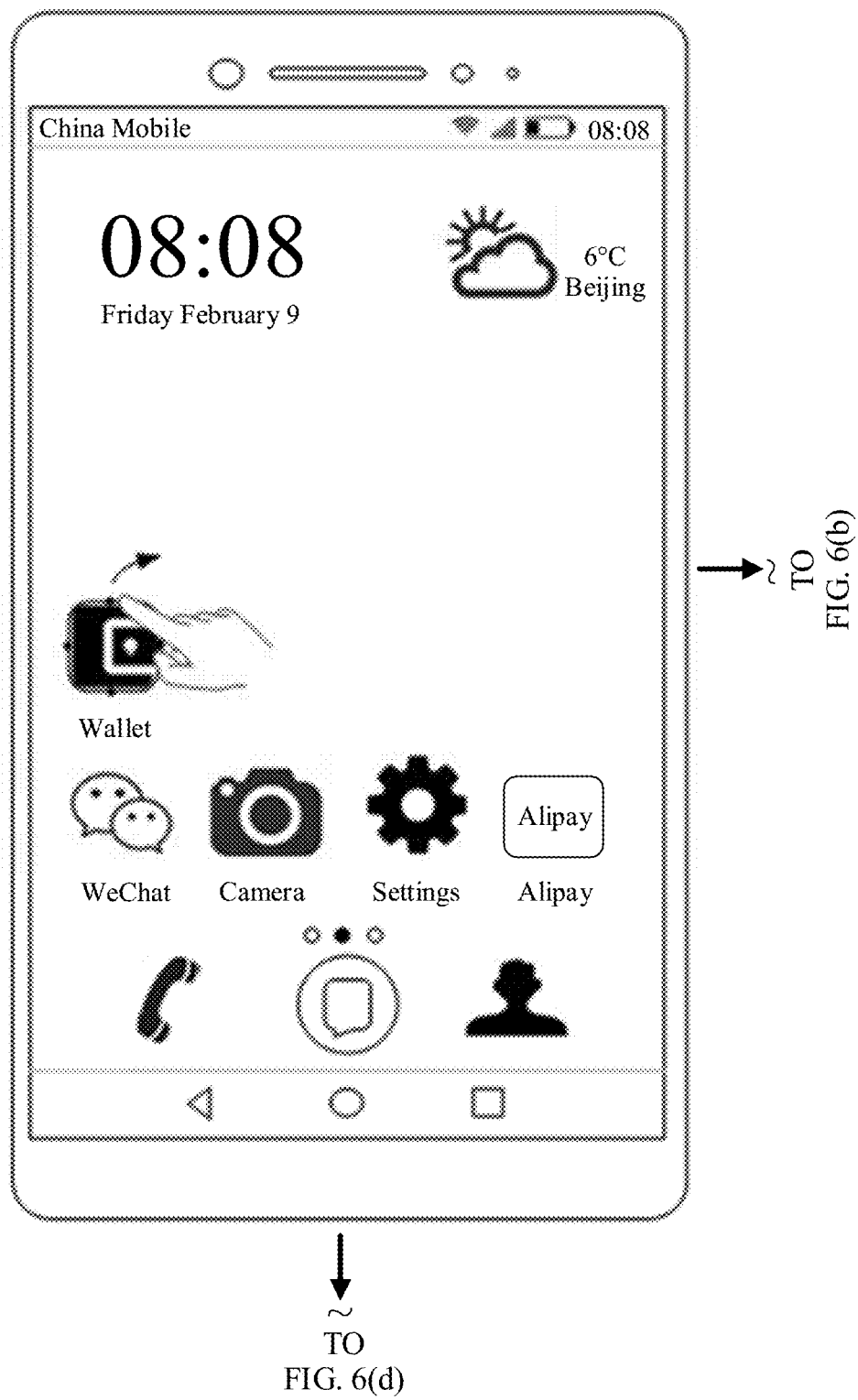
FIG. 6(a) to FIG. 6(e) are a schematic diagram of another group of display interfaces according to an embodiment of this application.
Figure 6B:
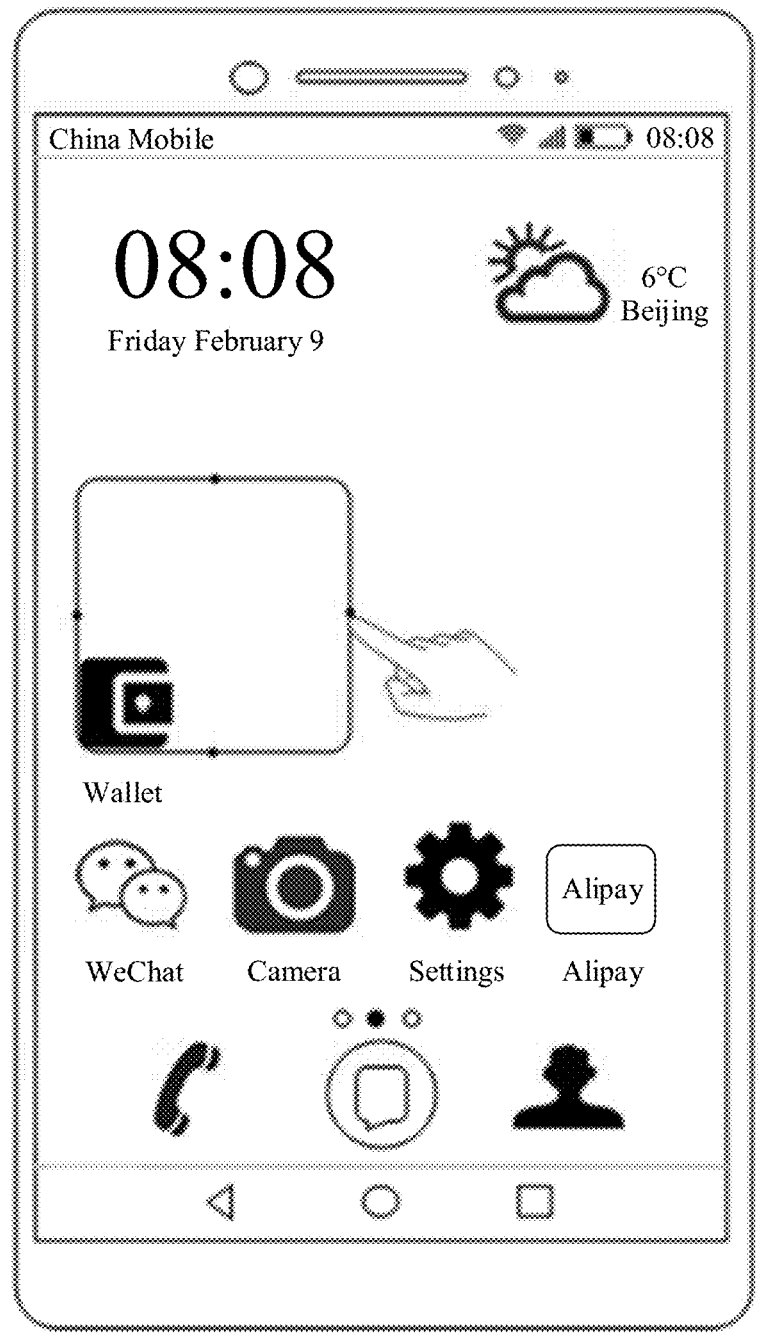
Figure 6C:
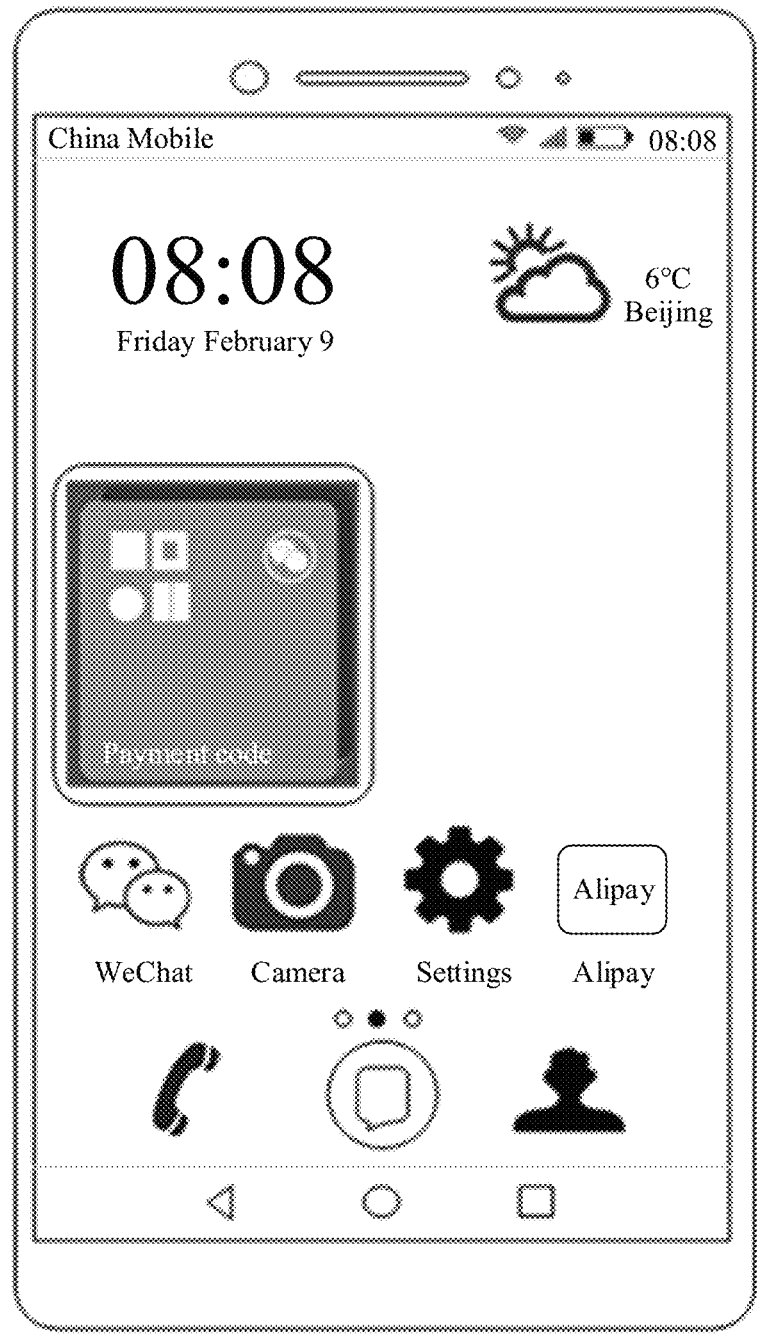
Figure 6D:
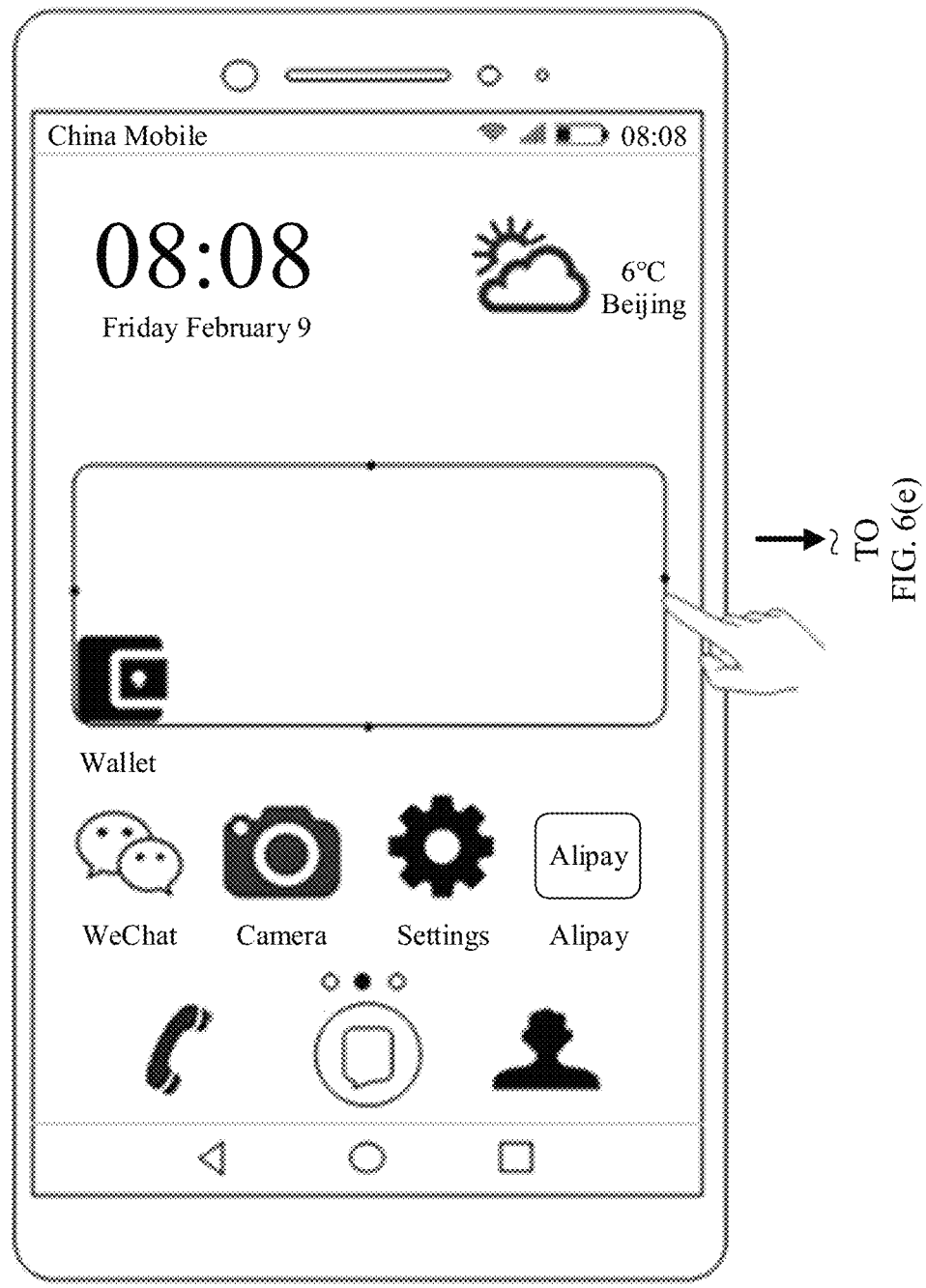

For example, as shown in FIG. 6(a), after the user performs a touch and hold operation on the wallet icon, in response to the touch and hold operation performed by the user on the wallet icon, the mobile phone generates a frame that matches a size and a shape of the wallet icon around the wallet icon. One or more dots may be displayed on each of four sides of the frame to prompt the user to press and hold the dots to stretch the frame. As shown in FIG. 6(b), in a process in which the user presses and holds the dots on the frame of the wallet icon to stretch the frame, on the home screen of the mobile phone in response to the stretch operation performed by the user on the frame, the mobile phone may display an animation process of stretching the frame. After the user stops performing the stretch operation on the frame, in other words, after the user releases the frame, the mobile phone may detect an area of a frame obtained by the user after the stretching. When the area of the frame meets a preset condition, the mobile phone switches the wallet icon to a widget set of a corresponding size. As shown in FIG. 6(b), the frame obtained by the user after the stretching is a square frame of a relatively small area. As shown in FIG. 6(c), when the mobile phone detects that the area of the frame obtained after the stretching reaches a first threshold, the mobile phone switches the wallet icon to a "2×2" widget set (an area unit of a single application icon is 1, that is, an area of the application icon is "1×1"), and the "2×2" widget set can display one widget.

Figure 6E:
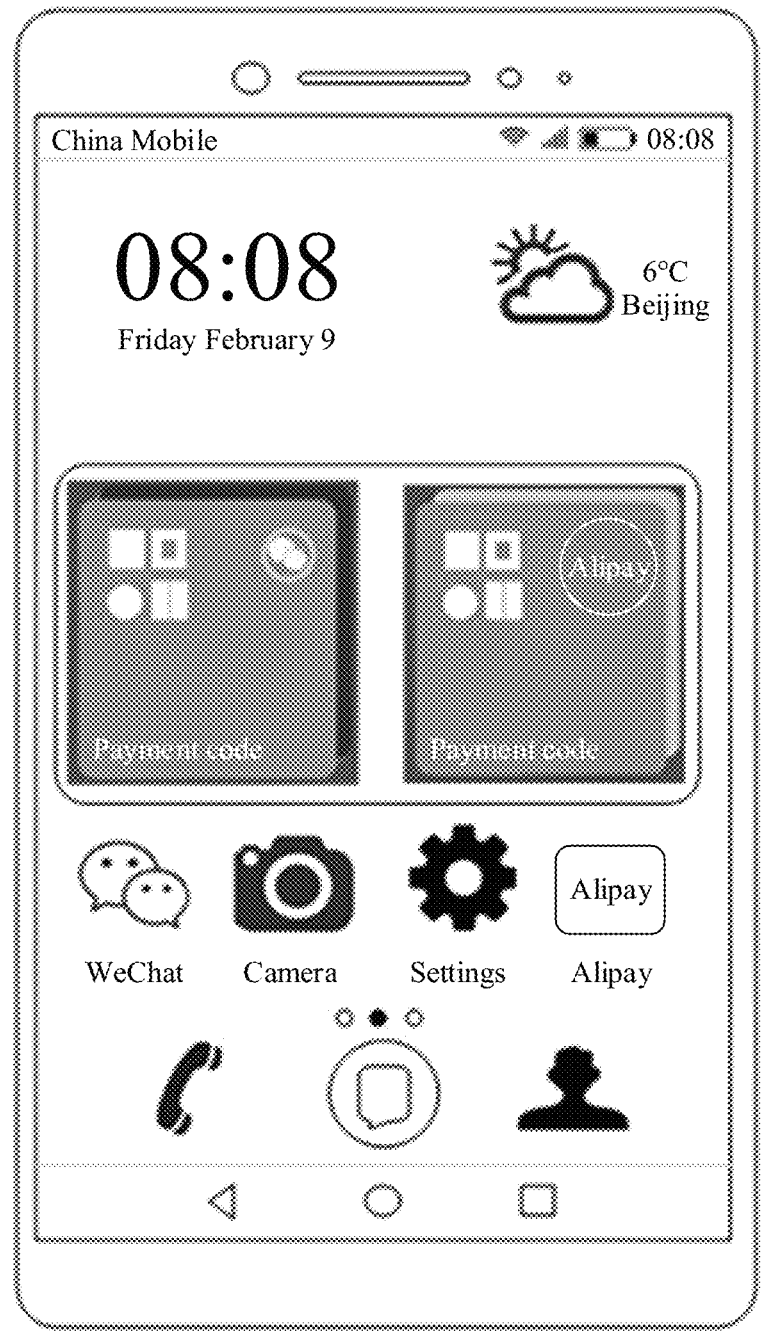

For another example, as shown in FIG. 6(b), after the user stretches the frame, the frame obtained by the user after the stretching is a rectangular frame of a relatively large area. As shown in FIG. 6(e), when the mobile phone detects that the area of the frame obtained after the stretching reaches a second threshold, the mobile phone switches the wallet icon to a "4×2" widget set, and the "4×2" widget set can simultaneously display two widgets.

The first threshold and the second threshold may be preset values. For example, assuming that the area corresponding to the single application icon on the home screen of the mobile phone is 1, the first threshold may be 4, and the second threshold may be 8.

In some possible implementations, a plurality of thresholds may be preset on the mobile phone. When the area of the frame obtained after the stretching reaches a corresponding threshold, the mobile phone may switch the target icon to a widget set of a corresponding size under the threshold. For example, when the area of the frame obtained after the stretching reaches 6, the mobile phone may switch the target icon to a "2×3" or "3×2" widget set; or when the area of the frame obtained after the stretching reaches 12, the mobile phone may switch the target icon to a "4×3" or "3×4" widget set. A threshold value and quantity are not limited in this embodiment of this application.

In other words, in this embodiment, after the user stretches the frame, the mobile phone may determine the area corresponding to the frame obtained after the stretching, so as to determine the size of the widget set based on the area of the frame, so that the mobile phone can switch the target icon to the widget set of the preset size.

In some embodiments, after the mobile phone receives the operation 1 performed on the target icon, the mobile phone may determine the area and a length-width ratio (that is, a ratio of a length to a width of the widget set) of the widget set based on the operation 1. When the mobile phone switches the target icon to the widget set, the mobile phone may switch the target icon to the widget set of the preset size based on the determined area and length-width ratio of the widget set.

For example, after the user stretches the frame of the target icon, when the area of the frame reaches 6 and the length-width ratio reaches 3/2, the mobile phone determines that the area of the widget set is 6 and the length-width ratio is 3/2, in other words, the mobile phone may switch the target icon to a "3×2" widget set. For another example, when the area of the frame reaches 8 and the length-width ratio reaches 4/2, the mobile phone determines that the area of the widget set is 8 and the length-width ratio is 4/2, in other words, the mobile phone may switch the target icon to a "4×2" widget set.

In other words, in this embodiment, after the user stretches the frame, the mobile phone may determine the area and the length-width ratio corresponding to the frame obtained after the stretching. When both the area and the length-width ratio of the frame meet a specific condition, the mobile phone switches the target icon to the widget set of the preset size.

It may be understood that, in some cases, after the user switches the target icon to the widget set, the user may need to switch the widget set back to the icon. For example, after the user newly installs another application on the mobile phone, when space on the home screen of the mobile phone is insufficient because the widget set occupies relatively large space on the home screen of the mobile phone, the user may need to switch the widget set to the icon that occupies relatively small space. For another example, when the user uses a widget in the widget set less frequently, the user may also need to switch the widget set to the icon. This ensures aesthetic appearance of the home screen of the mobile phone.

Therefore, in some embodiments, the user may perform an operation 4 on the widget set, and the mobile phone switches the widget set to the target icon in response to the operation 4. In other words, the operation 4 is used to switch the widget set to the target icon.

Figure 7A:
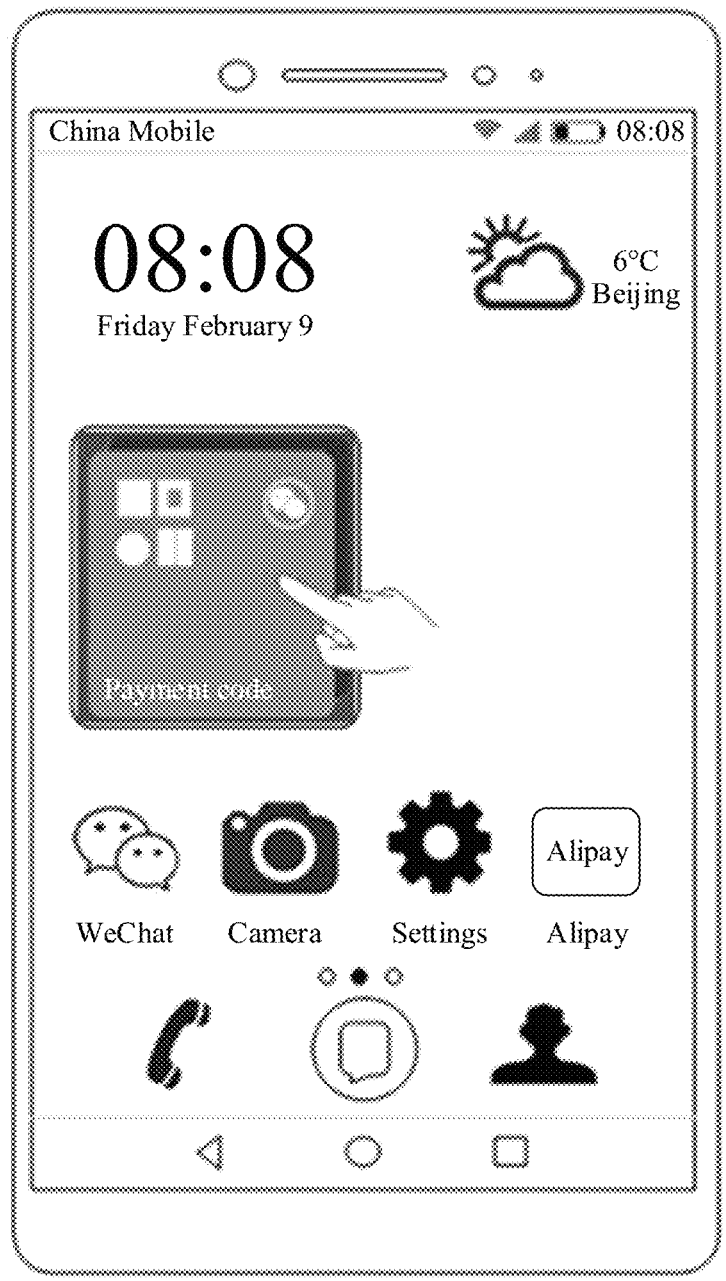
FIG. 7(a) to FIG. 7(c) are a schematic diagram of another group of display interfaces according to an embodiment of this application.
Figure 7B:
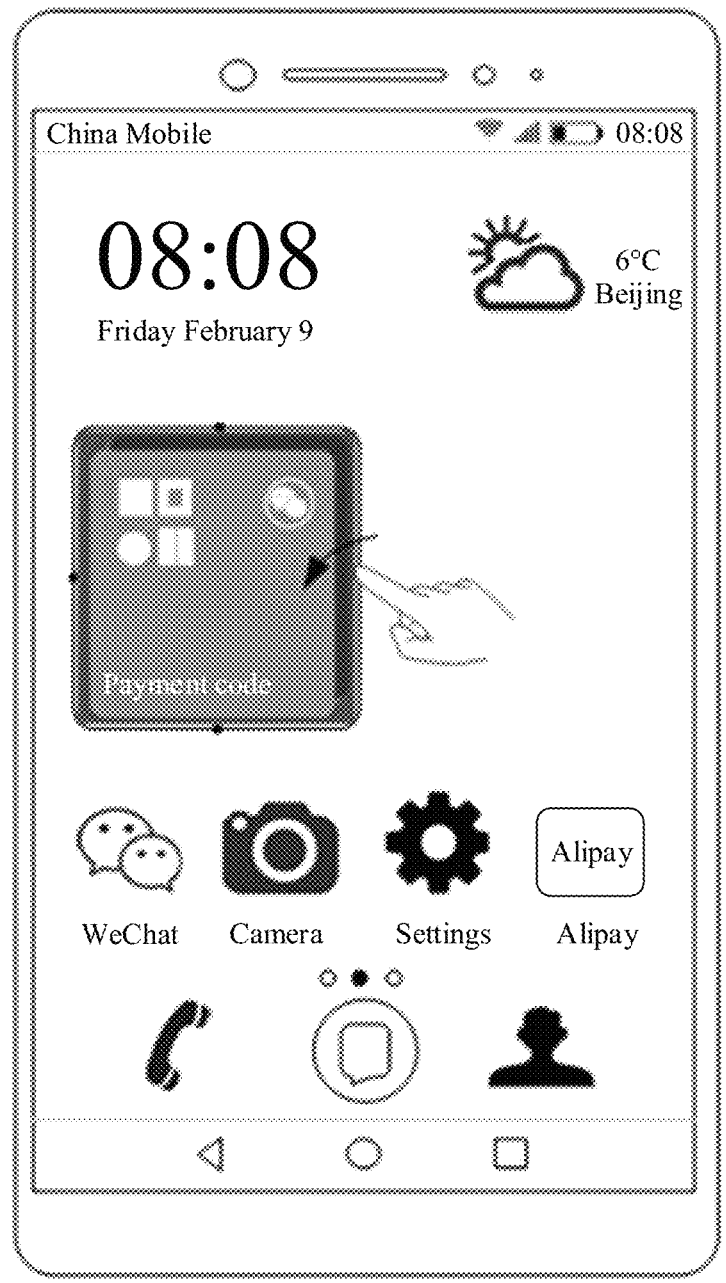
Figure 7C:
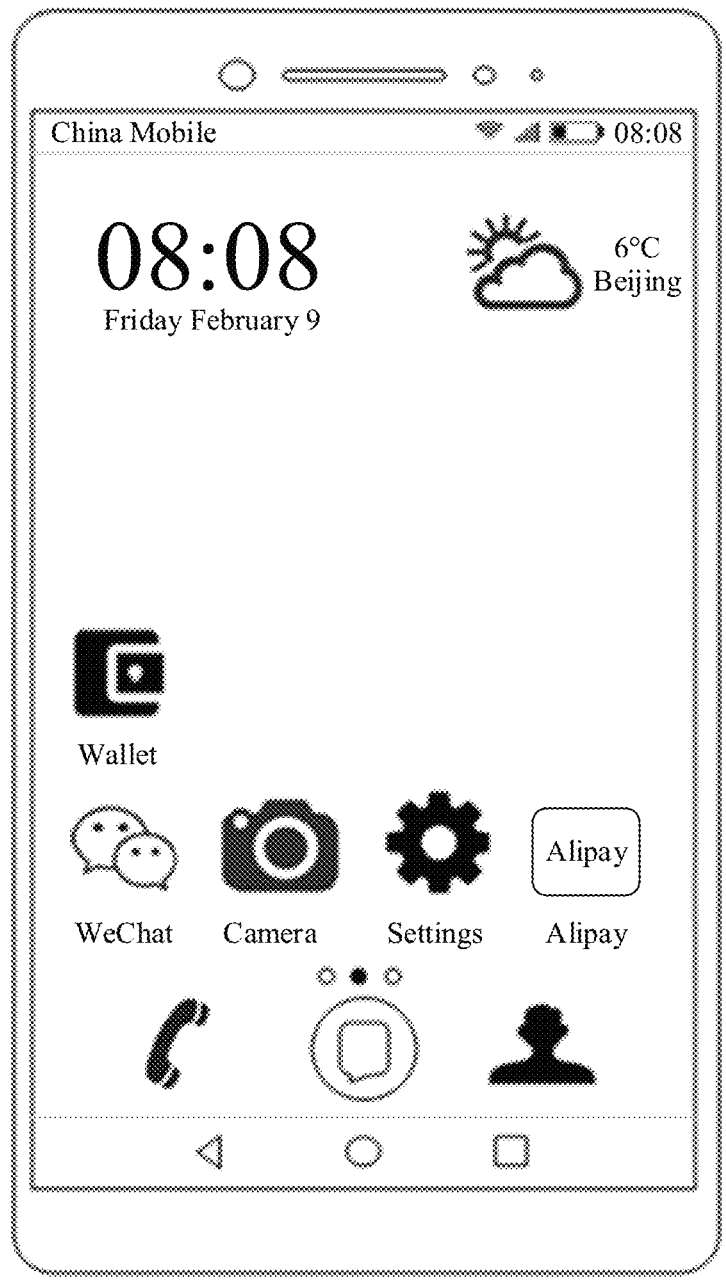

In some possible implementations, the operation 4 used to switch the widget set to the icon may be a touch and hold gesture operation and a scale down gesture operation. For example, as shown in FIG. 7(a), the user performs a touch and hold operation on the widget set on the home screen of the mobile phone, and the mobile phone receives the touch and hold operation performed by the user on the widget set. As shown in FIG. 7(b), in response to the touch and hold operation performed by the user on the widget set, the mobile phone generates a frame that matches a size and a shape of the widget set around the widget set. One or more dots may be displayed on each of four sides of the frame to prompt the user to press and hold the dots to control a size of the frame. The user presses and holds the dots on the frame to control the frame to scale down towards a lower left corner, and the mobile phone may receive the scale down operation performed by the user on the widget set. As shown in FIG. 7(c), the mobile phone switches the widget set to the wallet icon in response to the scale down operation performed by the user on the widget set.

Figure 8A:
FIG. 8(a) to FIG. 8(c) are a schematic diagram of another group of display interfaces according to an embodiment of this application.
Figure 8B:
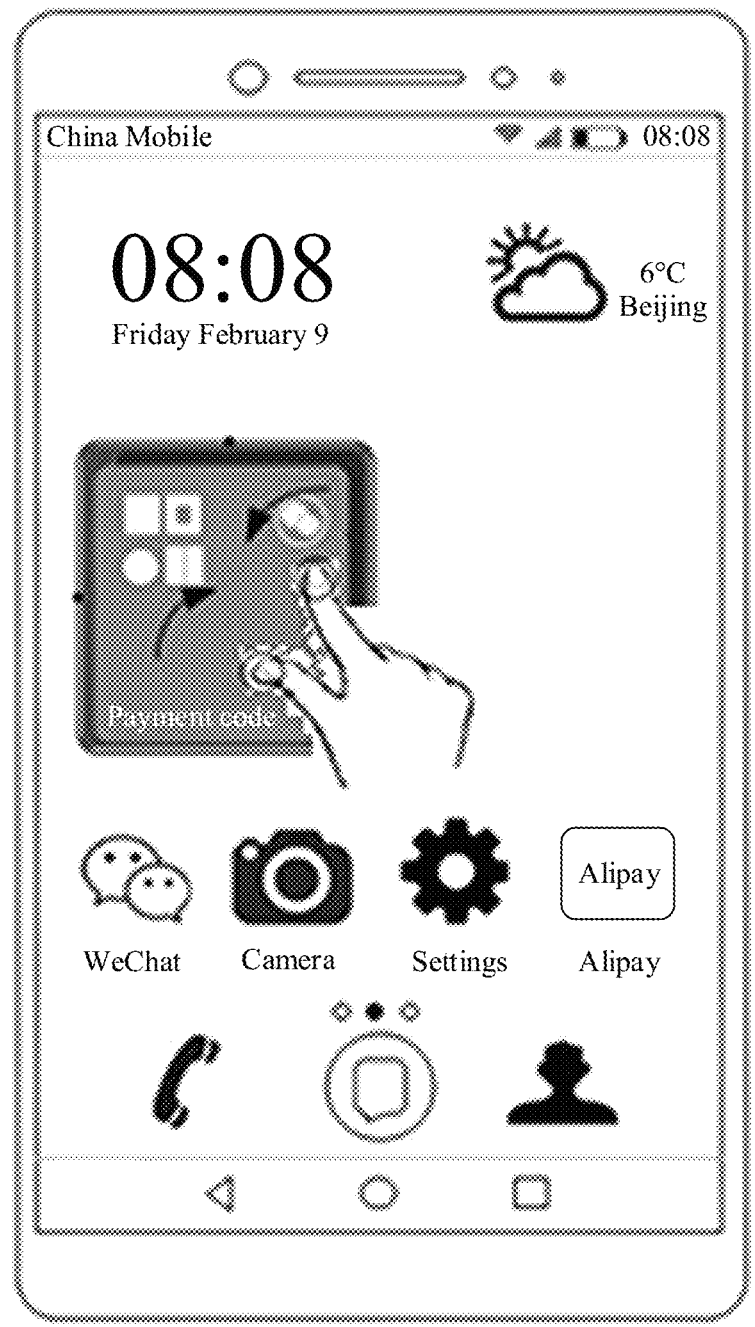
Figure 8C:

In some other possible implementations, the operation 4 used to switch the widget set to the icon may be a touch and hold gesture operation and a pinch gesture operation. For example, as shown in FIG. 8(a), the user performs a touch and hold operation on the widget set on the home screen of the mobile phone, and the mobile phone may receive the touch and hold operation performed by the user on the widget set. As shown in FIG. 8(b), in response to the touch and hold operation performed by the user on the widget set, the mobile phone generates a frame that matches a size and a shape of the widget set around the widget set, to prompt the user to change the shape of the widget set, the user performs a pinch operation on the widget set, and the mobile phone may receive the pinch gesture operation performed by the user on the widget set. As shown in FIG. 8(c), the mobile phone switches the widget set to the wallet icon in response to the pinch operation performed by the user on the widget set.

In some cases, the user may need to change the size of the display region of the widget set. For example, when the widget set occupies relatively large space on the home screen of the mobile phone, the user may need to change the widget set to a relatively small shape. For another example, when the widget set can display a relatively small quantity of widgets, the user may need to change the widget set to a relatively large shape.

In some embodiments, the user may perform an operation 5 on the widget set, the mobile phone receives the operation 5 performed by the user on the widget set, and the mobile phone changes the size of the display region of the widget set, for example, changes a relatively small widget set to a relatively large widget set, or changes a relatively large widget set to a relatively small widget set. In other words, the operation 5 is used to change the size of the display region of the widget set.

Figure 9A:
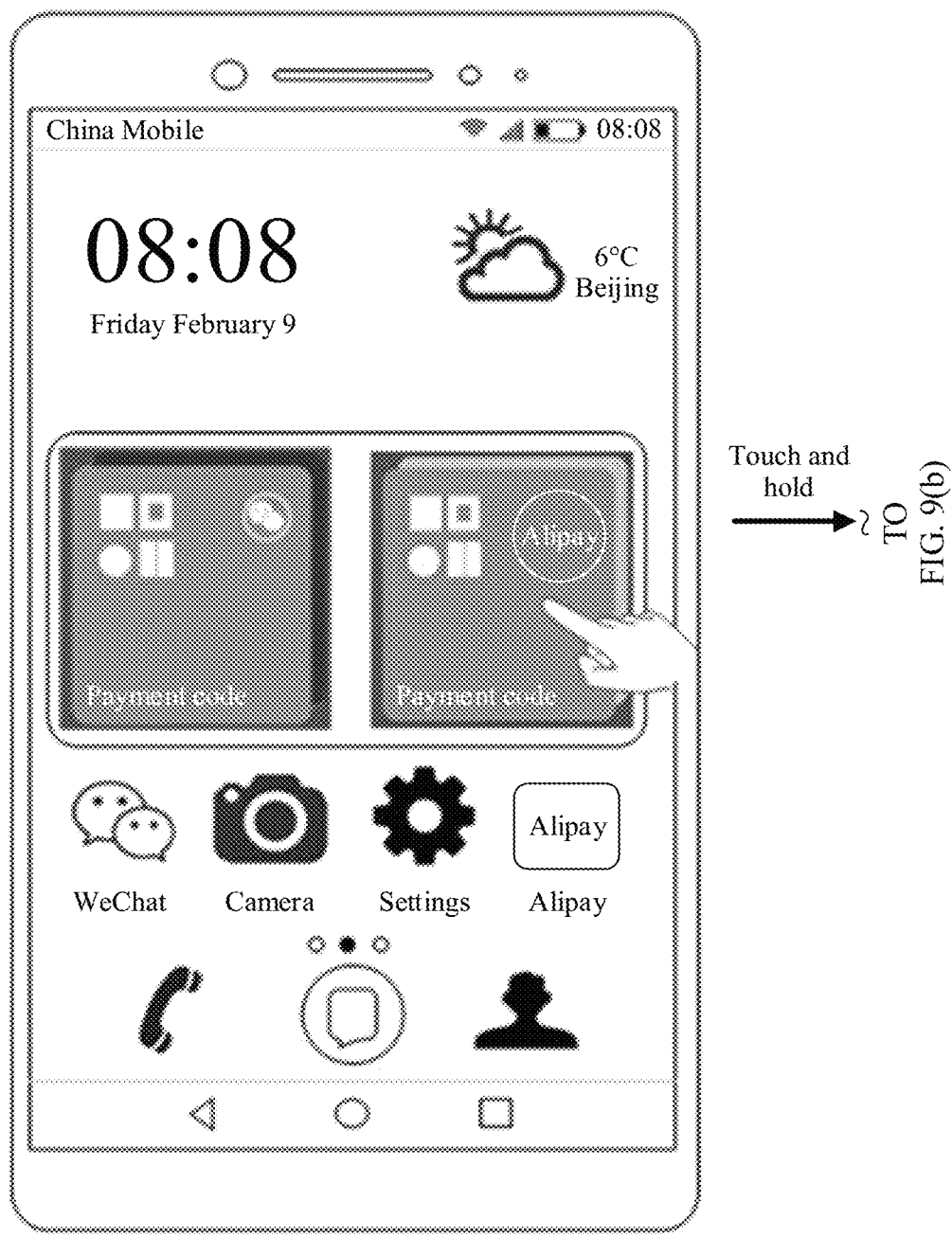
FIG. 9(a) to FIG. 9(e) are a schematic diagram of another group of display interfaces according to an embodiment of this application.
Figure 9B:
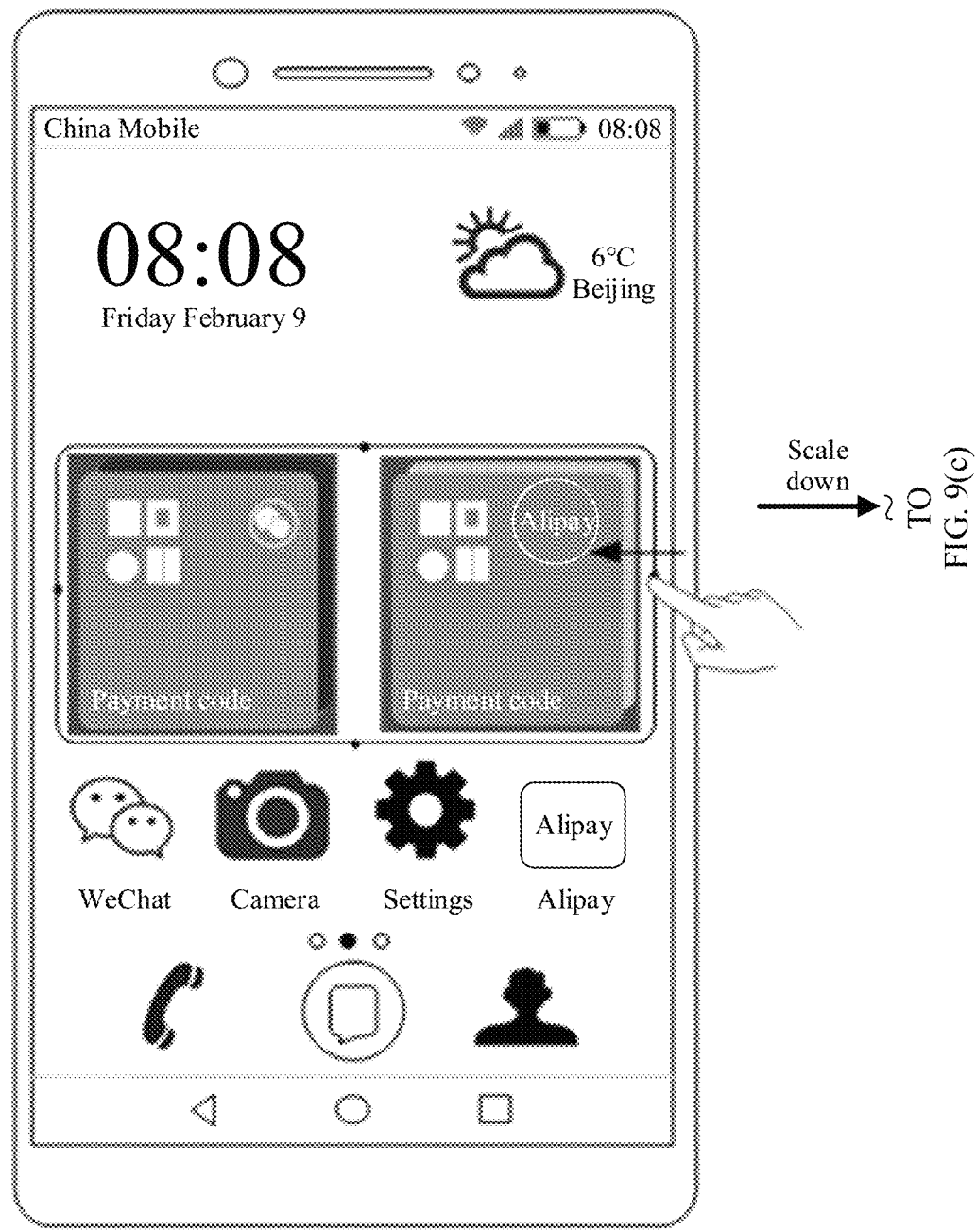
Figure 9C:
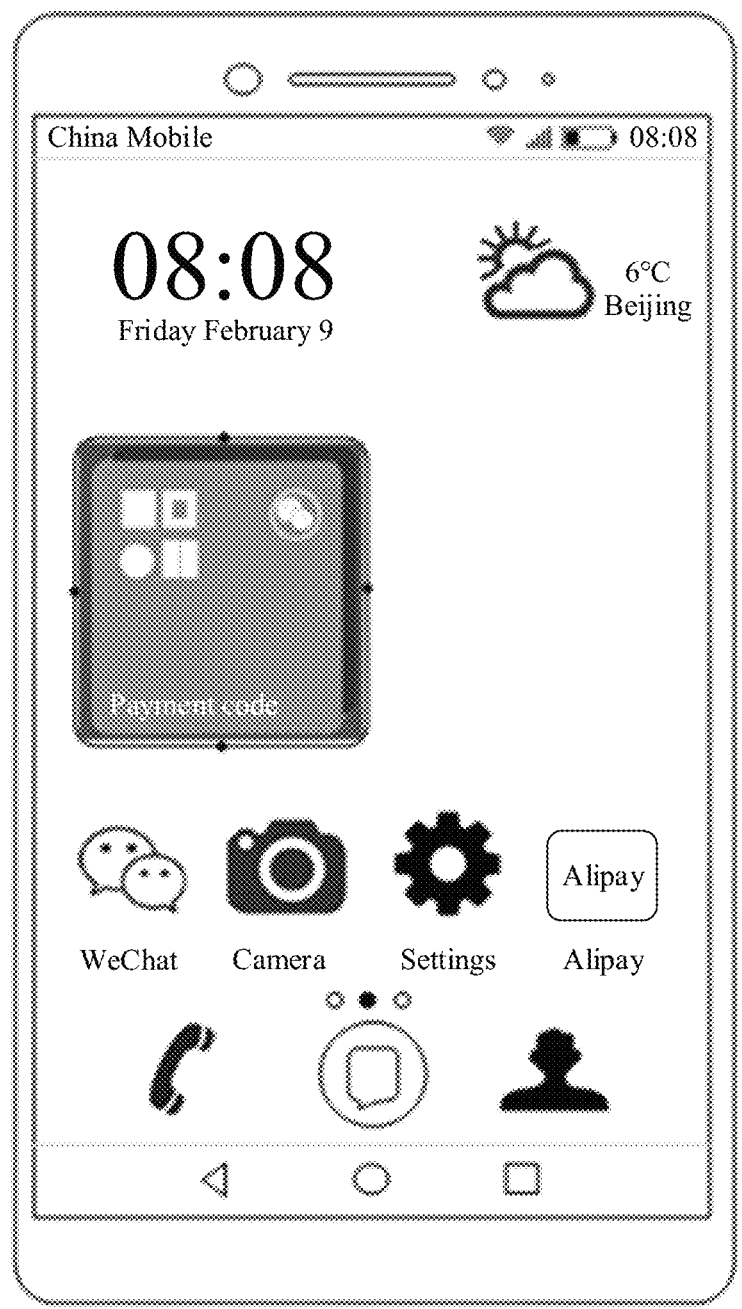
Figure 9D:
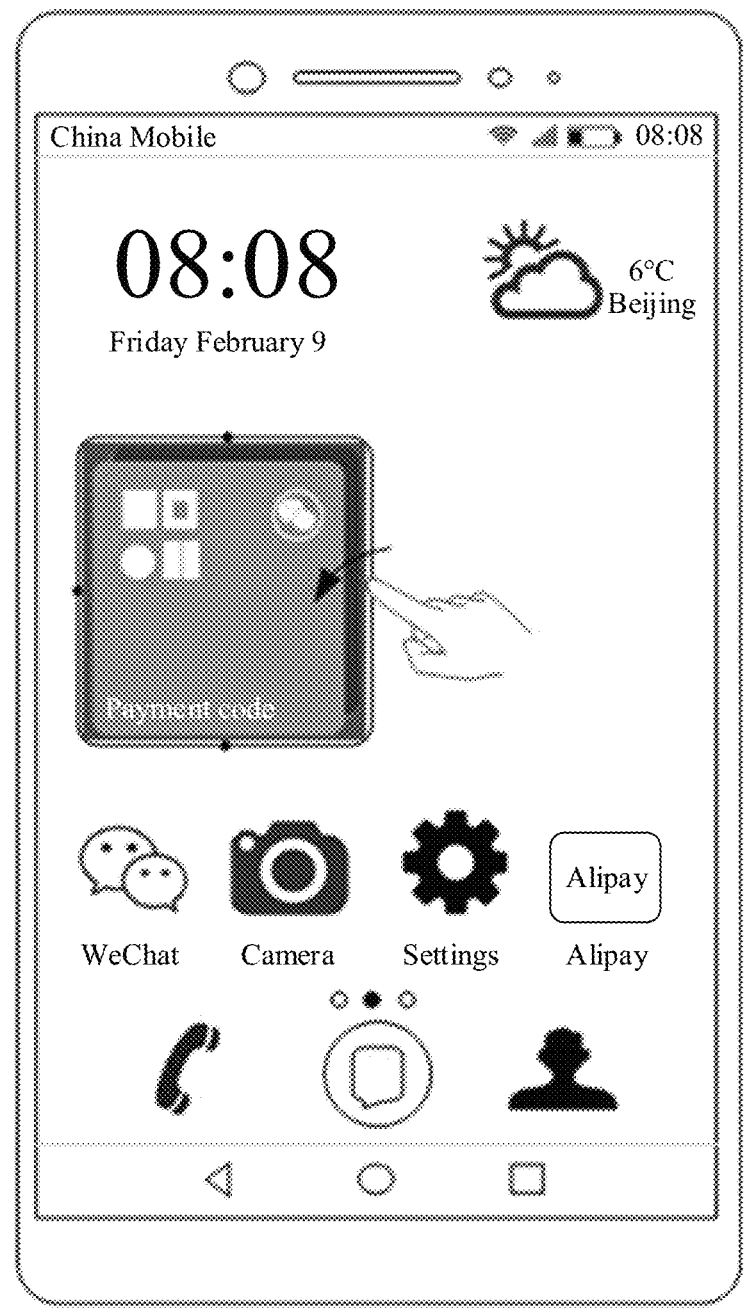
Figure 9E:

In some possible implementations, the operation 5 used to change the size of the widget set may be a touch and hold gesture operation and a scale down gesture operation. For example, as shown in FIG. 9(a), the user performs a touch and hold operation on the widget set on the home screen of the mobile phone, and the mobile phone may receive the touch and hold operation performed by the user on the widget set. As shown in FIG. 9(b), in response to the touch and hold operation performed by the user on the widget set, the mobile phone generates a frame that matches a size and a shape of the widget set around the widget set, the user presses and holds dots on the frame to control the frame to scale down to the left until one widget can be displayed, and the mobile phone may receive the scale down operation performed by the user on the widget set. As shown in FIG. 9(c), the mobile phone changes an original "4×2" widget set to a "2×2" widget set in response to the scale down operation performed by the user on the widget set. As shown in FIG. 9(d), the user may continue to perform a scale down operation on the smaller widget set, and the mobile phone may receive the scale down operation performed by the user on the smaller widget set. As shown in FIG. 9(e), the mobile phone switches the widget set to the wallet icon in response to the scale down operation performed by the user on the smaller widget set.

It may be understood that the foregoing example is described by using the wallet icon as an example. However, an icon that can be switched to a widget set is not limited thereto, and may be an icon of an application of any type, for example, an icon corresponding to an application used to play music or an application used for communication.

Figure 10A:
FIG. 10(a) to FIG. 10(c) are a schematic diagram of another group of display interfaces according to an embodiment of this application.
Figure 10B:
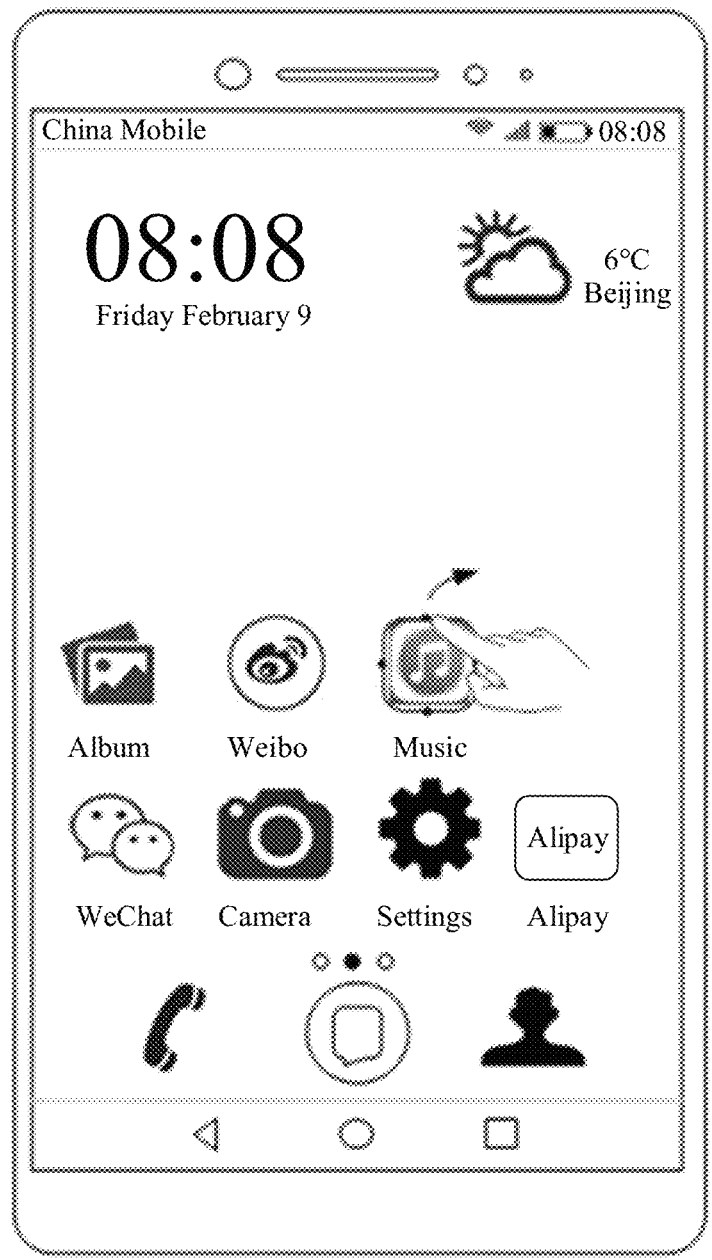
Figure 10C:
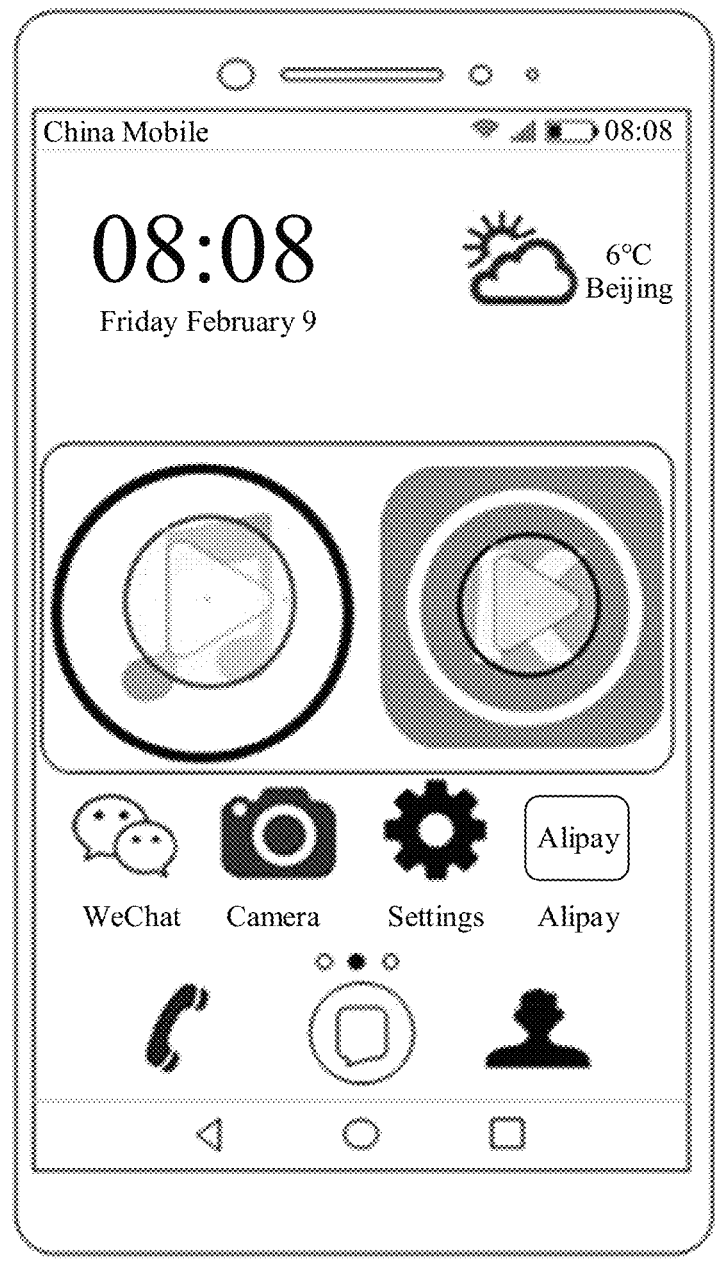

For example, as shown in FIG. 10(a) to FIG. 10(c), an icon of "Music" (referred to as a music icon below) is displayed on the home screen of the mobile phone. The music icon corresponds to a "Music 1" widget and a "Music 2" widget. The mobile phone switches the music icon to a widget set shown in FIG. 10(c) in response to an operation 1. The widget set displays the "Music 1" widget and the "Music 2" widget. For a specific switching process, refer to the descriptions corresponding to FIG. 3(a) to FIG. 3(c). Details are not described herein again.

It may be understood that, in a process of switching the target icon to the widget set, the mobile phone usually needs to first determine a plurality of widgets in the widget set. In some possible implementations, the mobile phone may automatically determine, based on the target icon, the plurality of widgets corresponding to the widget set, or the mobile phone may determine, based on user settings, the plurality of widgets corresponding to the widget set.

A manner in which the mobile phone automatically determines the plurality of widgets corresponding to the target icon includes but is not limited to the following plurality of manners:

For example, the wallet icon is displayed on the home screen of the mobile phone, "Wallet" corresponding to the wallet icon is associated with "Alipay" and "WeChat", "Alipay" has the "Alipay payment code" widget, and "WeChat" has the "WeChat payment code" widget. In this case, the "Alipay payment code" widget and the "WeChat payment code" widget that are associated with "Wallet" may be determined based on the wallet icon. In other words, when the target icon is an icon of an application, the mobile phone may determine, based on the application corresponding to the target icon, a plurality of other applications associated with the application, and then determine a plurality of widgets corresponding to the plurality of other applications. The plurality of widgets are widgets corresponding to the widget set.

For another example, an icon of a folder is displayed on the home screen of the mobile phone, the folder includes "Alipay" and "WeChat", "Alipay" has the "Alipay payment code" widget, and "WeChat" has the "WeChat payment code" widget. In this case, the "Alipay payment code" widget and the "WeChat payment code" widget that correspond to the applications in the folder may be determined based on the icon of the folder. In other words, when the target icon is an icon of a folder, the mobile phone first determines applications included in the folder, and then determines widgets corresponding to the applications included in the folder, so as to determine a plurality of widgets corresponding to the widget set.

For another example, the wallet icon is displayed on the home screen of the mobile phone, and "WeChat" and "Alipay" are installed on the mobile phone. In this case, the mobile phone may determine, based on the wallet icon, "WeChat" and "Alipay" that are of a same type as "Wallet", and then determine the "Alipay payment code" widget and the "WeChat payment code" widget corresponding to the wallet icon. Alternatively, the music icon is displayed on the home screen of the mobile phone, and "Music 1" and "Music 2" are installed on the mobile phone. In this case, the mobile phone may determine, based on the music icon, "Music 1" and "Music 2" that are of a same type as "Music", and then determine the "Music 1" widget and the "Music 2" widget that correspond to the music icon. In other words, when the target icon is an icon of an application, the mobile phone first determines a type (for example, a payment type, a music type, or a game type) of the application corresponding to the target icon, then determines other applications of a same type as the target icon in the mobile phone, and finally determines a plurality of widgets corresponding to the other applications. The plurality of widgets are widgets corresponding to the widget set.

Figure 11A:
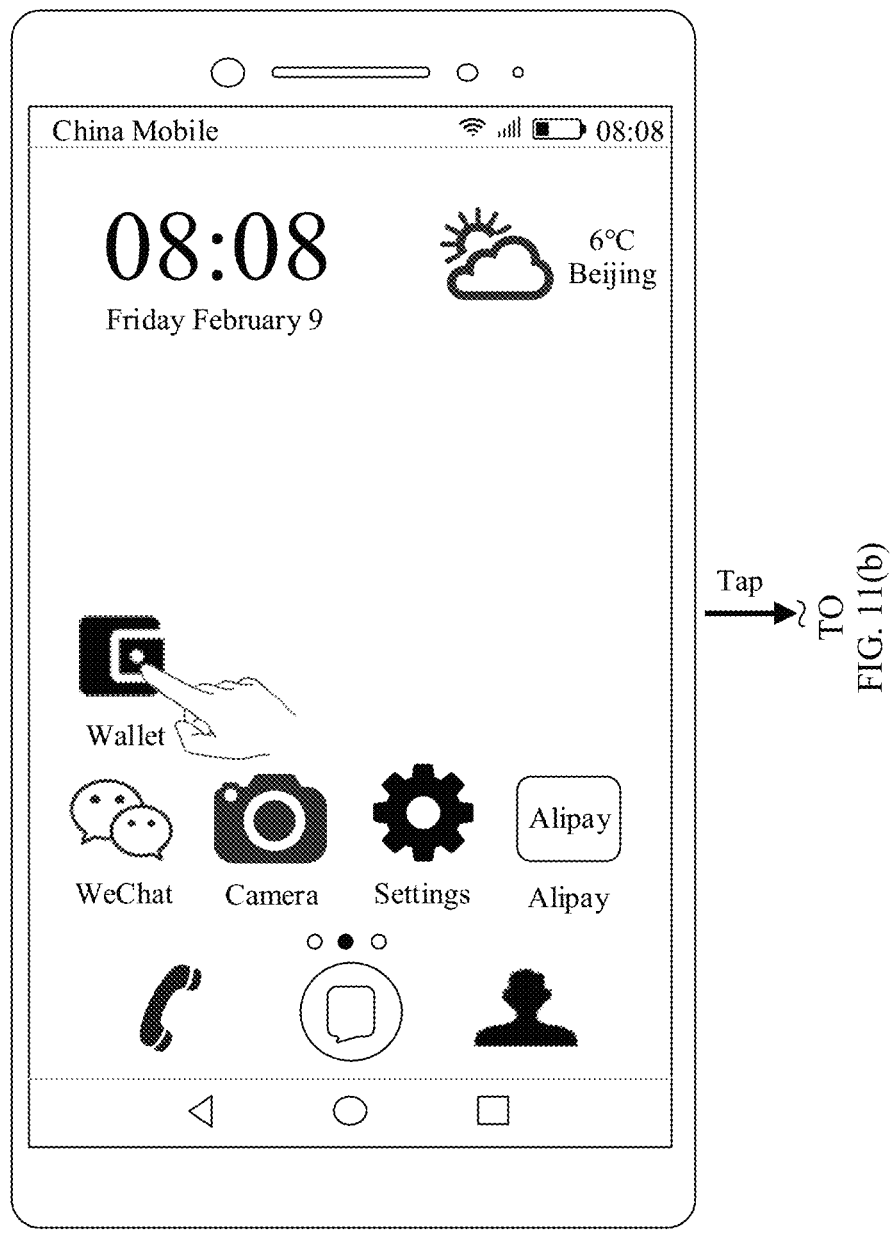
FIG. 11(a) to FIG. 11(e) are a schematic diagram of another group of display interfaces according to an embodiment of this application.
Figure 11B:
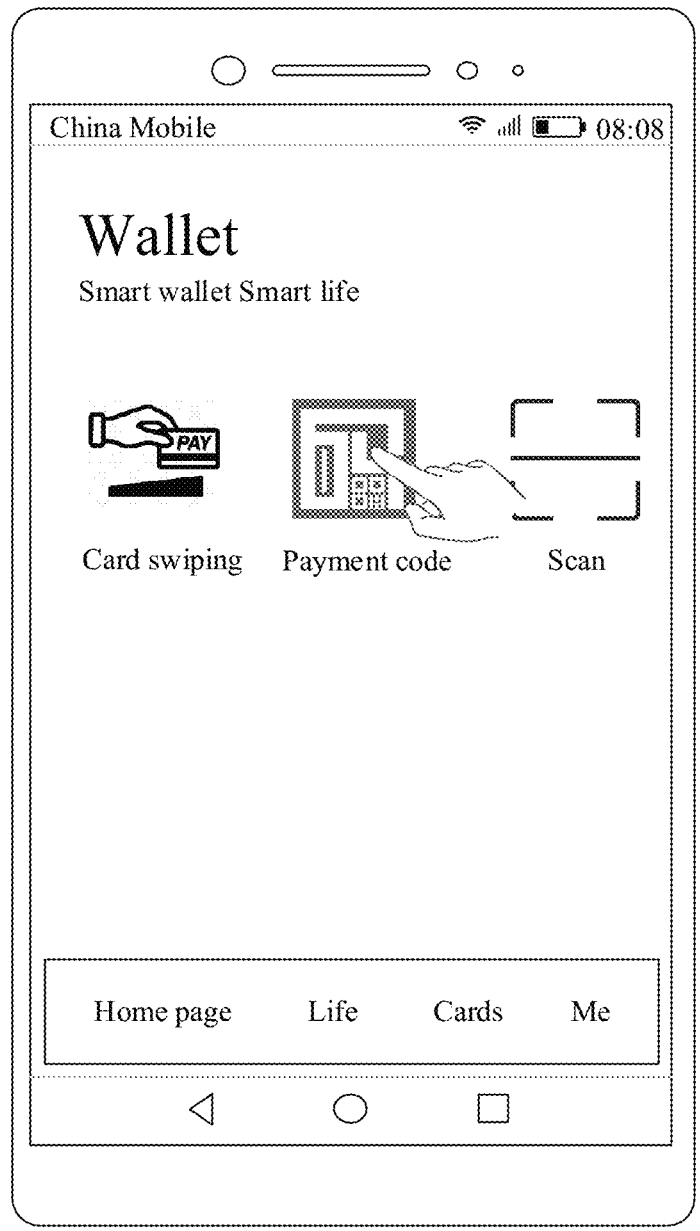
Figure 11C:
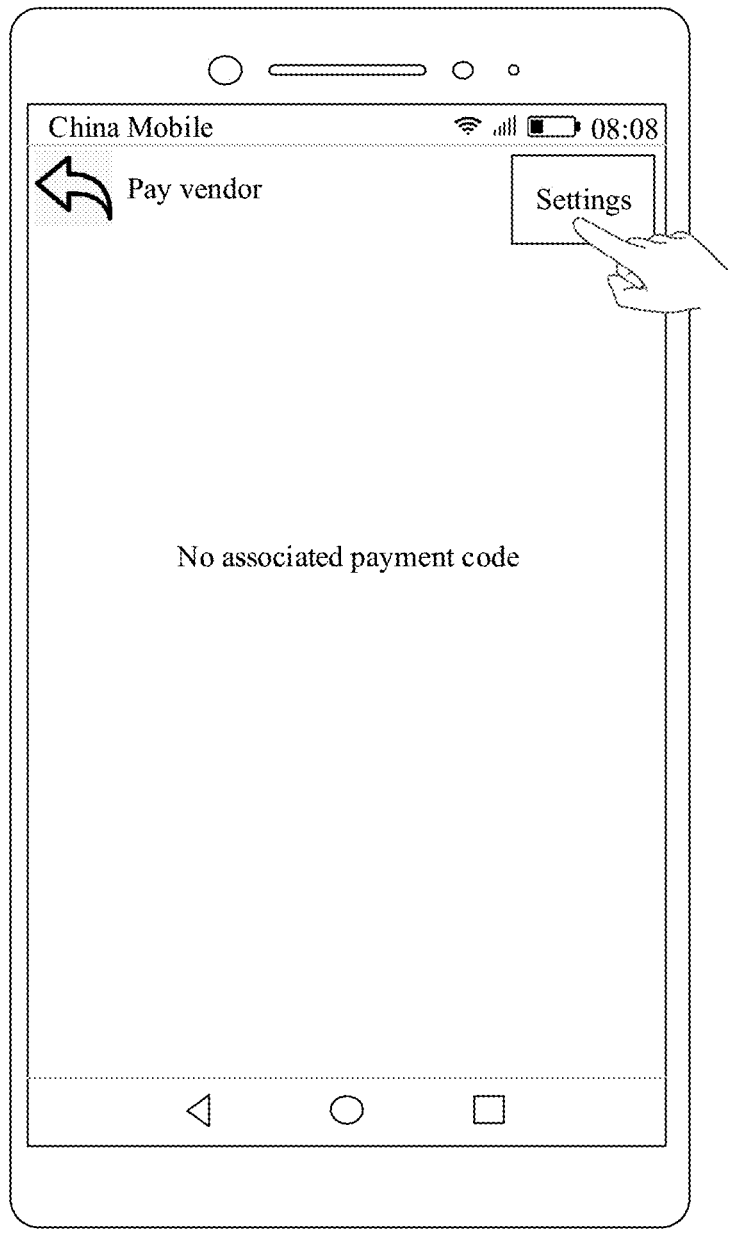
Figure 11D:
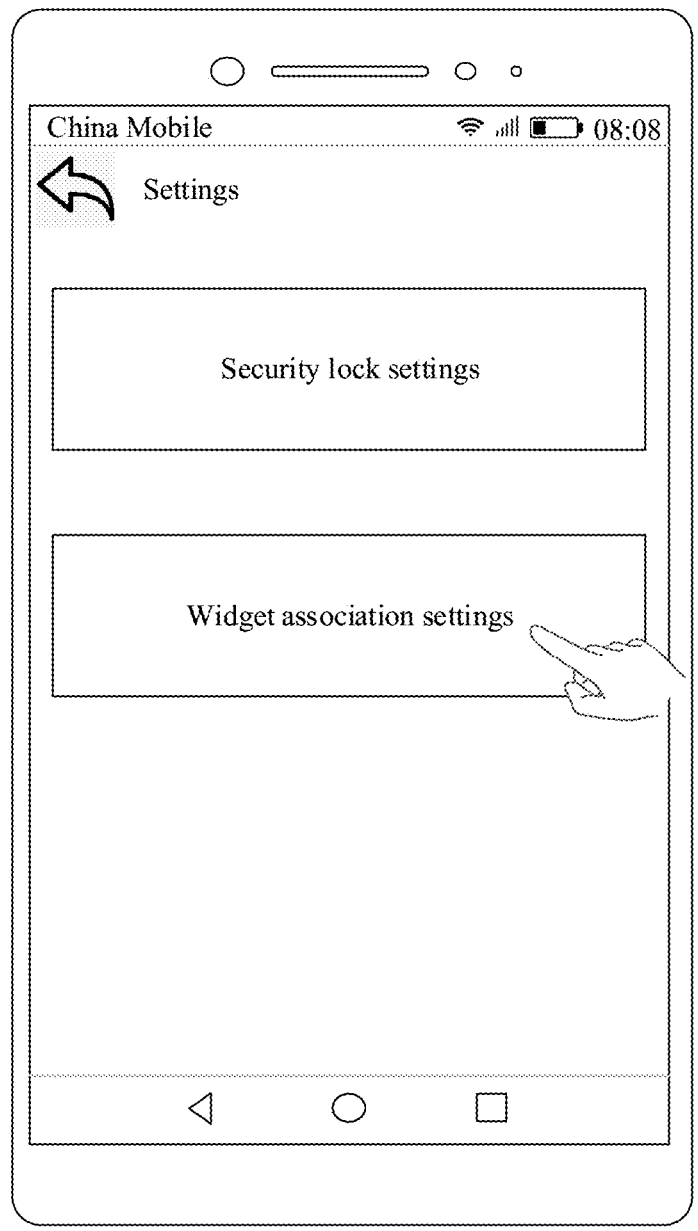
Figure 11E:
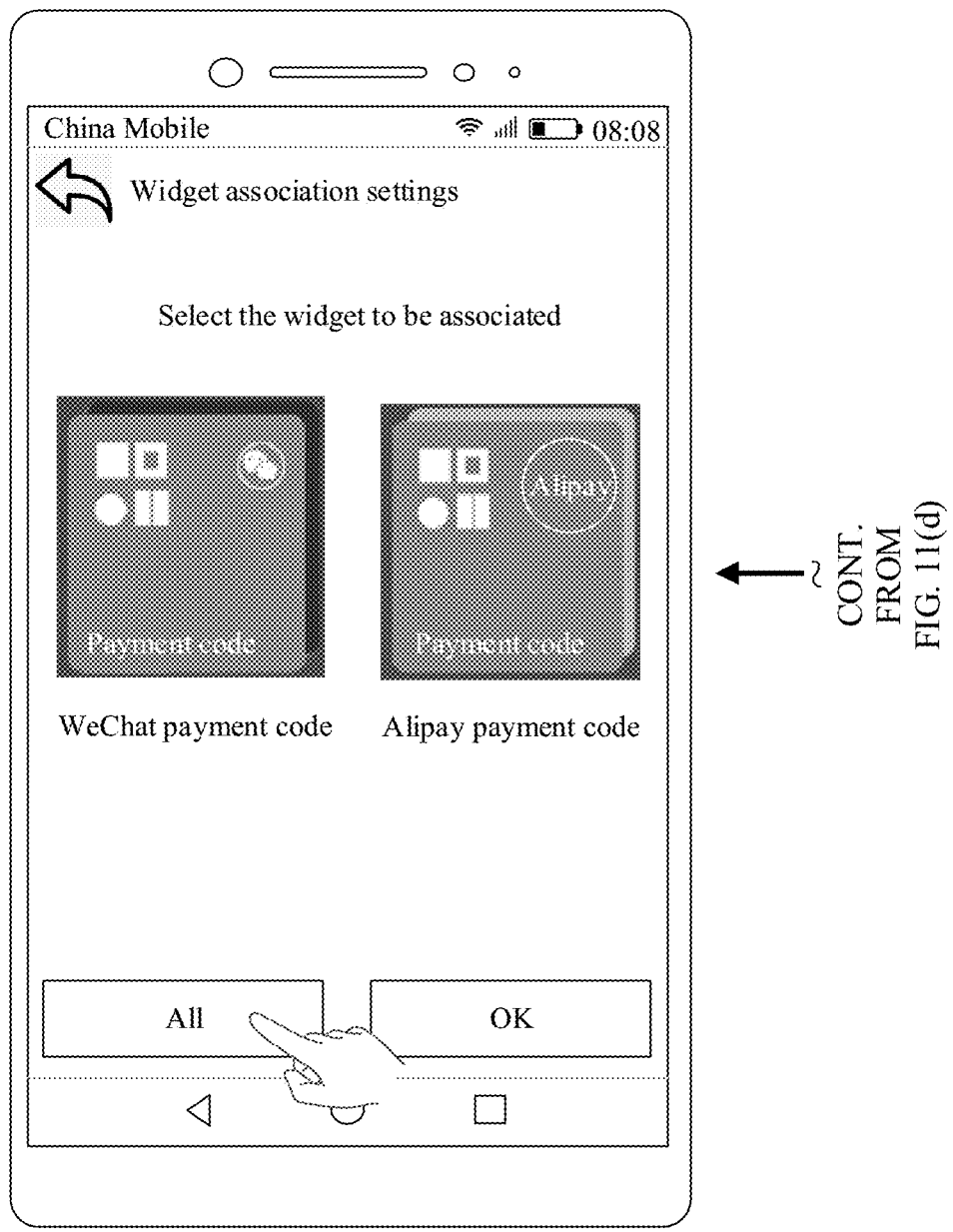

A manner in which the mobile phone may determine, based on the user settings, the plurality of widgets corresponding to the widget set includes but is not limited to the following manners:

For example, as shown in FIG. 11(a), the user taps the wallet icon, and the mobile phone receives the tap operation performed by the user on the wallet icon. As shown in FIG. 11(b), the mobile phone enters a home page interface of "Wallet" in response to the tap operation performed by the user on the wallet icon, and the user may perform a tap operation on a "Payment code" component on the home page interface. As shown in FIG. 11(c), the mobile phone enters a payment code interface in response to the tap operation performed by the user on the "Payment code" component, the payment code interface may display a payment code associated with "Wallet", and the user may perform a tap operation on a "Settings" component on the payment code interface. As shown in FIG. 11(d), the mobile phone enters a payment code setting interface in response to the tap operation performed by the user on the "Settings" component on the payment code interface, the payment code setting interface displays a "Widget association settings" component, and the user may perform a tap operation on the "Widget association settings" component. As shown in FIG. 11(e), the mobile phone enters a widget association setting interface in response to the tap operation performed by the user on the "Widget association settings" component on the payment code setting interface, the widget association setting interface may display widgets that can be associated with "Wallet" such as the "WeChat payment code" widget and the "Alipay payment code" widget, and the user may tap an "All" component on the widget association setting interface to select all widgets currently on the widget association setting interface, so as to associate "Wallet" with the "WeChat payment code" widget and the "Alipay payment code" widget. After the user associates "Wallet" with the "WeChat payment code" widget and the "Alipay payment code" widget, the mobile phone may determine the "WeChat payment code" widget and the "Alipay payment code" widget based on "Wallet" corresponding to the wallet icon. In this case, the "WeChat payment code" widget and the "Alipay payment code" widget are widgets corresponding to the wallet icon. In other words, the user may associate an application corresponding to the target icon with widgets of other applications on the mobile phone. In this way, a plurality of widgets associated with the application corresponding to the target icon are the plurality of widgets corresponding to the widget set.

It should be noted that a case of determining the plurality of widgets corresponding to the widget set in this embodiment of this application includes but is not limited to the foregoing plurality of cases. This is not limited in this embodiment of this application.

In some embodiments, a widget in the widget set may display one or more components. The user may perform an operation on a component on the widget. In response to the operation performed by the user on the component on the widget, the mobile phone enters a specific interface in an application corresponding to the widget, or implement a corresponding function.

Figure 12B:
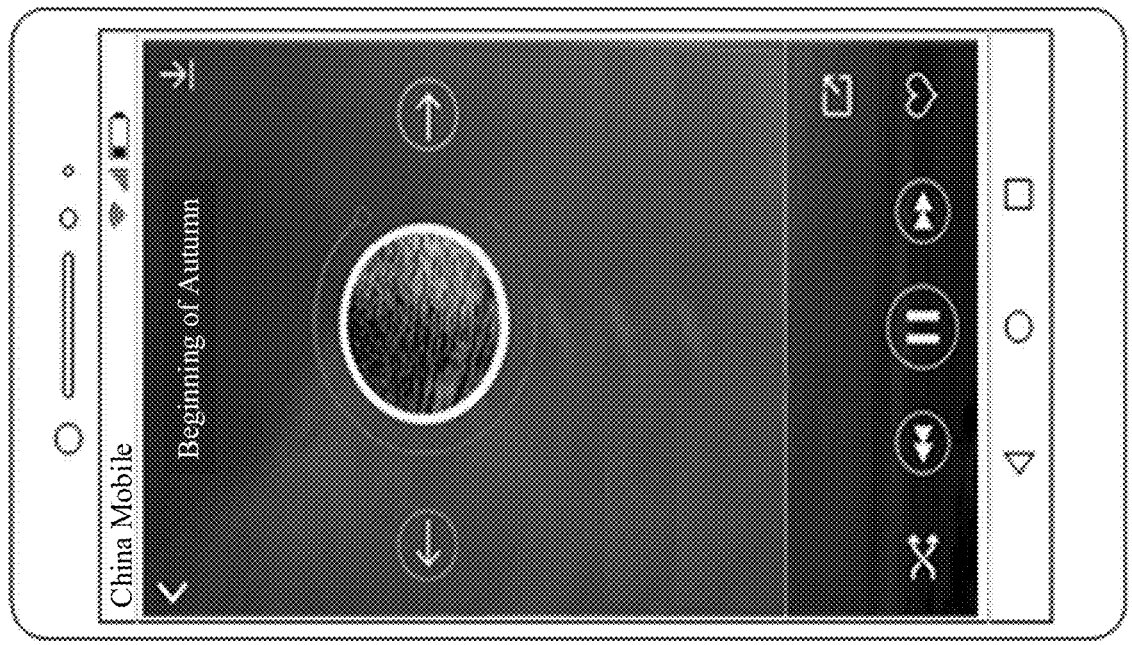
FIG. 12(a) to FIG. 12(d) are a schematic diagram of another group of display interfaces according to an embodiment of this application.
Figure 12A:
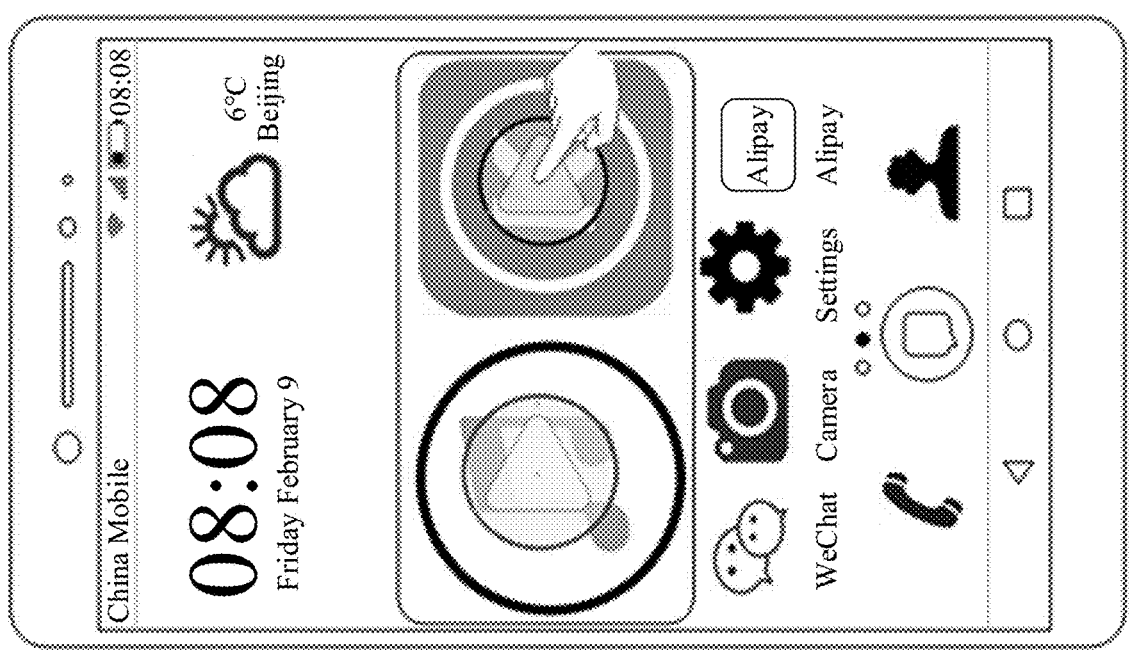
Figure 12D:
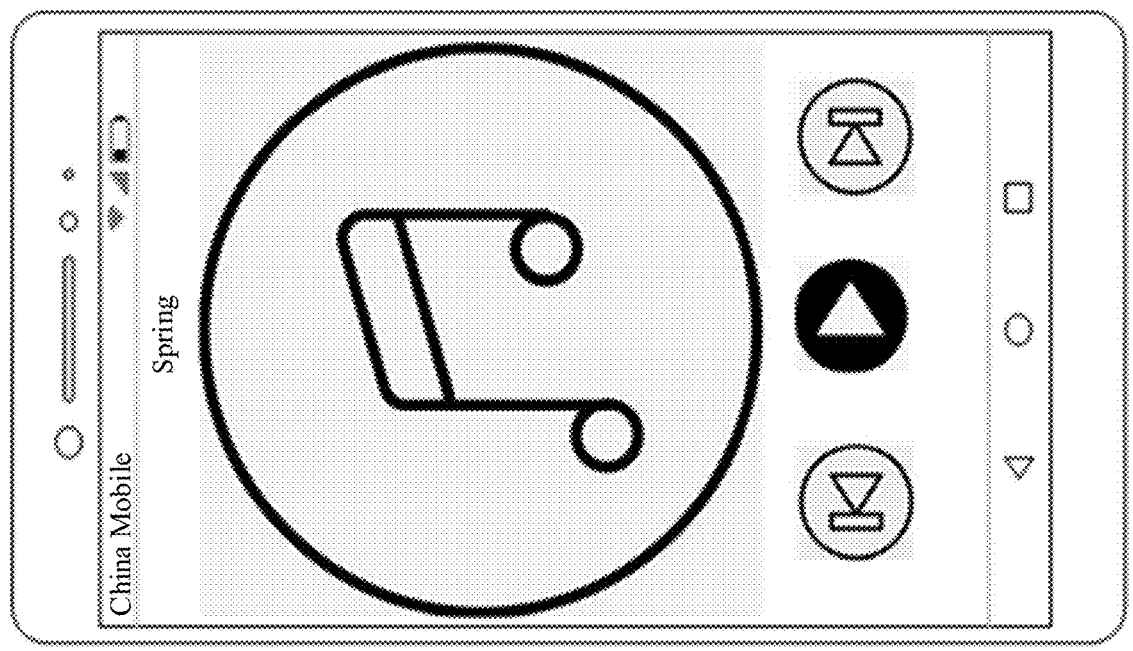
Figure 12C:
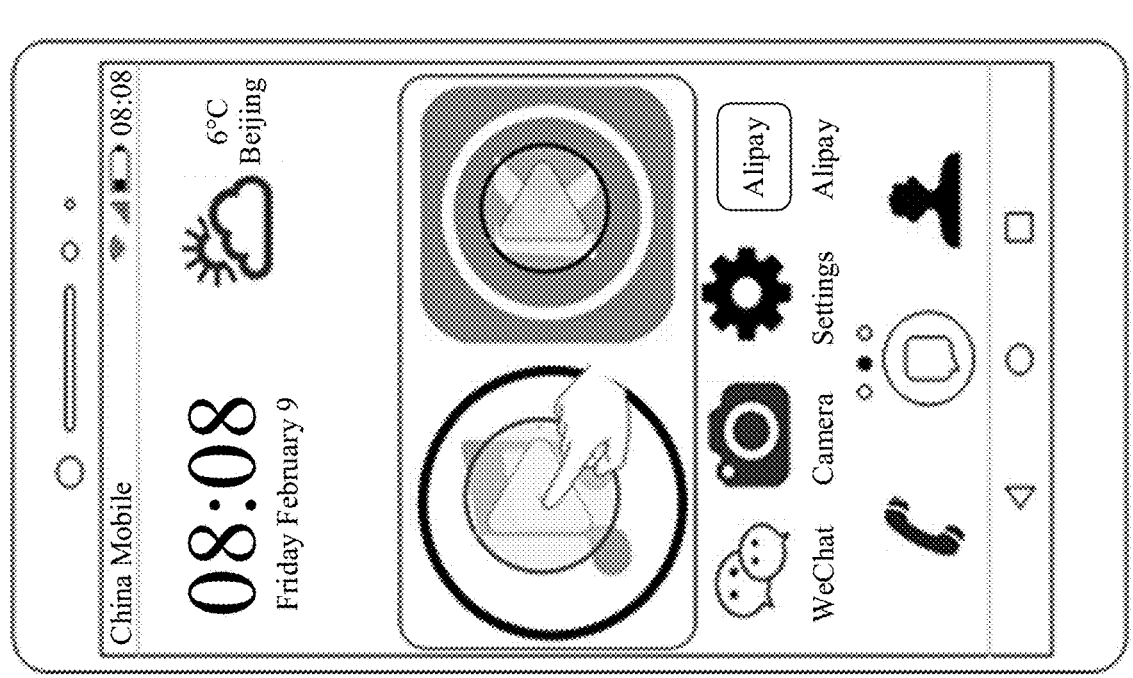

For example, as shown in FIG. 12(a), a play component is displayed on the "Music 2" widget in the widget set on the home screen of the mobile phone, the play component is a triangular virtual button, and the user may perform a tap operation on the play component. As shown in FIG. 12(b), the mobile phone enters a music playing interface in "Music 2" in response to the tap operation performed by the user on the play component on the "Music 2" widget. Likewise, as shown in FIG. 12(c), a play component is displayed on the "Music 1" widget in the widget set on the home screen of the mobile phone, and the user may perform a tap operation on the play component. As shown in FIG. 12(d), the mobile phone enters a music playing interface in "Music 1" in response to the tap operation performed by the user on the play component on the "Music 1" widget.

For another example, as shown in FIG. 12(a), a play component is displayed on the "Music 2" widget in the widget set on the home screen of the mobile phone, the user may perform a tap operation on the play component, and the mobile phone plays music in "Music 2" in response to the tap operation performed by the user on the play component on the "Music 2" widget, to implement a function of playing music in "Music 2".

In some embodiments, a widget in the widget set may display one or more components. The user may perform the operation 2 on an area other than a component displayed on the widget. In response to the operation 2 performed by the user on the area other than the component on the widget, the mobile phone enters a main interface in an application corresponding to the widget.

Figure 13B:
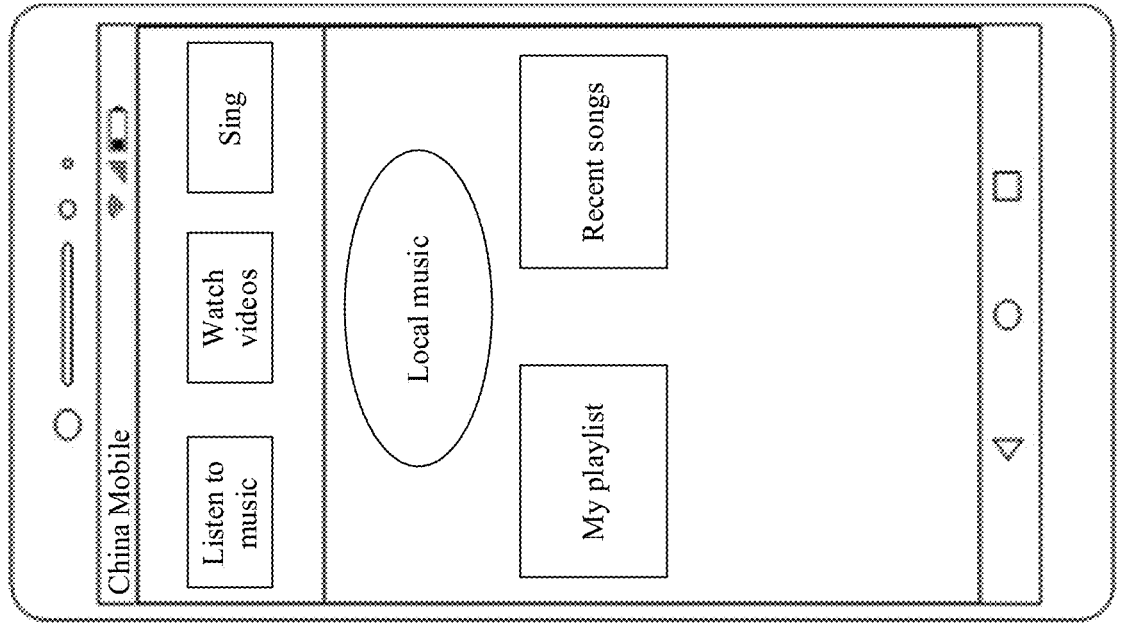
FIG. 13(a) to FIG. 13(d) are a schematic diagram of another group of display interfaces according to an embodiment of this application.
Figure 13A:
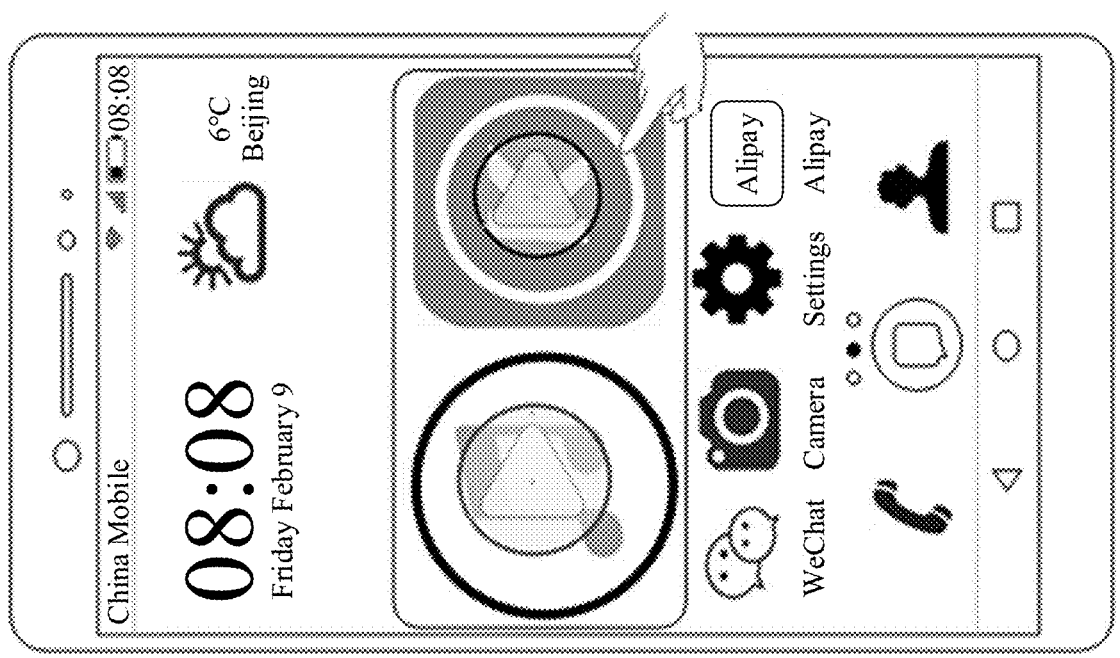
Figure 13D:
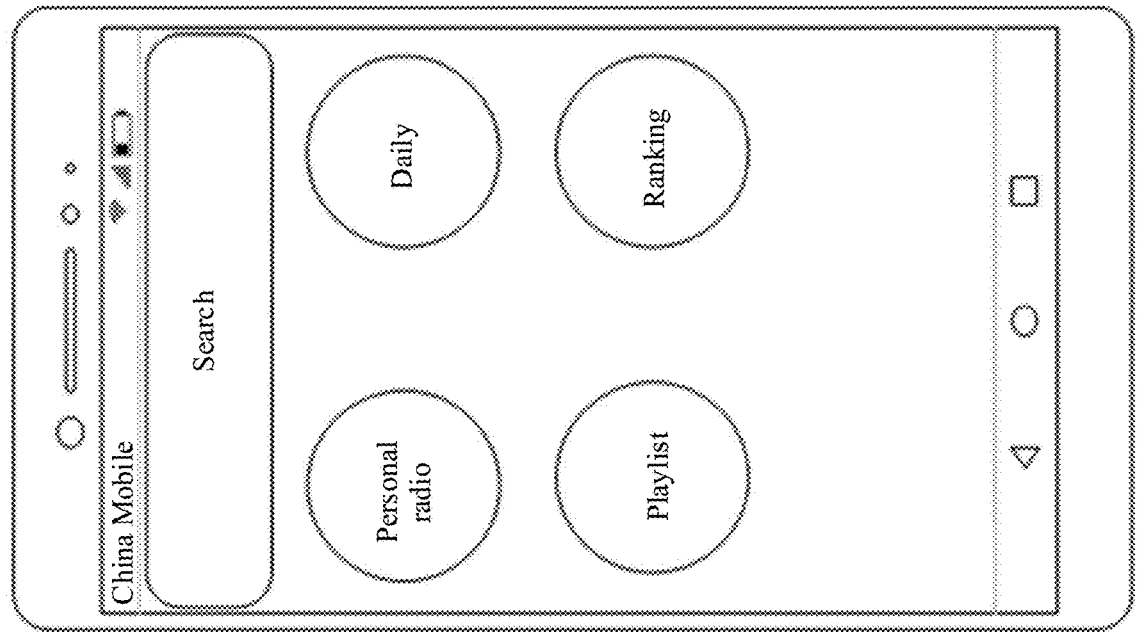
Figure 13C:
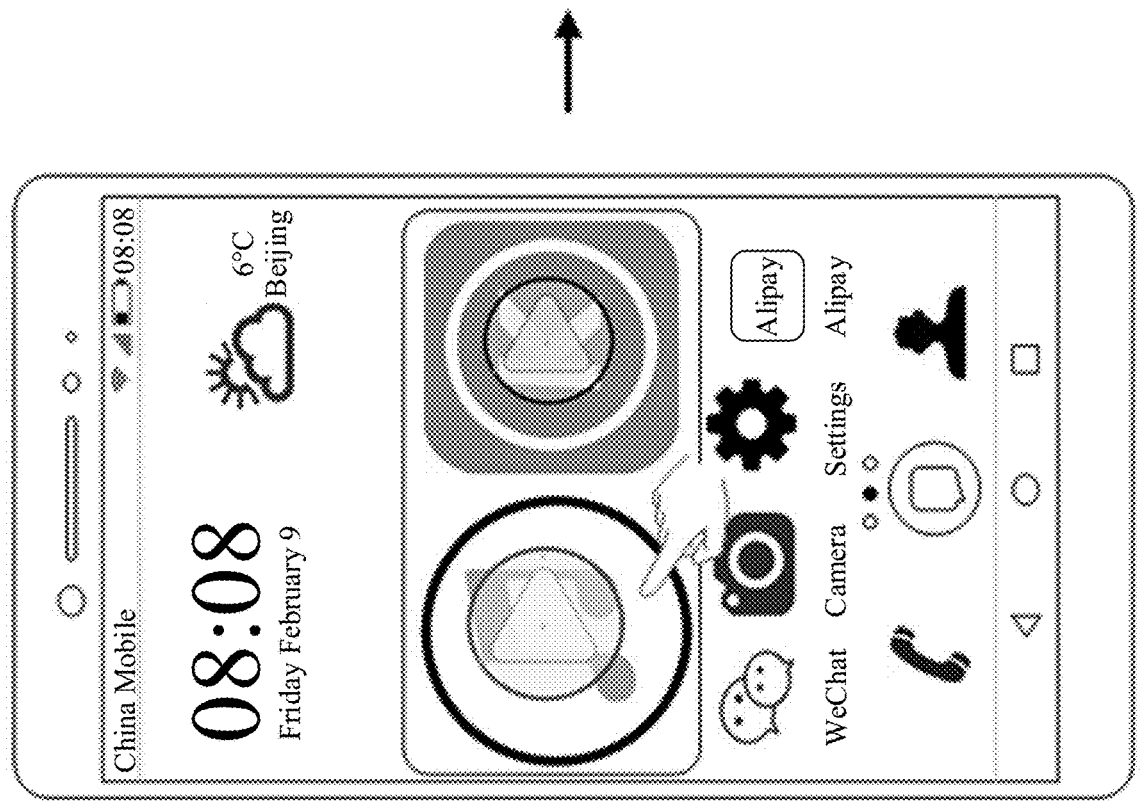

For example, as shown in FIG. 13(a), a play component is displayed on the "Music 2" widget in the widget set on the home screen of the mobile phone, and the user may perform a tap operation on an area (which may also be referred to as a remaining heat area) other than the play component on the "Music 2" widget. As shown in FIG. 13(b), the mobile phone enters a main interface in "Music 2" in response to the tap operation performed by the user on the remaining heat area on the "Music 2" widget. Likewise, as shown in FIG. 13(c), a play component is displayed on the "Music 1" widget in the widget set on the home screen of the mobile phone, an area other than the play component on the "Music 1" widget is a remaining heat area, and the user may perform a tap operation on the remaining heat area on the "Music 1" widget. As shown in FIG. 13(d), the mobile phone enters a main interface in "Music 1" in response to the tap operation performed by the user on the remaining heat area on the "Music 1" widget. In other words, the operation 2 may be specifically used to trigger to enter the application interface corresponding to the target widget.

It may be understood that the foregoing embodiment is described by using an example in which the target icon is an icon of an application. However, an icon that can be switched to the widget set is not limited thereto. For example, the target icon may alternatively be an icon of a folder including a plurality of applications.

Figure 14A:
FIG. 14(a) to FIG. 14(e) are a schematic diagram of another group of display interfaces according to an embodiment of this application.
Figure 14B:
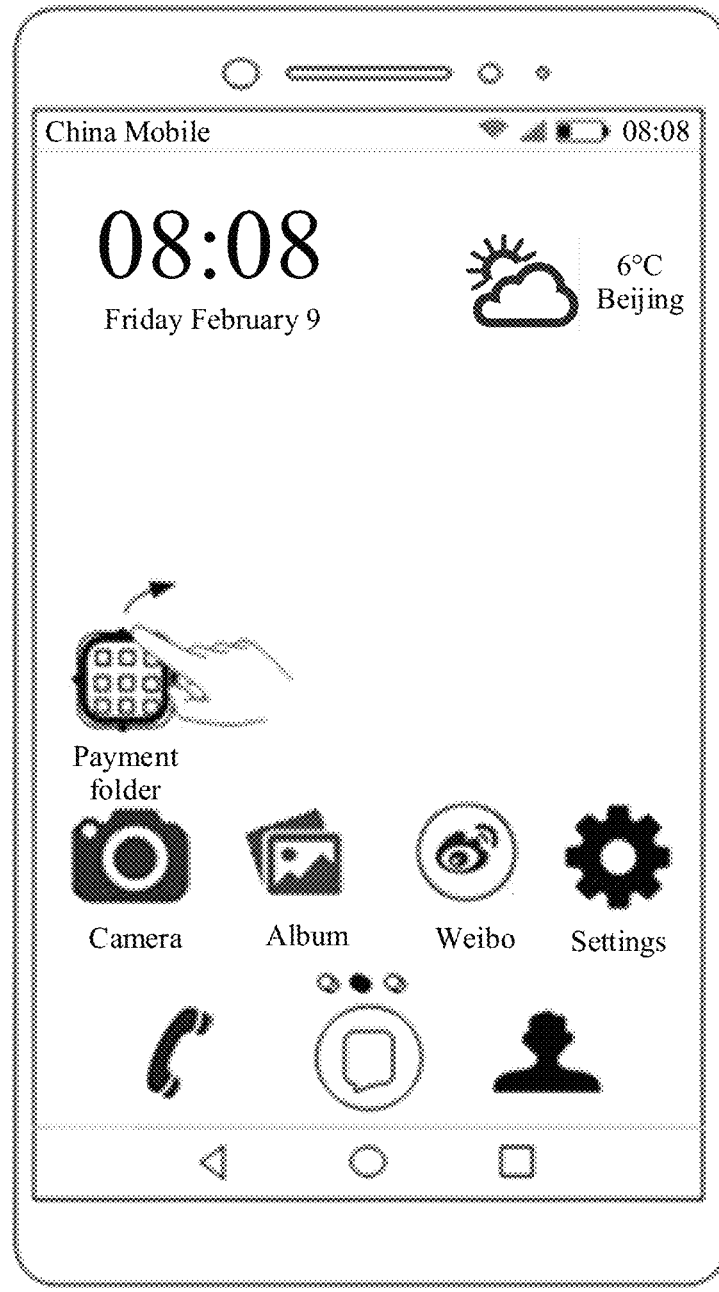
Figure 14C:
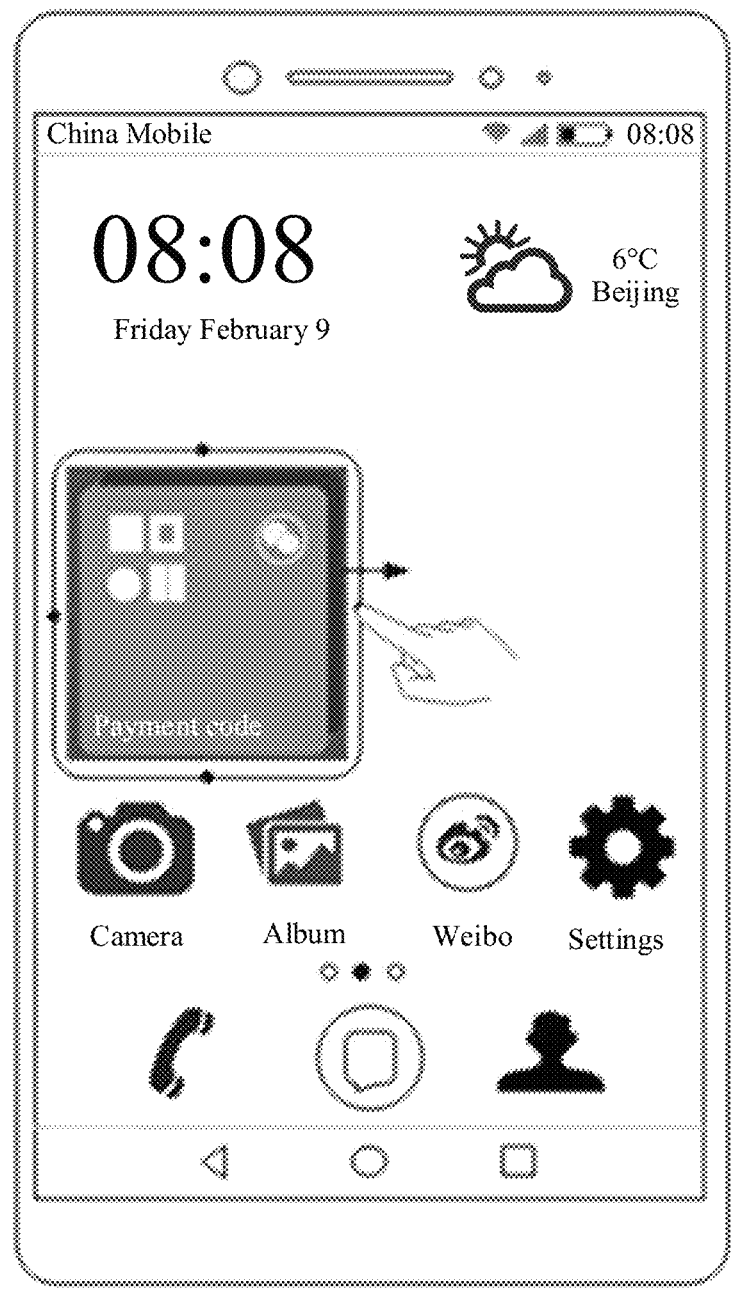
Figure 14D:
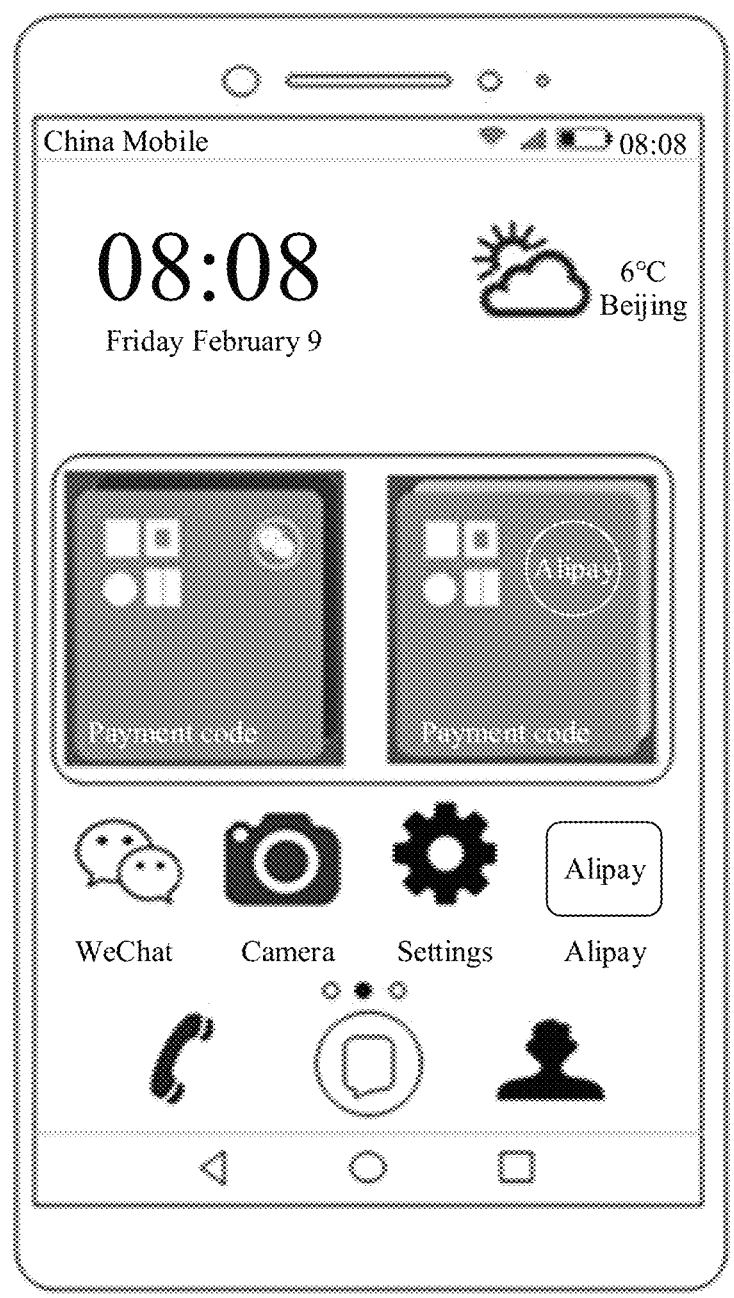
Figure 14E:
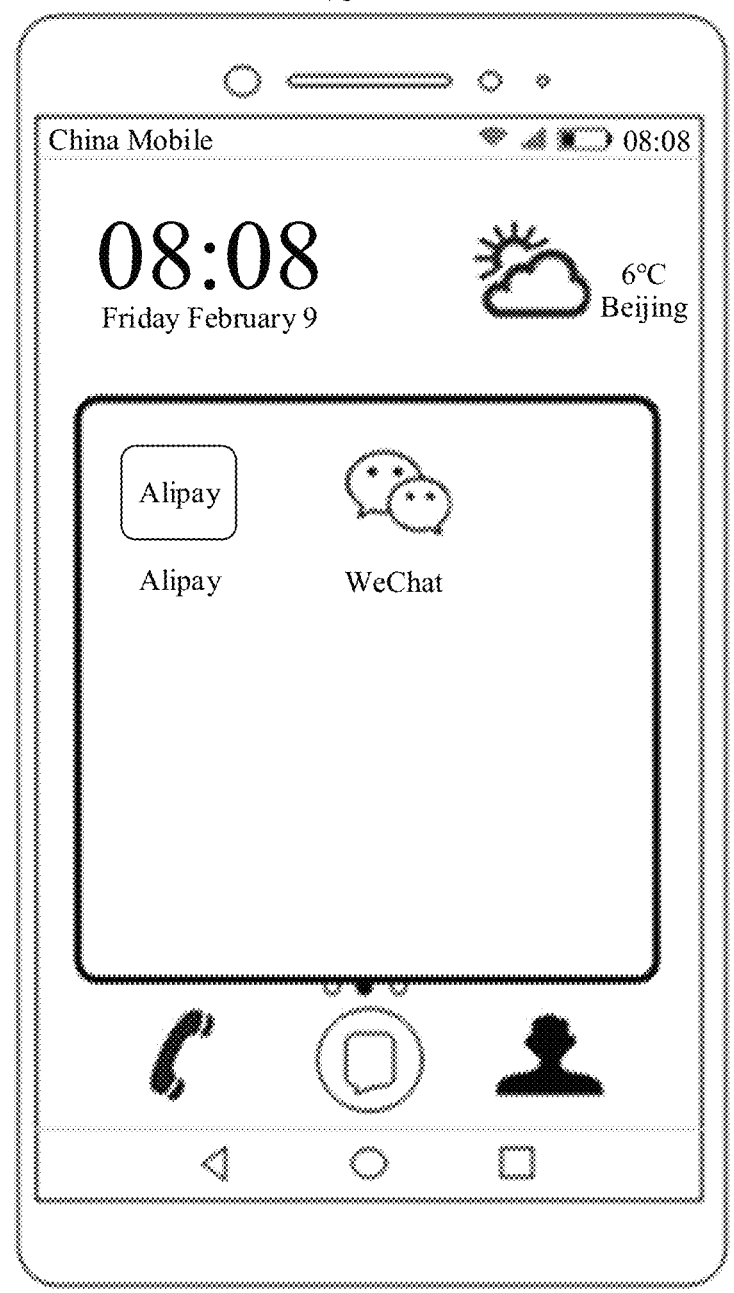

For example, as shown in FIG. 14(a), the home screen of the mobile phone includes a payment folder, and the user may perform a tap operation on the payment folder to enter the payment folder; or the user may perform a stretch operation on the payment folder after performing a touch and hold operation on the payment folder, to switch a payment folder icon to a widget set. As shown in FIG. 14(e), after the user performs the tap operation on the payment folder, the mobile phone may receive the tap operation performed by the user on the payment folder, and the mobile phone enters an interface of the payment folder in response to the tap operation performed by the user, and displays applications included in the payment folder, for example, "Alipay" and "WeChat". As shown in FIG. 14(b), the user may perform a touch and hold operation on the payment folder, the mobile phone receives the touch and hold operation performed by the user on the payment folder, and in response to the touch and hold operation performed by the user, the mobile phone displays a frame that matches dimensions and a size of the payment folder icon around the payment folder icon, to indicate the user to stretch the payment folder icon. As shown in FIG. 14(c), the user may perform a stretch operation on the frame of the payment folder icon, the mobile phone receives the stretch operation performed by the user on the payment folder icon, and the mobile phone switches the payment folder icon to the widget set in response to the stretch operation performed by the user. The widget set includes the "WeChat payment code" widget and the "Alipay payment code" widget, and the widget set displays the "WeChat payment code" widget. As shown in FIG. 14(d), the user may further perform a stretch operation on the widget set, the mobile phone receives the stretch operation performed by the user on the widget set, and the mobile phone changes the widget set to a new widget set in response to the stretch operation performed by the user. A display region of the new widget set is larger, and can simultaneously display the "WeChat payment code" widget and the "Alipay payment code" widget.

In a possible implementation, the folder may include a plurality of applications of a same type. As shown in FIG. 14(e), the payment folder includes two payment-type applications: "Alipay" and "WeChat".

Figure 15A:
FIG. 15(a) to FIG. 15(e) are a schematic diagram of another group of display interfaces according to an embodiment of this application.
Figure 15B:
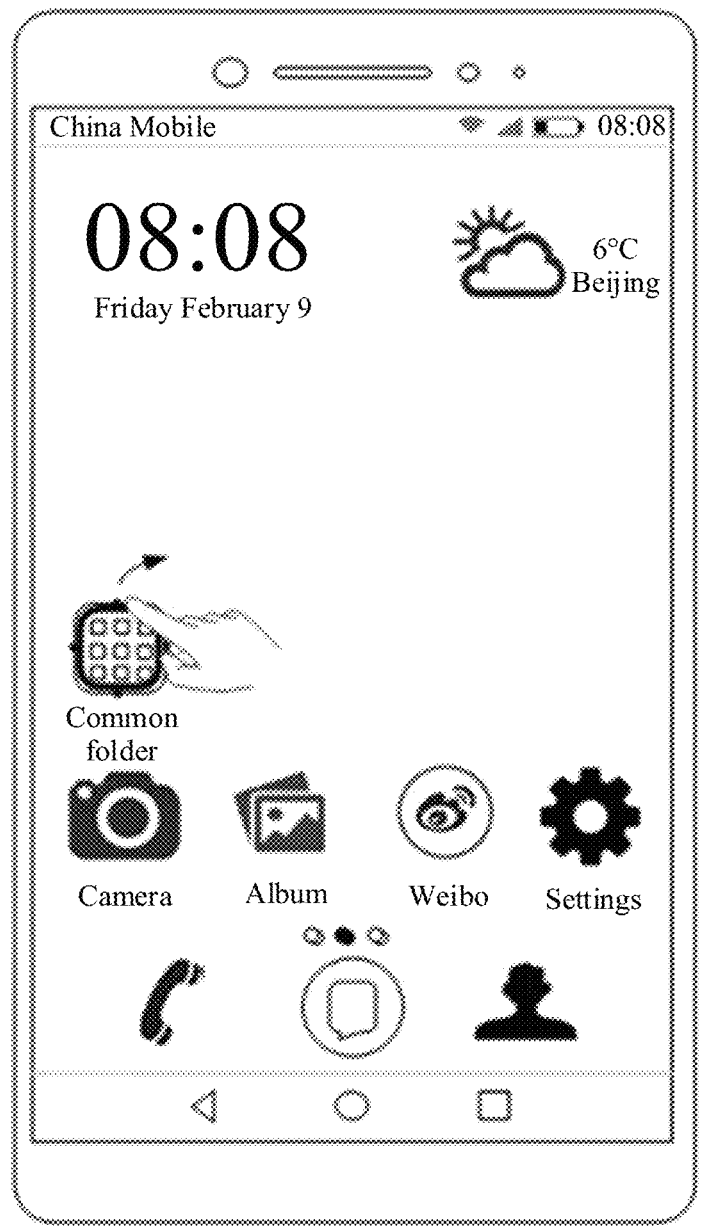
Figure 15C:
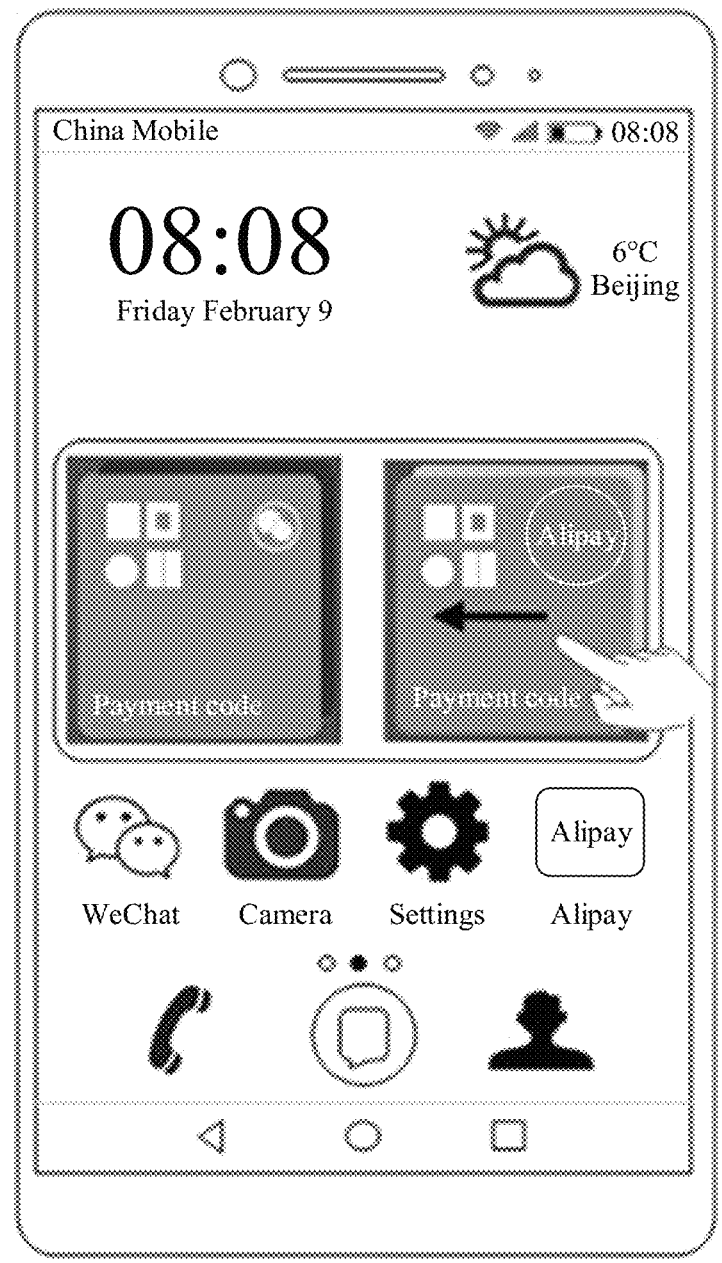
Figure 15D:
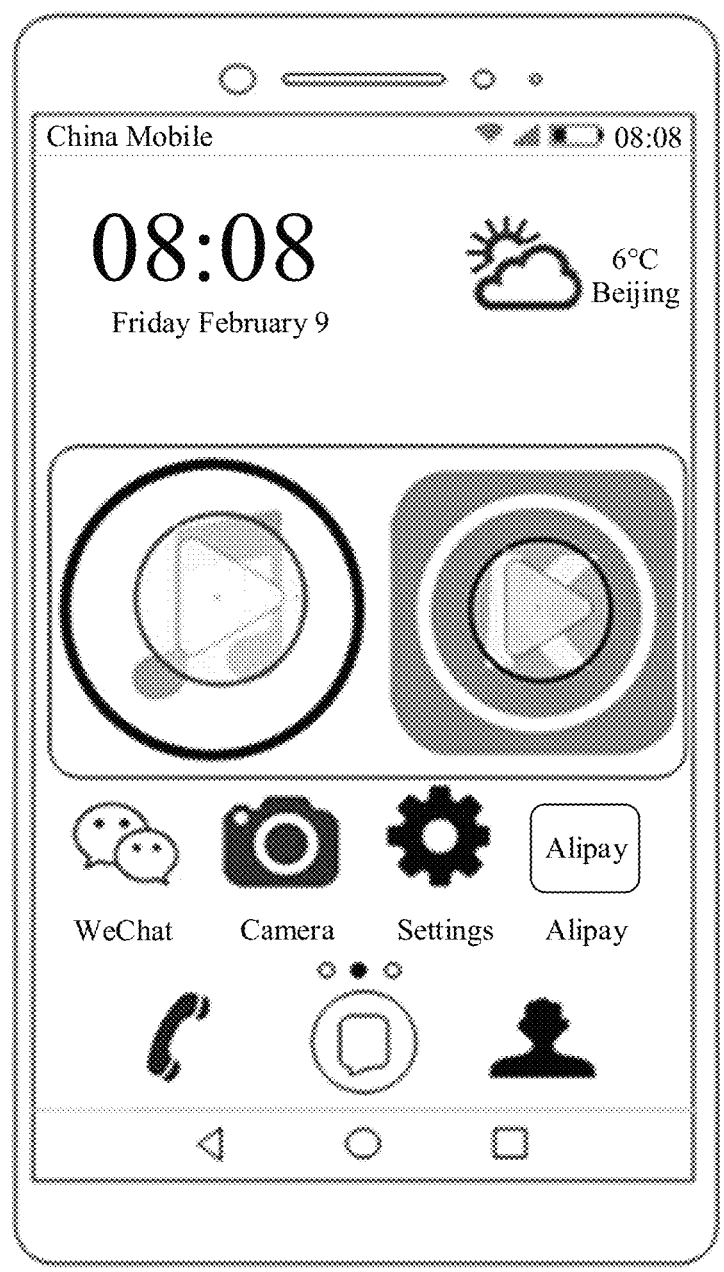
Figure 15E:
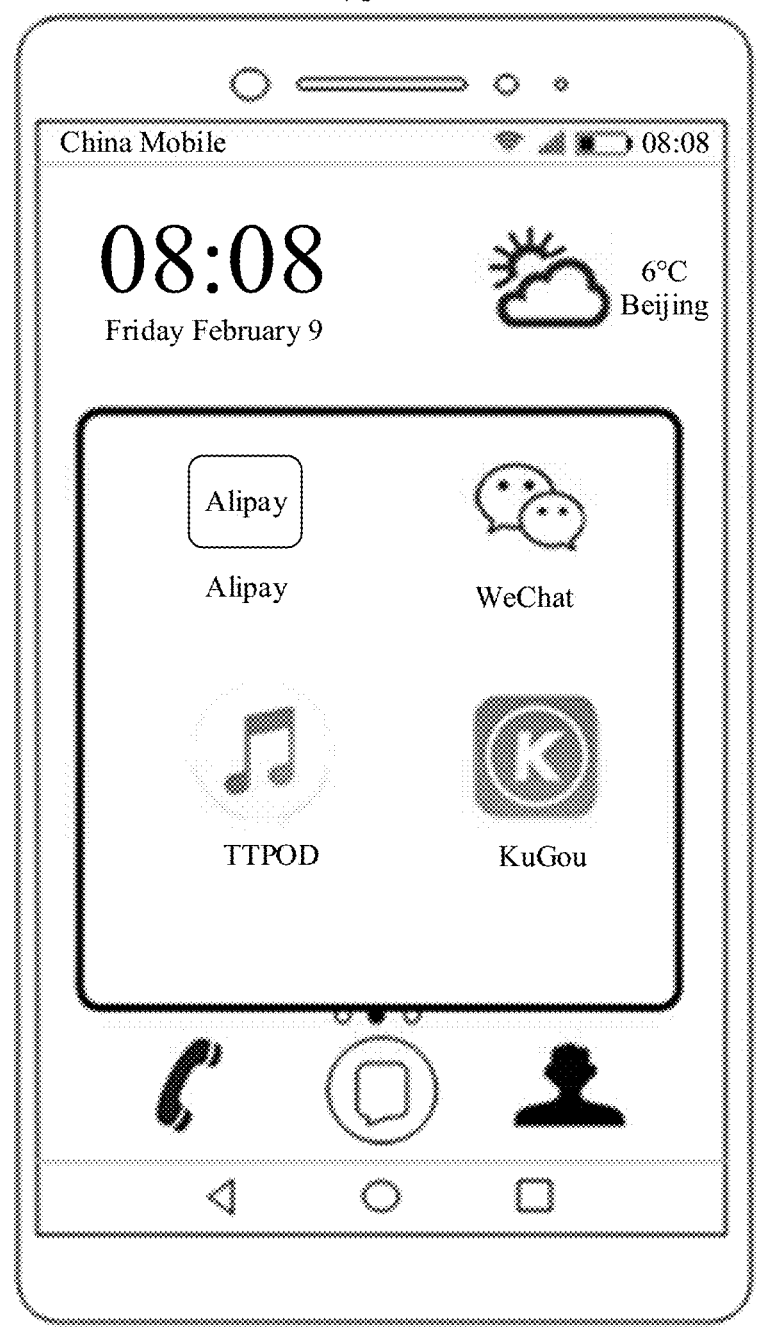

In another possible implementation, the folder may alternatively include a plurality of applications of different types. As shown in FIG. 15(a), the home screen of the mobile phone includes a folder, the user names the folder as a common folder, and the common folder includes applications frequently used by the user. As shown in FIG. 15(e), after the user performs a tap operation on the common folder, the mobile phone enters an interface of the common folder in response to the tap operation performed by the user, and displays the applications included in the common folder, namely, "Alipay", "WeChat", "Music 1", and "Music 2". "Alipay" and "WeChat" are payment-type applications, and "Music 1" and "Music 2" are music-type applications. As shown in FIG. 15(b), the user may perform a touch and hold operation on the common folder, and in response to the touch and hold operation performed by the user, the mobile phone displays a frame that matches dimensions and a size of a common folder icon around the common folder icon, to indicate the user to stretch the common folder icon. As shown in FIG. 15(c), the user may perform a stretch operation on the frame on the common folder icon, and the mobile phone switches the common folder icon to a widget set in response to the stretch operation performed by the user. The widget set displays the "WeChat payment code" widget and the "Alipay payment code" widget. As shown in FIG. 15(d), the user may perform a slide-to-page operation on the widget set, and in response to the slide-to-page operation performed by the user on the widget set, the mobile phone changes the "WeChat payment code" widget and the "Alipay payment code" widget displayed in the widget set to the "Music 1" widget and the "Music 2" widget.

In some embodiments, when a folder includes a plurality of applications of different types, the user may perform the foregoing operation 3 on the widget set, and in response to the operation 3 performed by the user on the widget set, the mobile phone changes a widget displayed in the widget set. In other words, the operation 3 may be used to change a widget displayed in the widget set. Specifically, refer to the descriptions corresponding to FIG. 5(a) to FIG. 5(f). Details are not described herein again.

In some embodiments, when a folder includes a plurality of applications of different types, the user may alternatively perform a different operation 6 on the widget set, to change a type of a widget displayed in the widget set. In other words, the mobile phone may receive the different operation 6 performed by the user on the widget set, and in response to the different operation 6 performed by the user on the widget set, the mobile phone changes a widget displayed in the widget set. A type of a changed widget corresponds to a gesture operation. The operation 6 is used to change a category of a widget displayed in the widget set.

Figure 16A:
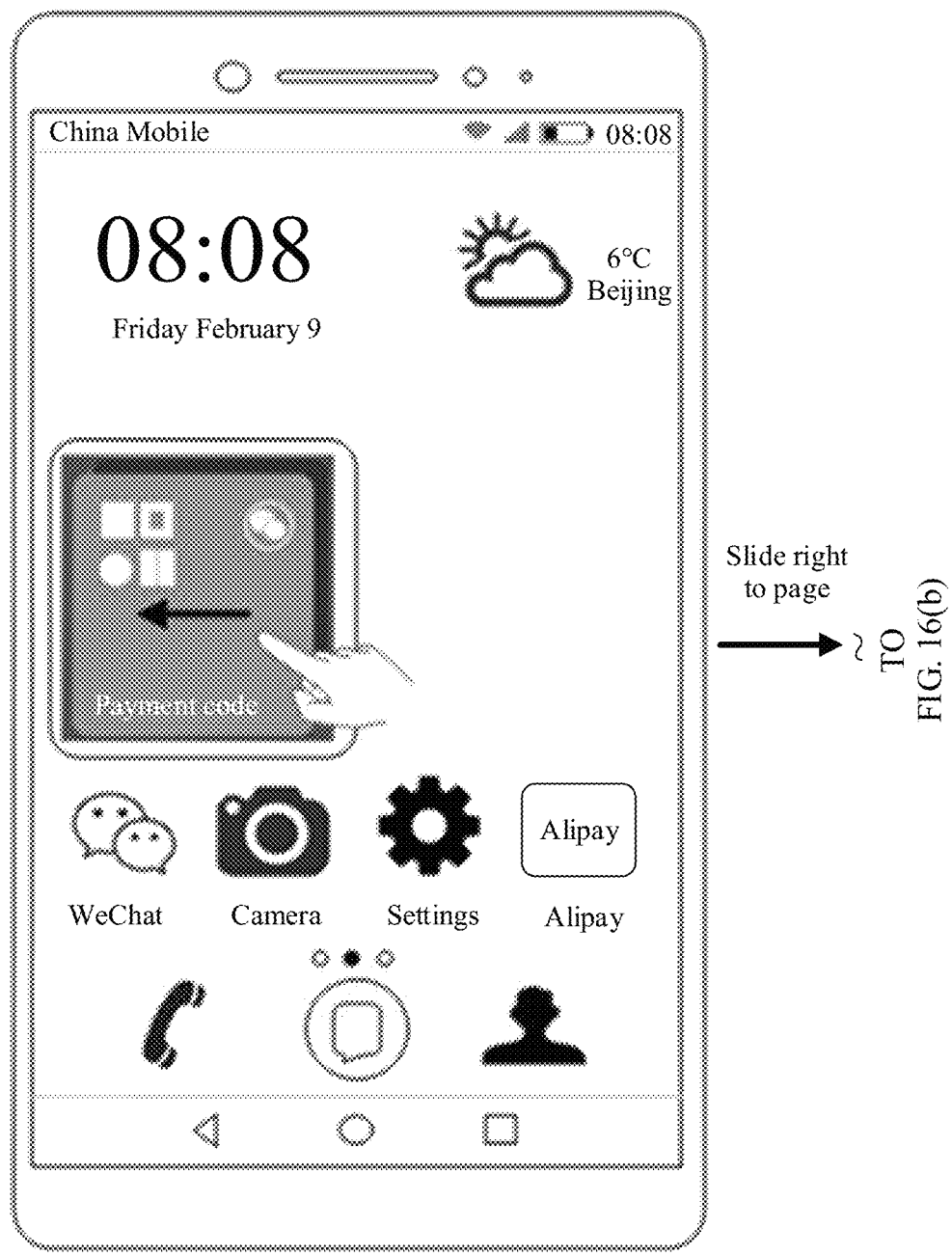
FIG. 16(a) to FIG. 16(f) are a schematic diagram of another group of display interfaces according to an embodiment of this application.
Figure 16B:
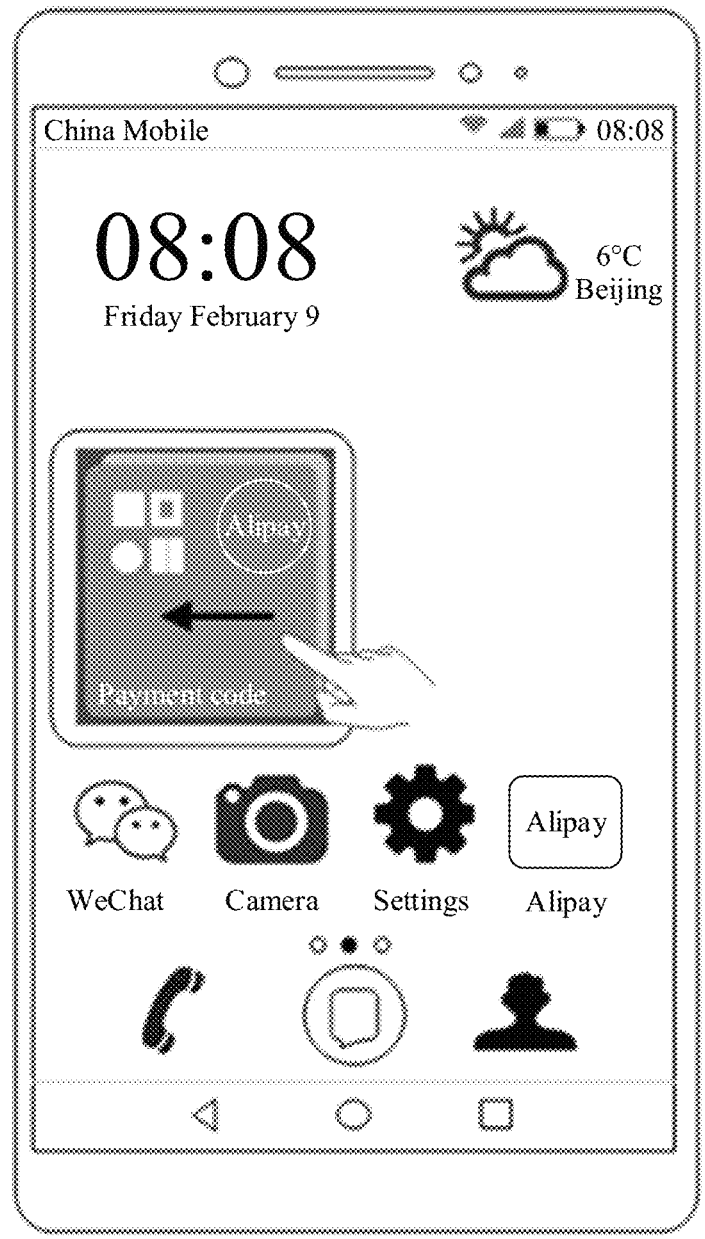
Figure 16C:
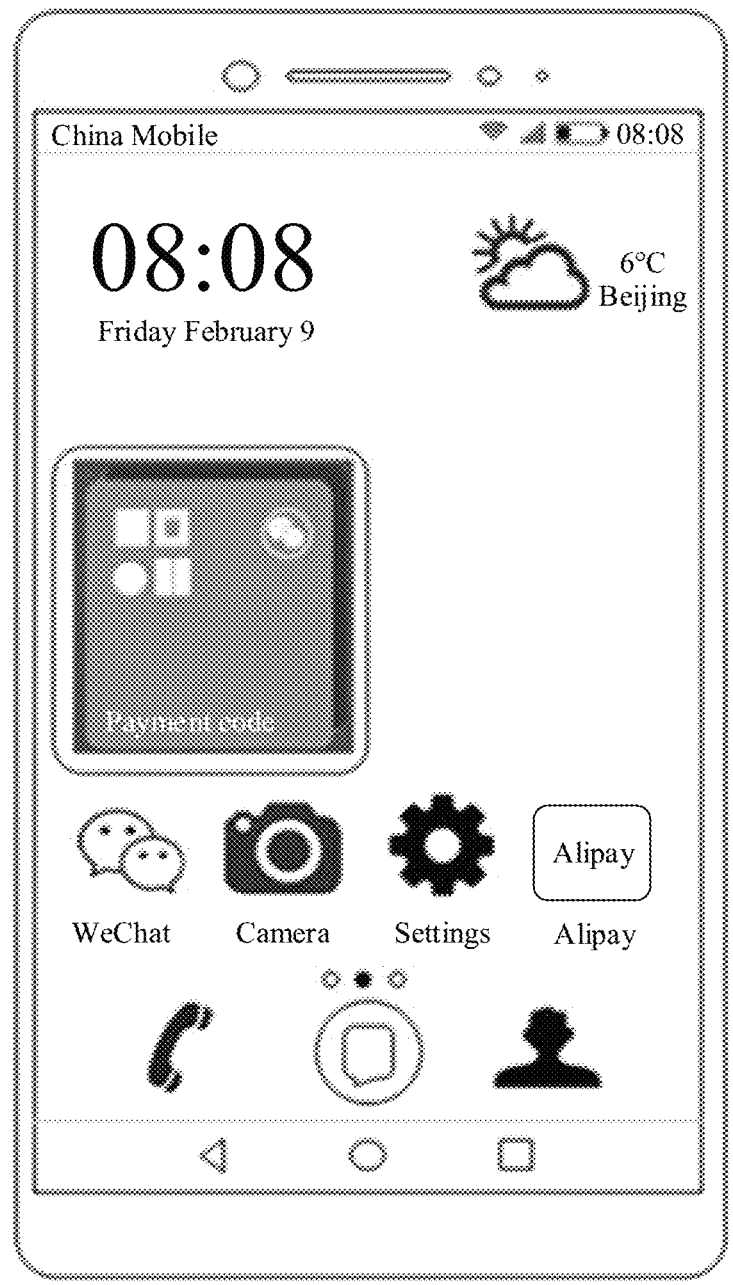

For example, as shown in FIG. 16(a), the widget set on the home screen of the mobile phone includes a plurality of widgets of different types, the widget displayed in the widget set is the "WeChat payment code" widget, and the user may perform a slide-right-to-page operation on the widget set. As shown in FIG. 16(b), the mobile phone may receive the slide-right-to-page operation performed by the user on the widget set, and the mobile phone changes the widget displayed in the widget set to the "Alipay payment code" widget in response to the slide-right-to-page operation performed by the user on the widget set. As shown in FIG. 16(c), the user may further perform a slide-right-to-page operation on the widget set, the mobile phone may receive the slide-right-to-page operation performed by the user on the widget set, and the mobile phone changes the widget displayed in the widget set to the "WeChat payment code" widget in response to the slide-right-to-page operation performed by the user on the widget set. In other words, by performing a slide-right-to-page gesture operation or a slide-left-to-page gesture operation, the user may change the widget displayed in the widget set. In addition, each changed widget is a payment-type widget. In other words, by performing a slide-right-to-page gesture operation or a slide-left-to-page gesture operation, the user may change a payment-type widget displayed in the widget set.

Figure 16D:
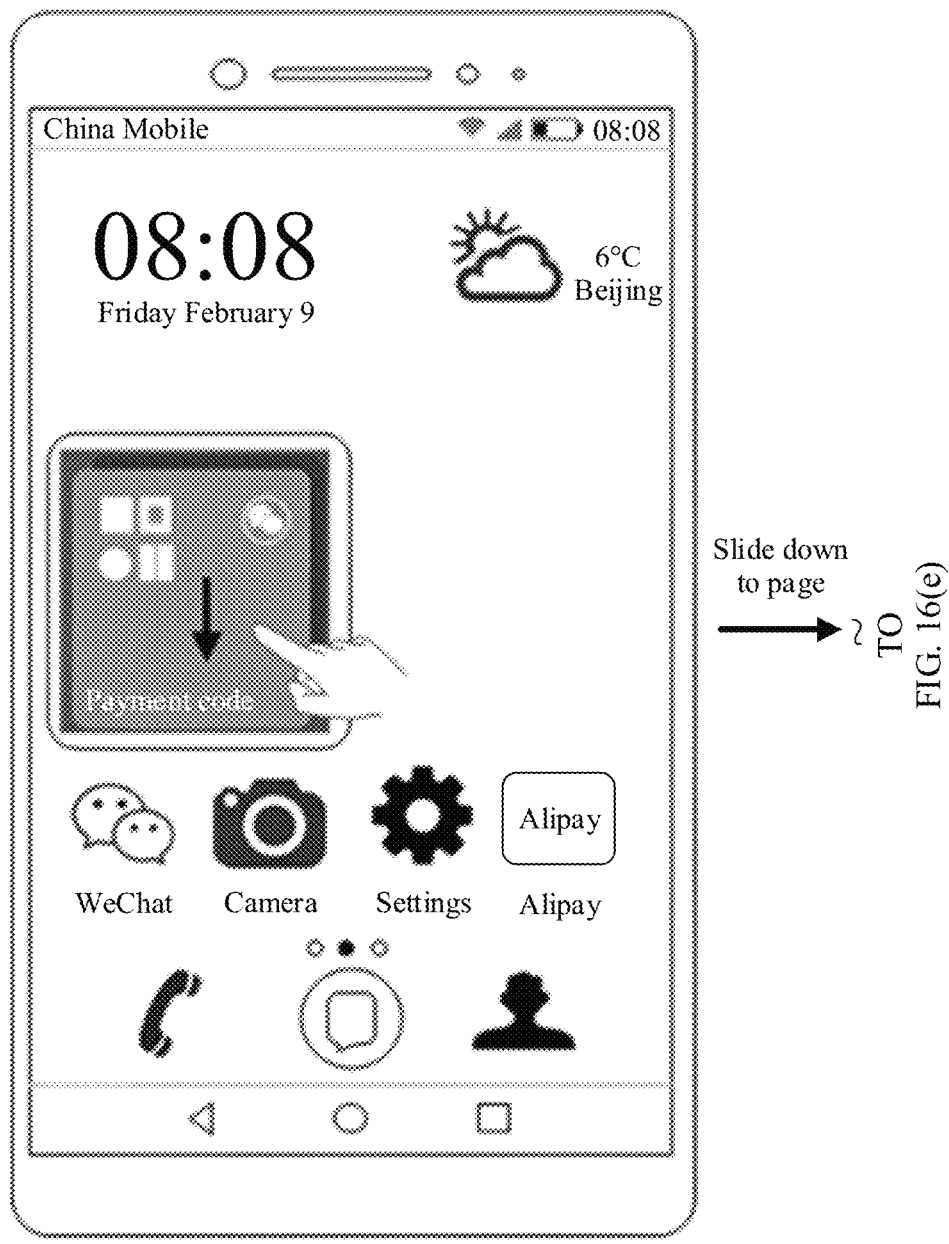
Figure 16E:
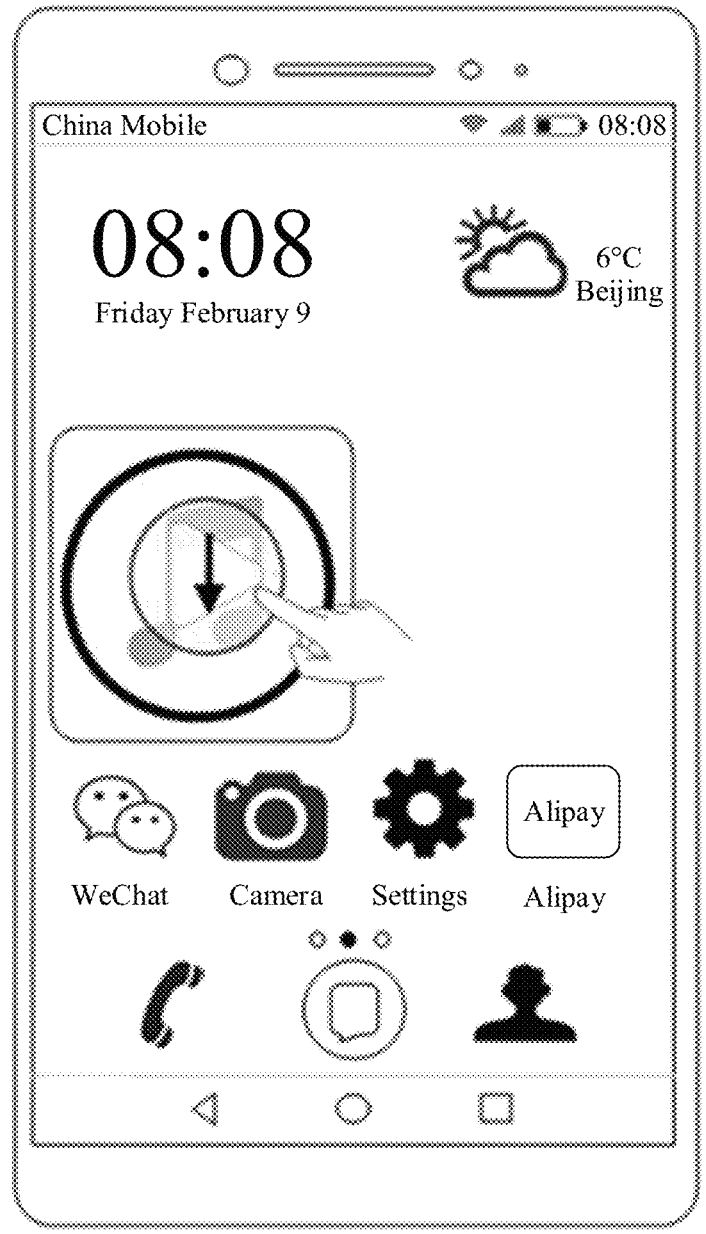
Figure 16F:
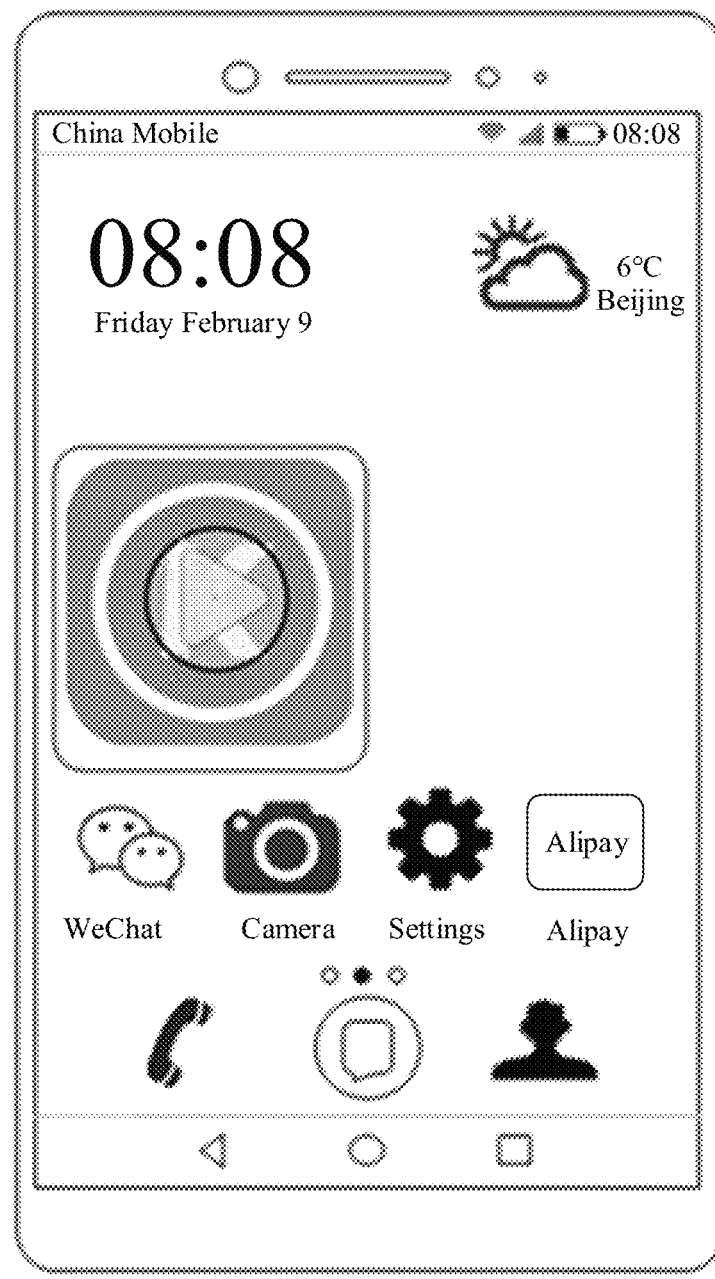

As shown in FIG. 16(d), the widget set displays the "WeChat payment code" widget, and the user may further perform a slide-down-to-page operation on the widget set. As shown in FIG. 16(e), the mobile phone may receive the slide-down-to-page operation performed by the user on the widget set, and the mobile phone changes the widget displayed in the widget set to the "Music 1" widget in response to the slide-down-to-page operation performed by the user on the widget set. As shown in FIG. 16(f), the user may further continue to perform a slide-down-to-page operation on the widget set, the mobile phone may receive the slide-down-to-page operation performed by the user on the widget set, and the mobile phone changes the widget displayed in the widget set to the "Music 2" widget in response to the slide-down-to-page operation performed by the user on the widget set. In other words, by performing a slide-down-to-page gesture operation or a slide-up-to-page gesture operation, the user may change the widget displayed in the widget set. In addition, each changed widget is a music-type widget.

In this embodiment, a gesture operation used to change the widget displayed in the widget set may alternatively be another gesture operation, for example, an oblique slide gesture operation. This embodiment imposes no limitation on the gesture operation. A correspondence between a gesture operation and a type of a changed widget is not limited in this embodiment either. A slide left or right gesture operation may correspond to a payment-type widget, or a slide up or down gesture operation may correspond to a payment-type widget, or an oblique slide gesture operation may correspond to a payment-type widget, or the like.

It should be noted that, when a widget set corresponding to an icon of a folder supports both the operation 3 and the operation 6, to avoid confusion, a gesture operation that triggers to change a widget displayed in the widget set and a gesture operation used to trigger to change a category of a widget displayed in the widget set may be set to different gesture operations. In other words, the operation 3 and the operation 6 may be different operations. For example, if the operation 3 may be a slide left or right operation, the operation 6 may be a slide up or down operation; or if the operation 3 is a slide up or down operation, the operation 6 is a slide left or right operation.

In some embodiments, when a folder includes a plurality of widgets of different types, the mobile phone may adjust, based on a quantity of widgets of each of the different types, a size of a widget displayed in the widget set.

Figure 17A:
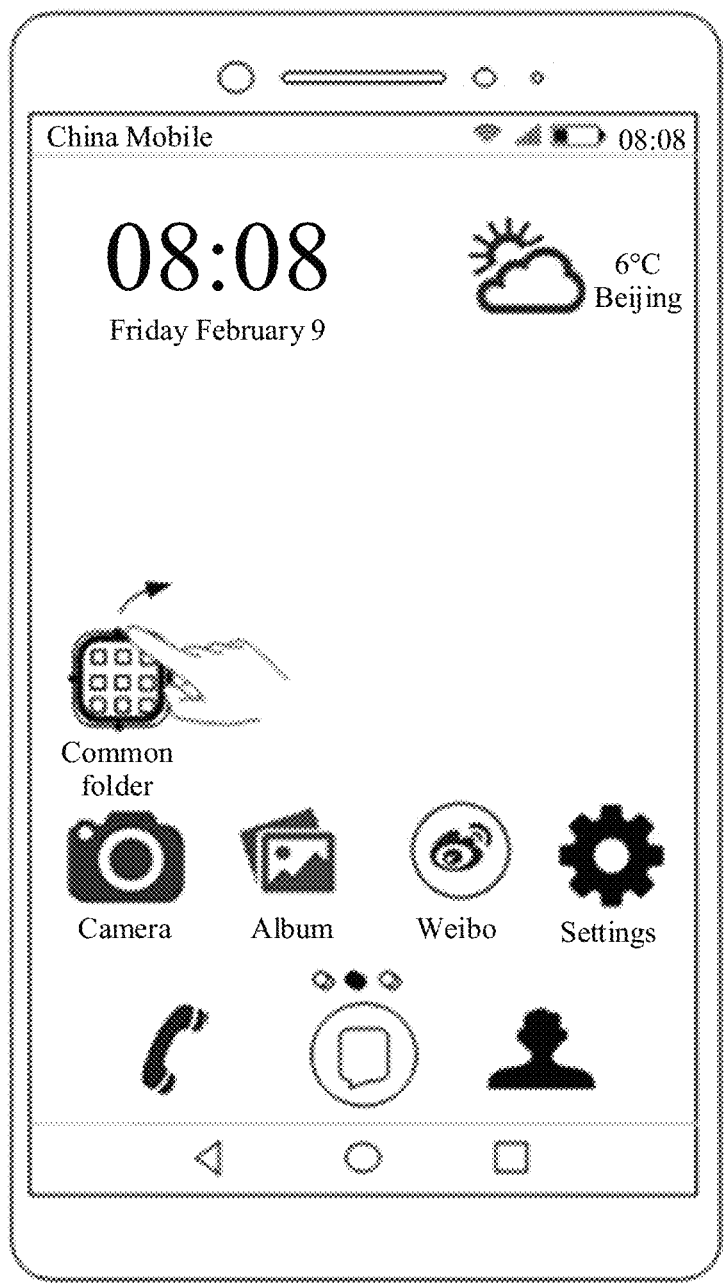
FIG. 17(a) to FIG. 17(c) are a schematic diagram of another group of display interfaces according to an embodiment of this application.
Figure 17B:
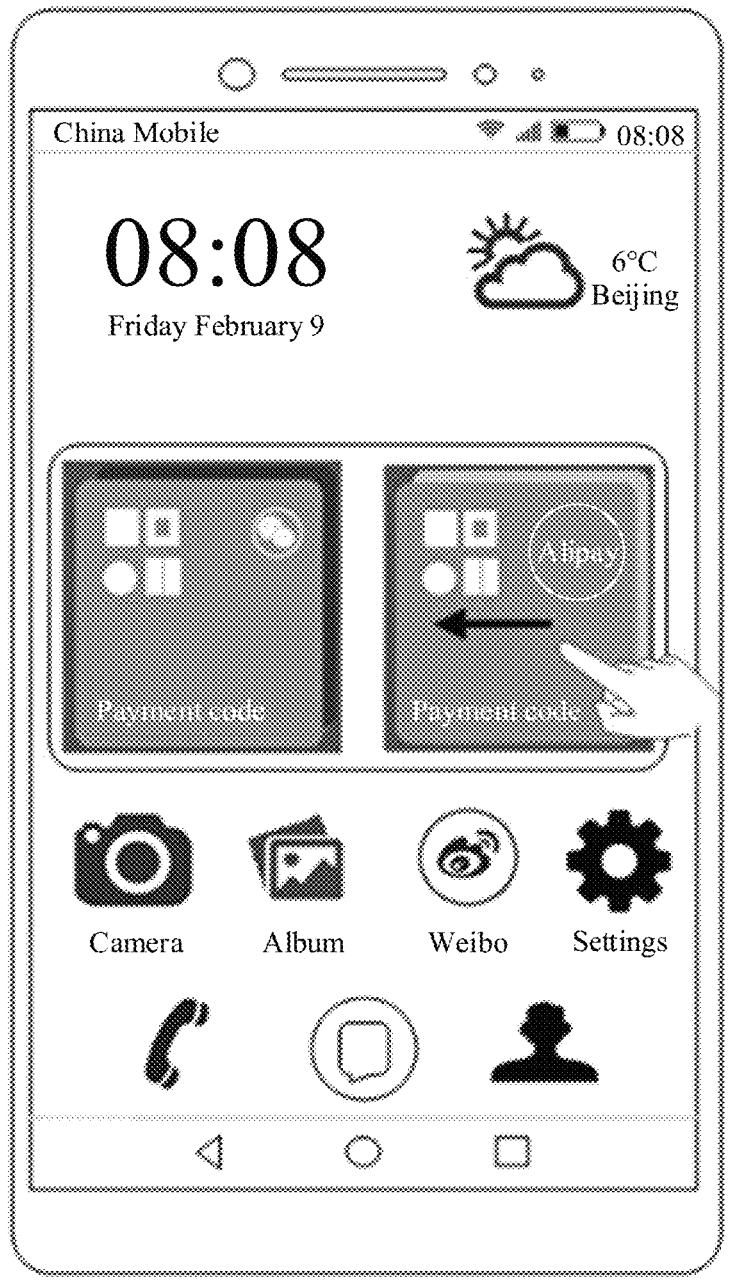
Figure 17C:
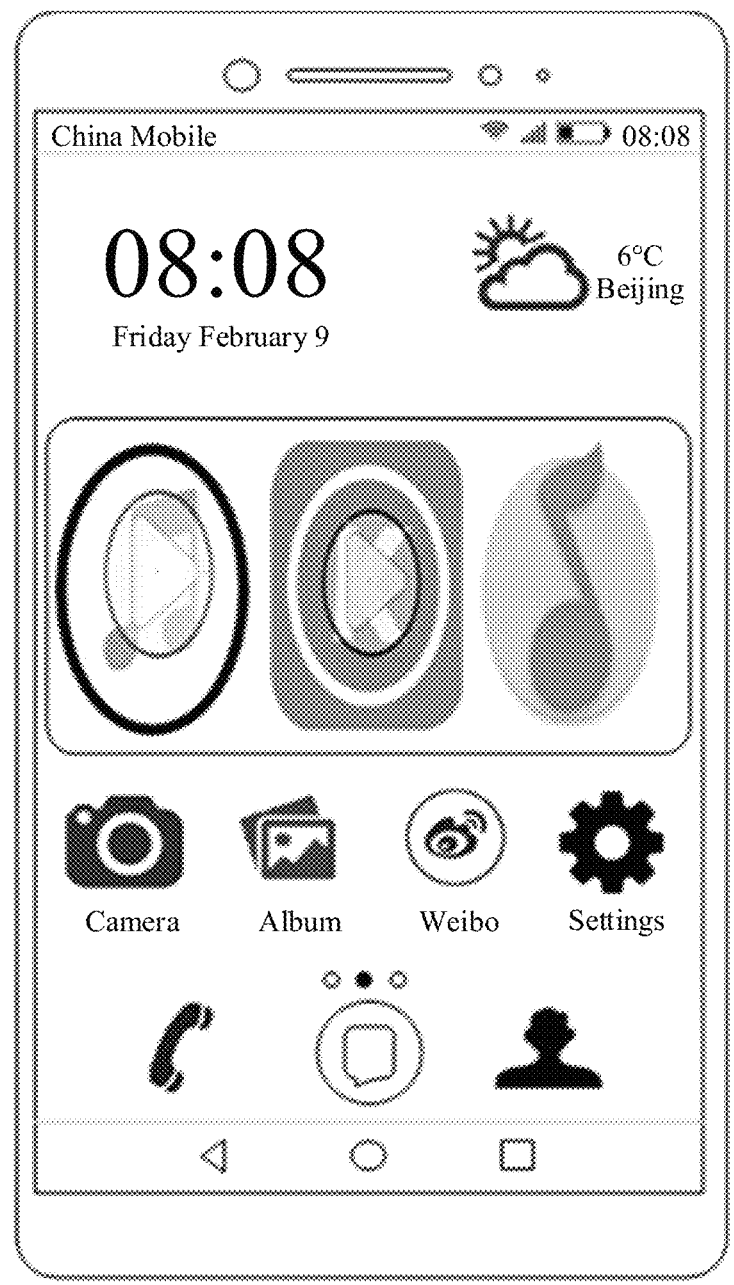
Figure 18A:
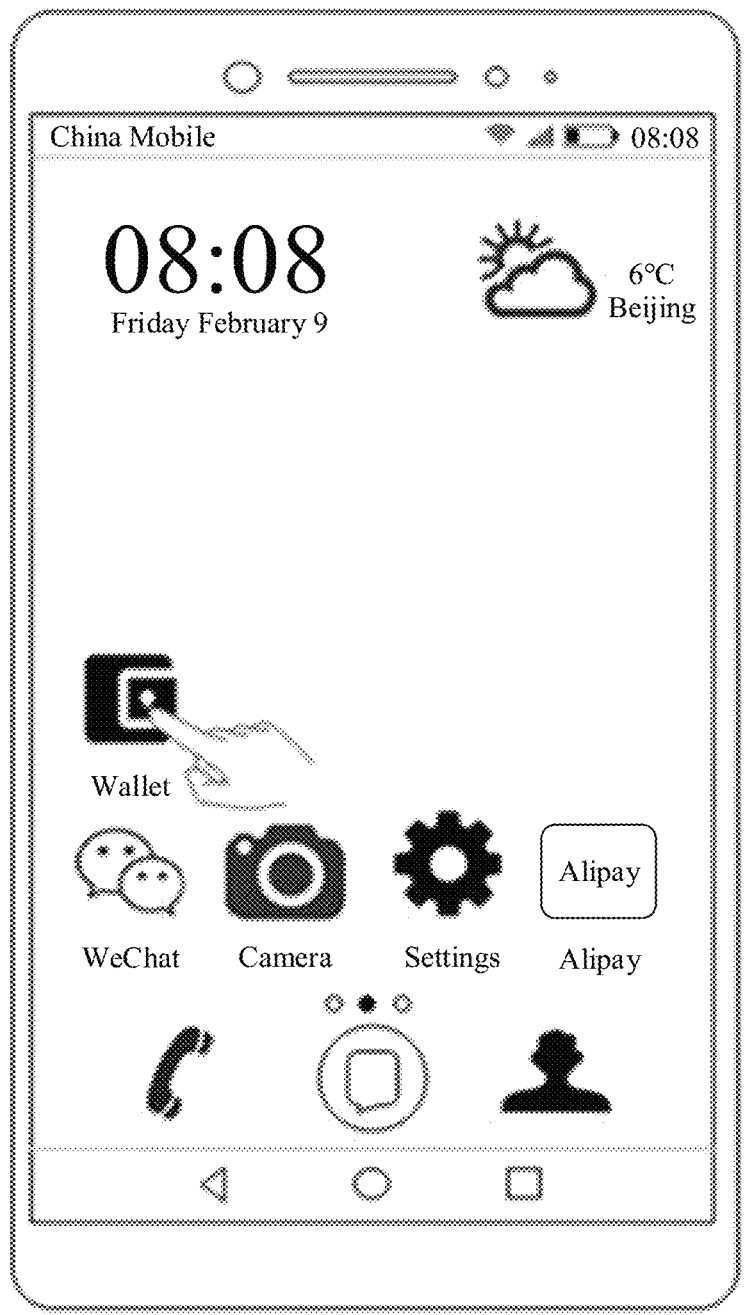
FIG. 18(a) to FIG. 18(e) are a schematic diagram of another group of display interfaces according to an embodiment of this application.
Figure 18B:
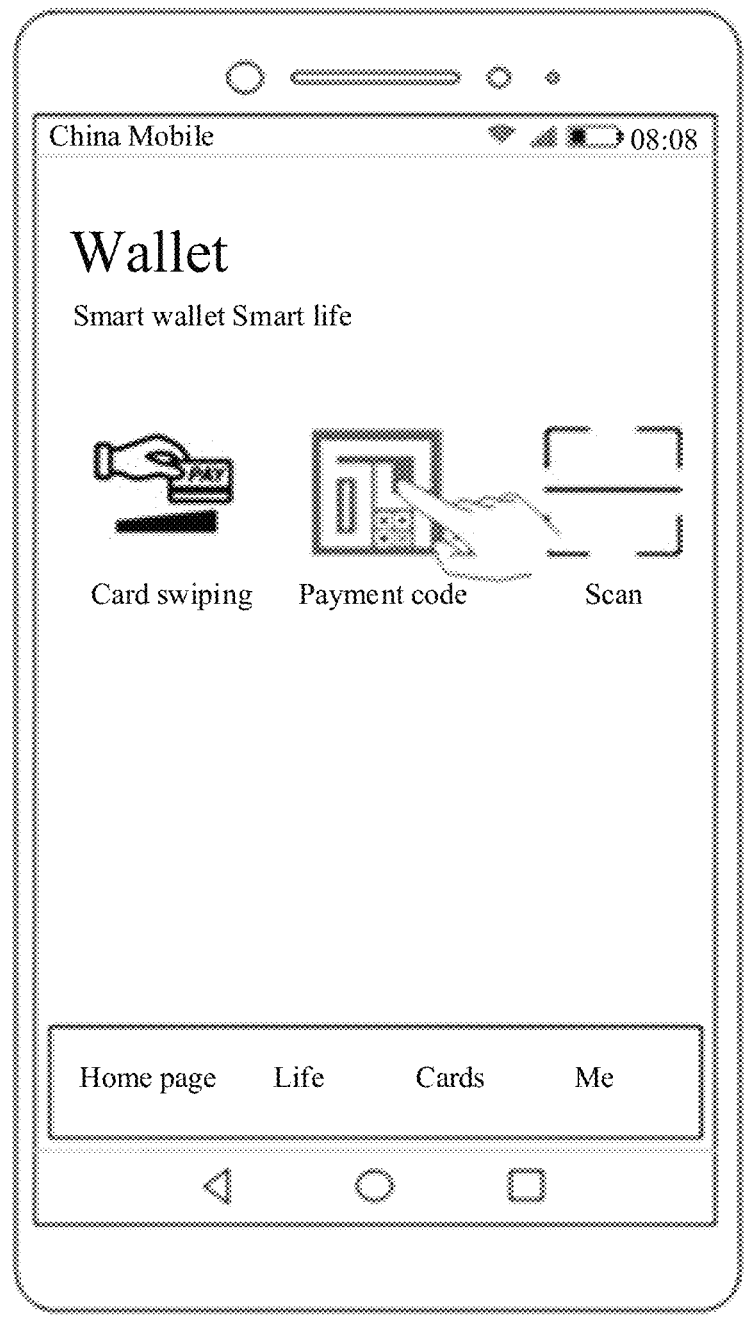
Figure 18C:
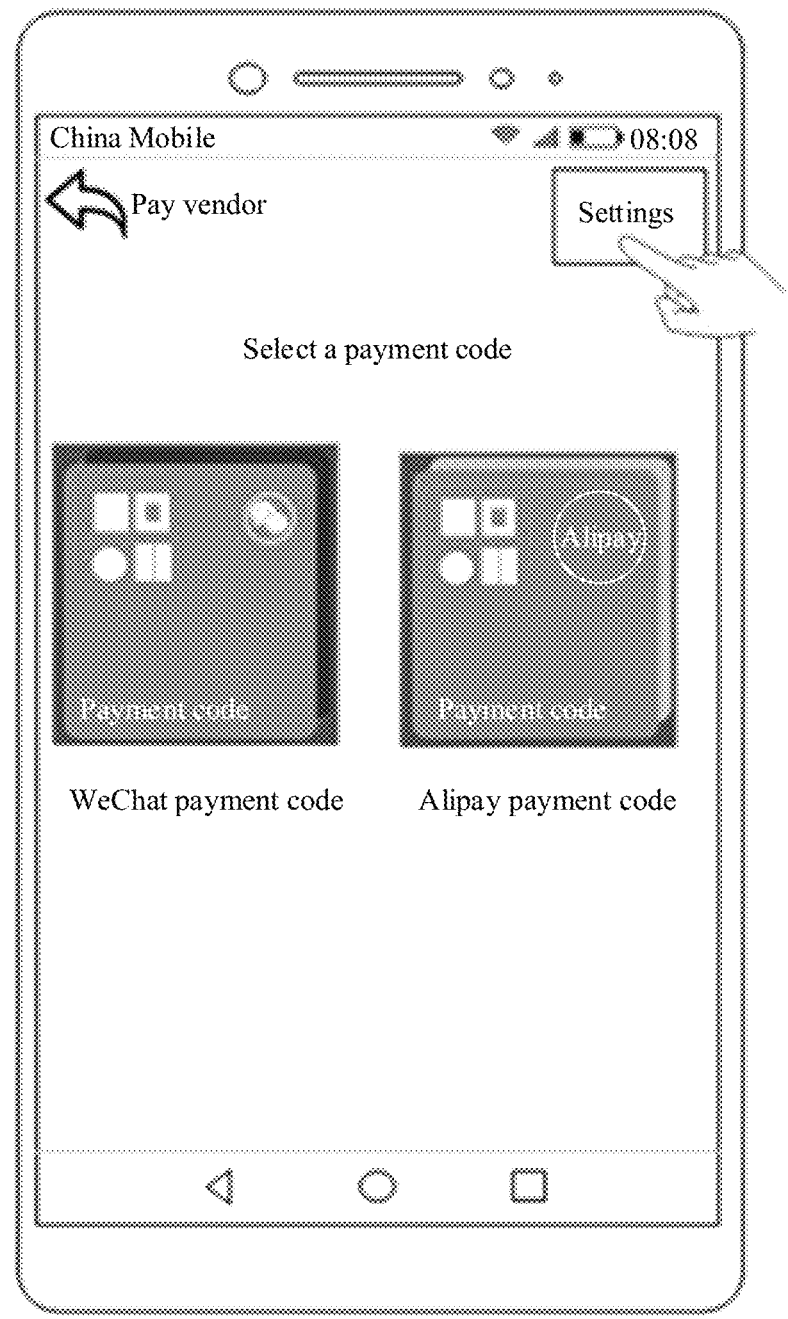
Figure 18D:
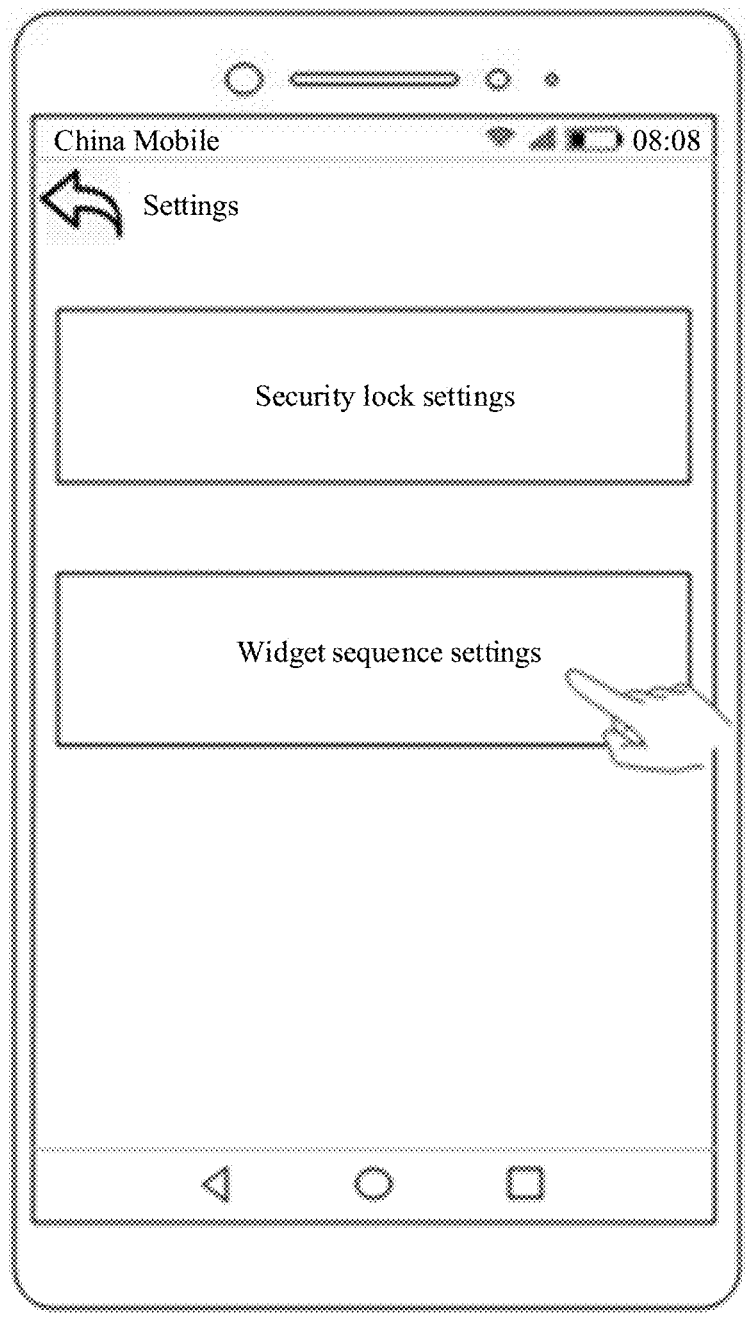
Figure 18E:
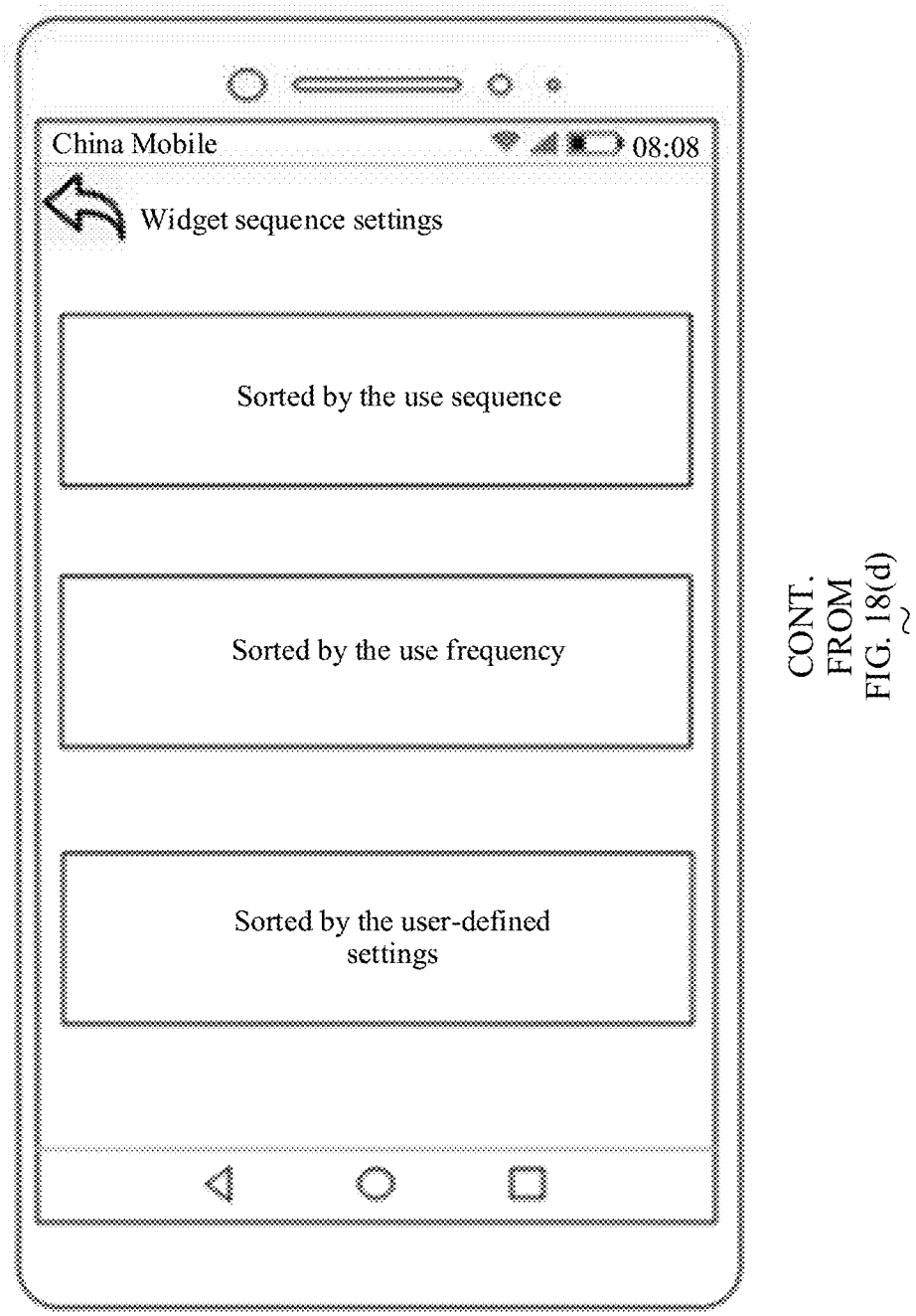

For example, as shown in FIG. 17(*a*), the home screen of the mobile phone includes a common folder, the common folder includes two payment-type widgets and three music-type widgets, and the user may perform a stretch operation on the common folder. As shown in FIG. 17(*b*), the mobile phone may receive the stretch operation performed by the user on the common folder, the mobile phone switches a common folder icon to a widget set in response to the stretch operation performed by the user on the common folder, and the widget set simultaneously displays the two payment-type widgets: the "WeChat payment code" widget and the "Alipay payment code" widget. As shown in FIG. 17(*c*), the user may perform a slide-to-page operation on the widget set, the mobile phone may receive the slide-to-page operation performed by the user on the widget set, and the mobile phone changes the widgets displayed in the widget set to the three music-type widgets in response to the slide-to-page operation performed by the user on the widget set.

Specifically, the mobile phone may adjust, based on the quantity of widgets of each of the different types, the size of the widget displayed in the widget set, so that the widget set can display widgets of a same type as many as possible. For example, when the home screen of the mobile phone displays a "4×2" widget set, the mobile phone may adjust a widget size, so that the widget set can simultaneously display two or three widgets of a same type. For example, when two or multiples of two widgets are of a same type, the mobile phone adjusts a widget size to "2×2", that is, simultaneously displays two widgets of a same type in the widget set. For another example, when three or multiples of three widgets are of a same type, the mobile phone adjusts a widget size to "1.3×2", that is, simultaneously displays three widgets of a same type in the widget set.

During actual application, a manner of adjusting a size of a widget in a widget set based on a quantity of widgets may alternatively be correspondingly set according to an actual requirement, and the manner of adjusting a widget size is not limited in this embodiment.

In some embodiments, after the mobile phone switches the target icon to the widget set, a sequence of widgets displayed in the widget set may be adjusted. The user may perform an operation 7 on the target icon. The mobile phone receives the operation 7 performed by the user on the target icon, and adjusts a widget display sequence in the widget set in response to the operation 7 performed by the user on the target icon. In other words, the operation 7 is used to adjust the display sequence of widgets in the widget set.

For example, as shown in FIG. 18(*a*), the user may perform a tap operation on the wallet icon. As shown in FIG. 18(*b*), the mobile phone receives the tap operation performed by the user on the wallet icon, the mobile phone enters a home page interface of "Wallet" in response to the tap operation performed by the user on the wallet icon, and the user may perform a tap operation on a "Payment code" component on the home page interface. As shown in FIG. 18(*c*), the mobile phone receives the tap operation performed by the user on the "Payment code" component, the mobile phone enters a payment code presentation interface in response to the tap operation performed by the user on the "Payment code" component, and the user may perform a tap operation on a "Settings" component on the payment code presentation interface. As shown in FIG. 18(*d*), the mobile phone receives the tap operation performed by the user on the "Settings" component, the mobile phone enters a setting interface in response to the tap operation performed by the user on the "Settings" component, and the user may perform a tap operation on a "Widget sequence settings" component on the setting interface. As shown in FIG. 18(*e*), the mobile phone receives the tap operation performed by the user on the "Widget sequence settings" component, the mobile phone enters a widget sequence setting interface in response to the tap operation performed by the user on the "Widget sequence settings" component, the widget sequence setting interface includes a plurality of components for adjusting a widget display sequence, and the user may select a widget display manner by tapping different components.

For example, the user may select to arrange, in a use sequence, the widgets displayed in the widget set. To be specific, a display sequence of the last widget used by the user in the widget set is first, a display sequence of the last but one widget used by the user in the widget set is second, and so on. For another example, the user may select to arrange, in a use frequency, the widgets displayed in the widget set. To be specific, within a specific time range (for example, one day or one week), a display sequence of a widget used by the user with the highest use frequency in the widget set is first, a display sequence of a widget used by the user with the second highest use frequency in the widget set is second, and so on. For another example, the user may customize a widget display sequence in the widget set according to an actual requirement of the user.

Figure 19:
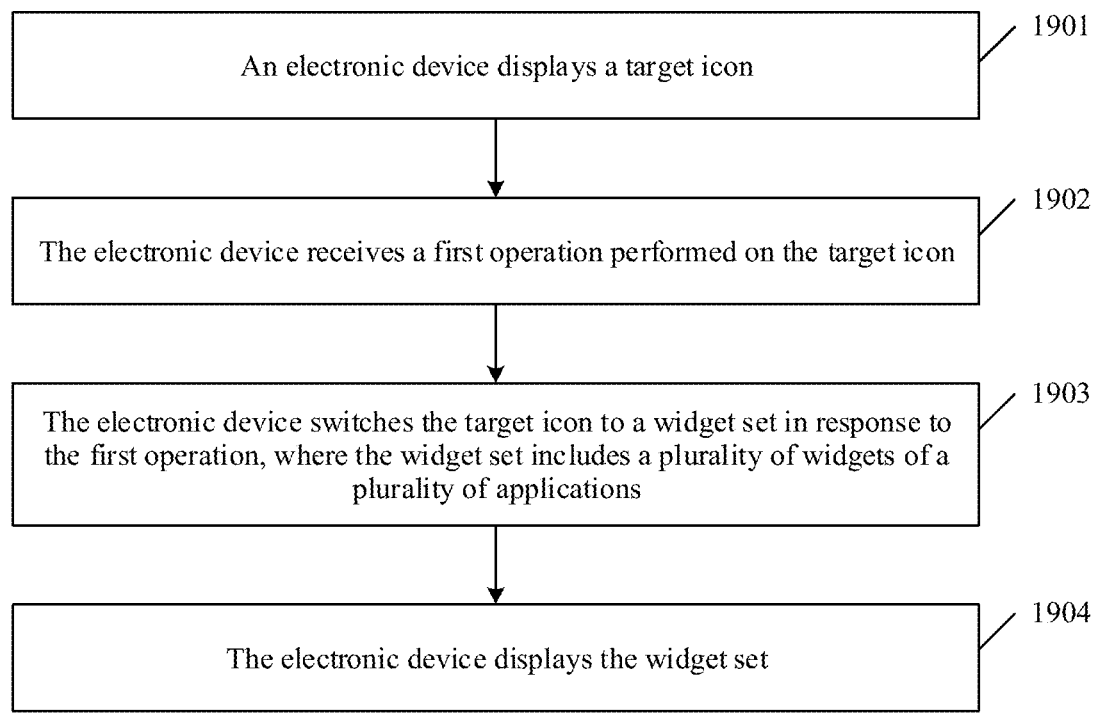
FIG. 19 is a schematic flowchart of another example of a widget processing method according to an embodiment of this application.

FIG. 19 is a schematic flowchart of another example of a widget processing method according to an embodiment of this application. As shown in FIG. 19, the widget processing method provided in this embodiment of this application includes the following steps.

1901: An electronic device displays a target icon.

For example, the electronic device may display the target icon on a home screen, or display the target icon on an interface such as a control center.

1902: The electronic device receives a first operation performed on the target icon.

For example, the first operation may be the operation 1 in the foregoing embodiment. That the electronic device receives a first operation performed on the target icon may specifically include: The electronic device receives a touch and hold operation performed on the target icon, the electronic device displays a frame at an edge of the target icon in response to the touch and hold operation, and the electronic device performs a stretch operation on the frame.

1903: The electronic device switches the target icon to a widget set in response to the first operation, where the widget set includes a plurality of widgets of a plurality of applications.

The target icon corresponds to the plurality of applications, and each of the plurality of applications corresponds to a widget. Therefore, the plurality of widgets of the plurality of applications corresponding to the target icon may be determined based on the target icon.

1904: The electronic device displays the widget set.

In an optional embodiment, after the electronic device switches the target icon to the widget set, the method further includes: The electronic device receives a second operation performed on the widget set. In response to the second operation, the electronic device changes a widget displayed in the widget set. For example, the second operation may be specifically the foregoing operation 3.

In an optional embodiment, the target icon is an icon of a first application, and the plurality of applications include an application associated with the first application. In other words, the first application may be associated with a plurality of applications. In this case, when the electronic device switches the icon of the first application to a widget set, a plurality of widgets included in the widget set are widgets of the plurality of applications associated with the first application.

In an optional embodiment, the plurality of applications include the first application. In other words, the plurality of widgets included in the widget set further include a widget of the first application. The first application may be associated with an application of a same type as the first application in the electronic device. For example, if the first application is a payment-type application, the first application may be associated with another payment-type application in the electronic device.

In an optional embodiment, the target icon is an icon of a folder, and the plurality of applications are applications included in the folder. In other words, the folder includes a plurality of applications. In this case, when the electronic device switches the icon of the folder to a widget set, a plurality of widgets included in the widget set are widgets of the plurality of applications in the folder. For example, the folder may include an application A and an application B. In this case, when the electronic device may switch the icon of the folder to the widget set, the plurality of widgets included in the widget set are a widget of the application A and a widget of the application B.

In an optional embodiment, the plurality of widgets include a first widget, a second widget, and a third widget. That the electronic device changes a widget displayed in the widget set includes: If the second operation is a slide operation in a first direction, the electronic device changes the first widget displayed in the widget set to the second widget. The second widget and the first widget are of a same type. Alternatively, if the second operation is a slide operation in a second direction, the electronic device changes the first widget displayed in the widget set to the third widget. The third widget and the first widget are of different types. The first direction and the second direction are different directions.

In an optional embodiment, after the electronic device switches the target icon to the widget set, the method may further include: The electronic device receives a third operation performed on a target widget. The target widget is a widget displayed in the widget set. In response to the third operation, the electronic device displays an application interface corresponding to the target widget. For example, the third operation may be specifically the foregoing operation 2. The third operation may be specifically a tap operation. In other words, in response to the tap operation performed on the target widget displayed in the widget set, the electronic device may display the application interface corresponding to the target widget.

In an optional embodiment, after the electronic device switches the target icon to the widget set, the method may further include: The electronic device receives a fourth operation performed on the widget set, and the electronic device switches the widget set to the target icon in response to the fourth operation. For example, the fourth operation may be specifically the foregoing operation 4. Specifically, the fourth operation may be a touch and hold operation and a scale down gesture operation. The electronic device receives a touch and hold gesture operation performed on the widget set, the electronic device displays a frame at an edge of the widget set in response to the touch and hold gesture operation, the electronic device receives a scale down gesture operation performed on the frame, and the electronic device switches the widget set to the target icon in response to the scale down gesture operation.

In an optional embodiment, after the electronic device switches the target icon to the widget set, the method may further include: The electronic device receives a fifth operation performed on the widget set, and the electronic device changes a size of a display region of the widget set in response to the fifth operation, for example, changes a widget set with a relatively small display region to a widget set with a relatively large display region, or changes a widget set with a relatively large display region to a widget set with a relatively small display region. For example, the fifth operation may be specifically the foregoing operation 5.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In several embodiments provided in this application, it should be understood that the disclosed systems, apparatuses, and methods may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate. Parts displayed as units may or may not be physical units, to be specific, may be located in one position, or may be distributed on a plurality of network units. Some or all of the units may be selected according to an actual requirement to achieve the objectives of the solutions of embodiments.

In addition, function units in embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the conventional technology, or all or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory, a random access memory, a magnetic disk, or an optical disc.

What is claimed is:

1. A method, applied to an electronic device, comprising:
   while displaying a first widget corresponding to a first application and a second widget corresponding to a second application on the home screen, receiving a first operation, wherein the first application and the second application are different;
   in response to the first operation, obtaining a widget set on the home screen, wherein the widget set comprises a first widget, a second widget, and wherein the widget set occupies one display region to display one widget in the widget set, wherein the first widget is displayed in the display region occupied by the widget set and the second widget is not displayed in the display region occupied by the widget set, and subsequently receiving a second operation on the first widget, wherein the second operation is a single operation;
   in response to the second operation for the widget set, switching displaying widget in the widget set, wherein the second widget is displayed in the display region occupied by the widget set and the first widget is not displayed in the display region occupied by the widget set.

2. The method according to claim 1,
   wherein the first widget and the second widget are stacked in the widget set.

3. The method according to claim 1, wherein the second operation is a sliding operation.

4. The method according to claim 1, the method further comprises:
   displaying one or more application icons on the home screen, wherein the one or more application icons includes at least one of an application icon of the first application or an application icon of the second application.

5. The method according to claim 4,
   wherein the at least one of the application icon of the first application or the application icon of the second application is displayed in a first region on the home screen; wherein the first region is different from the display region.

6. The method according to claim 1, wherein the step of, in response to the second operation, displaying, on the home screen, the second widget in the display region occupied by the widget set and not displaying the first widget in the display region occupied by the widget set further comprises:
   in response to the second operation, switching, on the home screen, the first widget displayed in the display region occupied by the widget set to the second widget displayed in the display region occupied by the widget set.

7. The method according to claim 1, wherein the step of, in response to the second operation, displaying, on the home screen, the second widget in the display region occupied by the widget set and not displaying the first widget in the display region occupied by the widget set further comprises:
   in response to the second operation, displaying, in the display region occupied by the widget set on the home screen, a slide-out animation of the first widget and displaying the second widget in the widget set.

8. The method according to claim 1, wherein the first widget is displayed in the display region occupied by the widget set and the second widget is not displayed in the display region occupied by the widget set is determined
   based on the use frequencies of the first application and second application, wherein a use frequency of the first application is higher than a use frequency of the second application; or
   wherein the first widget is displayed in the display region occupied by the widget set and the second widget is not displayed in the display region occupied by the widget set is determined based on use time of the first application and second application, wherein the use time of the first application is higher than the use time of the second application; or
   wherein the first widget is displayed in the display region occupied by the widget set and the second widget is not displayed in the display region occupied by the widget set is determined based on user-defined settings.

9. The method according to claim 1, wherein the first widget is displayed in the display region occupied by the widget set comprises:
   a size of the first widget is unchanged after the first operation;
   or
   the size of the first widget before the second operation is received is the same as the size of the first widget after the second operation is responded to; and
   wherein the displaying the second widget comprises:
   a size of the second widget is unchanged after the second operation.

10. The method according to claim 1, wherein a size of the first widget is the same as a size of the second widget.

11. An electronic device, comprising:
    a display;
    a processor; and
    a memory, storing a computer program, wherein the computer program comprises instructions, and when the instructions are executed by the processor, the electronic device is enabled to perform:
    while displaying a first widget corresponding to a first application and a second widget corresponding to a second application on the home screen, receiving a first operation, wherein the first application and the second application are different;
    in response to the first operation, obtaining a widget set on the home screen, wherein the widget set comprises a first widget, a second widget, and wherein the widget set occupies one display region to display one widget in the widget set, wherein the first widget is displayed in the display region occupied by the widget set and the second widget is not displayed in the display region occupied by the widget set, and subsequently receiving a second operation on the first widget, wherein the second operation is a single operation;

in response to the second operation, displaying, on the home screen, the second widget in the display region occupied by the widget set and not displaying the first widget in the display region occupied by the widget set.

12. The electronic device according to claim 11, wherein the first widget and the second widget are stacked in the widget set.

13. The electronic device according to claim 11, wherein the second operation is a sliding operation.

14. The electronic device according to claim 11, wherein when the instructions are executed by the processor, the electronic device is further enabled to perform:

displaying one or more application icons on the home screen, wherein the one or more application icons includes at least one of an application icon of the first application or an application icon of the second application.

15. The electronic device according to claim 14, wherein the at least one of the application icon of the first application or the application icon of the second application is displayed in a first region on the home screen; wherein the first region is different from the display region.

16. The electronic device according to claim 11, wherein the step of, in response to the second operation, displaying, on the home screen, the second widget in the display region occupied by the widget set and not displaying the first widget in the display region occupied by the widget set further comprises:

in response to the second operation, switching, on the home screen, the first widget displayed in the display region occupied by the widget set to the second widget displayed in the display region occupied by the widget set.

17. The electronic device according to claim 11, wherein the step of, in response to the second operation, displaying, on the home screen, the second widget in the display region occupied by the widget set and not displaying the first widget in the display region occupied by the widget set further comprises:

in response to the second operation, displaying, in the display region occupied by the widget set on the home screen, a slide-out animation of the first widget and displaying the second widget in the widget set.

18. The electronic device according to claim 11, wherein the first widget is displayed in the display region occupied by the widget set and the second widget is not displayed in the display region occupied by the widget set is determined based on the use frequencies of the first application and second application, wherein a use frequency of the first application is higher than a use frequency of the second application; or wherein the first widget is displayed in the display region occupied by the widget set and the second widget is not displayed in the display region occupied by the widget set is determined based on use time of the first application and second application, wherein the use time of the first application is higher than the use time of the second application; or wherein the first widget is displayed in the display region occupied by the widget set and the second widget is not displayed in the display region occupied by the widget set is determined based on user-defined settings.

19. The electronic device according to claim 11, wherein the first widget is displayed in the display region occupied by the widget set comprises:

a size of the first widget is unchanged after the first operation; and or the size of the first widget before the second operation is received is the same as the size of the first widget after the second operation is responded to; and wherein the displaying the second widget comprises:

a size of the second widget is unchanged after the second operation.

20. The electronic device according to claim 11, wherein a size of the first widget is the same as a size of the second widget.

* * * * *